(12) United States Patent
Jeong et al.

(10) Patent No.: US 10,934,487 B2
(45) Date of Patent: Mar. 2, 2021

(54) LIQUID CRYSTALLINE MEDIUM

(71) Applicant: Merck Patent GmbH, Darmstadt (DE)

(72) Inventors: Ji-Won Jeong, Seoul (KR); Yong-Kuk Yun, Hwaseong (KR); Dong-Mee Song, Hwaseong (KR); Jung-Min Lee, Seoul (KR)

(73) Assignee: Merck Patent GmbH, Darmstadt (DE)

( * ) Notice: Subject to any disclaimer, the term of this patent is extended or adjusted under 35 U.S.C. 154(b) by 33 days.

(21) Appl. No.: 14/379,793

(22) PCT Filed: Feb. 12, 2013

(86) PCT No.: PCT/EP2013/000407
§ 371 (c)(1),
(2) Date: Aug. 20, 2014

(87) PCT Pub. No.: WO2013/124040
PCT Pub. Date: Aug. 29, 2013

(65) Prior Publication Data
US 2015/0036095 A1    Feb. 5, 2015

(30) Foreign Application Priority Data

Feb. 22, 2012  (EP) ..................... 12001174

(51) Int. Cl.
| G02F 1/1333 | (2006.01) |
| C09K 19/54  | (2006.01) |
| C09K 19/44  | (2006.01) |
| C09K 19/30  | (2006.01) |
| C09K 19/32  | (2006.01) |

(Continued)

(52) U.S. Cl.
CPC ........ C09K 19/542 (2013.01); C09K 19/3003 (2013.01); C09K 19/32 (2013.01); C09K 19/44 (2013.01); G02F 1/1341 (2013.01); G02F 1/133365 (2013.01); C09K 2019/0448 (2013.01); C09K 2019/301 (2013.01); C09K 2019/3004 (2013.01); C09K 2019/3009 (2013.01); C09K 2019/3016 (2013.01); C09K 2019/548 (2013.01); Y10T 29/49117 (2015.01)

(58) Field of Classification Search
CPC .. C09K 19/542; C09K 19/44; C09K 19/3003; C09K 19/32; C09K 2019/548; C09K 2019/0448; C09K 2019/3004; C09K 2019/3009; C09K 2019/301; C09K 2019/3016; G02F 1/1333; G02F 1/1341; G02F 1/133365; Y10T 29/49117
USPC .................................................. 252/299.66
See application file for complete search history.

(56) References Cited

U.S. PATENT DOCUMENTS 6,157,427 A  *  12/2000  Saynor .............. G02F 1/133528
                                                        349/117
6,861,107 B2     3/2005  Klasen-Memmer et al.
(Continued)

FOREIGN PATENT DOCUMENTS

| CN | 101790574 A | 7/2010 |
| CN | 102264867 A | 11/2011 |

(Continued)

OTHER PUBLICATIONS

International Search Report dated Apr. 19, 2013 issued in corresponding PCT/EP2013/000407 application (pp. 1-4).

(Continued)

*Primary Examiner* — Geraldina Visconti
(74) *Attorney, Agent, or Firm* — Millen White Zelano and Branigan, PC; Csaba Henter

(57) ABSTRACT

The invention relates to a liquid-crystalline medium which contains at least two polymerisable compounds or reactive mesogens (RM)
and
at least one compound selected from the group of compounds of the formula IIA, IIB and IIC,

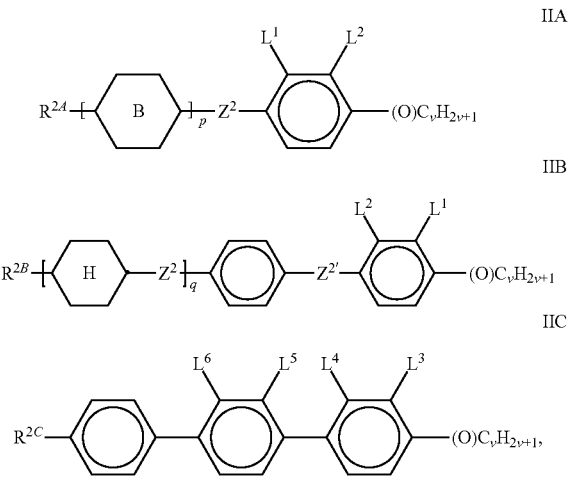

in which
$R^{2A}$, $R^{2B}$, $R^{2C}$, $L^{1-6}$, ring B, $Z^2$, $Z^{2'}$, p, q and v have the meanings indicated in Claim 1,
and to the use thereof for an active-matrix display, in particular based on the VA, PSA, PS-VA, PALC, FFS, PS-FFS, IPS or PS-IPS effect, especially for the use in LC displays of the PS (polymer stabilised) or PSA (polymer sustained alignment) type.

28 Claims, 1 Drawing Sheet

(51) Int. Cl.
*G02F 1/1341* (2006.01)
*C09K 19/04* (2006.01)

(56) References Cited

U.S. PATENT DOCUMENTS

| | | | |
|---|---|---|---|
| 8,518,498 B2* | 8/2013 | Song | G02F 1/1393 |
| | | | 252/299.01 |
| 8,545,720 B2 | 10/2013 | Goetz et al. | |
| 8,551,358 B2 | 10/2013 | Lee et al. | |
| 8,962,105 B2 | 2/2015 | Furusato et al. | |
| 8,999,459 B2* | 4/2015 | Bernatz | C09K 19/3003 |
| | | | 252/299.6 |
| 9,090,823 B2 | 7/2015 | Goetz et al. | |
| 9,556,382 B2* | 1/2017 | Goetz | C09K 19/3402 |
| 2004/0011996 A1 | 1/2004 | Klasen-Memmer et al. | |
| 2004/0188653 A1 | 9/2004 | Kataoka et al. | |
| 2004/0191428 A1 | 9/2004 | Tsuda et al. | |
| 2005/0030458 A1 | 2/2005 | Sasabayashi et al. | |
| 2008/0236727 A1 | 10/2008 | Hsieh et al. | |
| 2008/0273160 A1 | 11/2008 | Kim et al. | |
| 2010/0053527 A1 | 3/2010 | Hsieh et al. | |
| 2010/0304049 A1 | 12/2010 | Bernatz et al. | |
| 2011/0095229 A1 | 4/2011 | Lee et al. | |
| 2011/0248216 A1 | 10/2011 | Klasen-Memmer et al. | |
| 2011/0255048 A1 | 10/2011 | Goetz et al. | |
| 2012/0305843 A1 | 12/2012 | Klasen-Memmer et al. | |
| 2013/0056680 A1 | 3/2013 | Lee et al. | |
| 2013/0222755 A1 | 8/2013 | Furusato et al. | |
| 2013/0306910 A1 | 11/2013 | Goetz et al. | |
| 2013/0335651 A1 | 12/2013 | Lee et al. | |
| 2013/0335652 A1 | 12/2013 | Lee et al. | |
| 2013/0335653 A1 | 12/2013 | Lee et al. | |

FOREIGN PATENT DOCUMENTS

| | | |
|---|---|---|
| DE | 102009055829 A | 6/2010 |
| DE | 102009055829 A1 | 6/2010 |
| DE | 102011105930 A | 1/2012 |
| EP | 2138518 A1 | 12/2009 |
| JP | 2004286984 A | 10/2004 |
| TW | 200407414 A1 | 5/2011 |
| TW | 201136885 A1 | 11/2011 |
| WO | 2009/156118 A1 | 12/2009 |
| WO | 2009156118 A1 | 12/2009 |
| WO | 2011137986 A | 11/2011 |
| WO | 2011137986 A1 | 11/2011 |
| WO | 2012066933 A1 | 5/2012 |

OTHER PUBLICATIONS

Chinese Office Action dated May 10, 2016 issued in corresponding CN 201380009963.1 application (11 pages).
English Abstract of CN 101790574 A published Jul. 28, 2010 (1 page).
Taiwan Office Action with Search Report for corresponding TW Application No. 102106063; dated Jul. 18, 2016.
EP Office Action with Search Report for corresponding EP Application No. 2817388; dated Sep. 23, 2016.
Machine translation of JP 2004286984 A1 published on Oct. 14, 2004 to Fujitsu Display Technologies Corp.
EP Office Action with Search Report for corresponding EP Application No. 13707810; dated Dec. 21, 2016.
CN Office Action with Search Report for corresponding CN Application No. 201710180098.7 ; dated Feb. 1, 2019 (pp. 1-7).

* cited by examiner

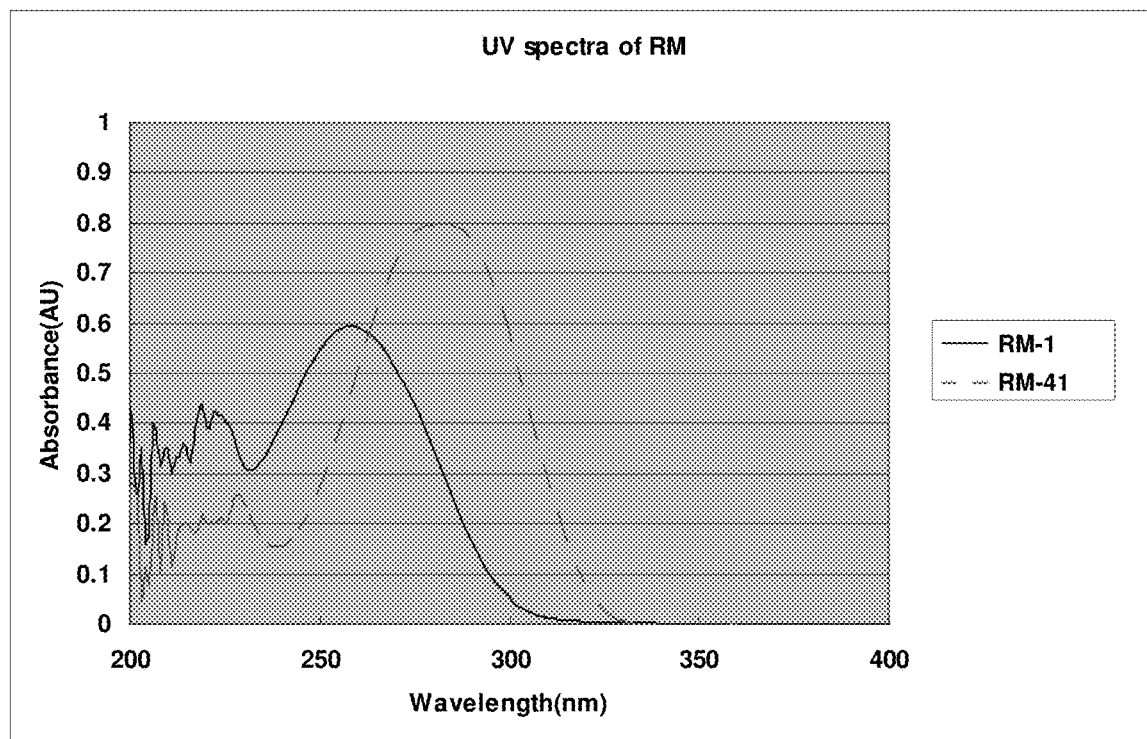

LIQUID CRYSTALLINE MEDIUM

The invention relates to a liquid crystalline medium which contains at least two polymerisable compounds and at least one compound with a negative dielectric anisotropy.

Media of this type can be used, in particular, for electro-optical displays having active-matrix addressing based on the ECB effect and for IPS (in-plane switching) displays or FFS (fringe field switching) displays.

The principle of electrically controlled birefringence, the ECB effect or also DAP (deformation of aligned phases) effect, was described for the first time in 1971 (M. F. Schieckel and K. Fahrenschon, "Deformation of nematic liquid crystals with vertical orientation in electrical fields", Appl. Phys. Lett. 19 (1971), 3912). This was followed by papers by J. F. Kahn (Appl. Phys. Lett. 20 (1972), 1193) and G. Labrunie and J. Robert (J. Appl. Phys. 44 (1973), 4869).

The papers by J. Robert and F. Clerc (SID 80 Digest Techn. Papers (1980), 30), J. Duchene (Displays 7 (1986), 3) and H. Schad (SID 82 Digest Techn. Papers (1982), 244) showed that liquid-crystalline phases must have high values for the ratio of the elastic constants $K_3/K_1$, high values for the optical anisotropy $\Delta n$ and values for the dielectric anisotropy of $\Delta\epsilon \leq -0.5$ in order to be suitable for use in high-information display elements based on the ECB effect. Electro-optical display elements based on the ECB effect have a homeotropic edge alignment (VA technology=vertically aligned). Dielectrically negative liquid-crystal media can also be used in displays which use the so-called IPS or FFS effect.

Displays which use the ECB effect, as so-called VAN (vertically aligned nematic) displays, for example in the MVA (multi-domain vertical alignment, for example: Yoshide, H. et al., paper 3.1: "MVA LCD for Notebook or Mobile PCs . . . ", SID 2004 International Symposium, Digest of Technical Papers, XXXV, Book I, pp. 6 to 9, and Liu, C. T. et al., paper 15.1: "A 46-inch TFT-LCD HDTV Technology . . . ", SID 2004 International Symposium, Digest of Technical Papers, XXXV, Book II, pp. 750 to 753), PVA (patterned vertical alignment, for example: Kim, Sang Soo, paper 15.4: "Super PVA Sets New State-of-the-Art for LCD-TV", SID 2004 International Symposium, Digest of Technical Papers, XXXV, Book II, pp. 760 to 763), ASV (advanced super view, for example: Shigeta, Mitzuhiro and Fukuoka, Hirofumi, paper 15.2: "Development of High Quality LCDTV", SID 2004 International Symposium, Digest of Technical Papers, XXXV, Book II, pp. 754 to 757) modes, have established themselves as one of the three more recent types of liquid-crystal display that are currently the most important, in particular for television applications, besides IPS (in-plane switching) displays (for example: Yeo, S. D., paper 15.3: "An LC Display for the TV Application", SID 2004 International Symposium, Digest of Technical Papers, XXXV, Book II, pp. 758 & 759) and the long-known TN (twisted nematic) displays. The technologies are compared in general form, for example, in Souk, Jun, SID Seminar 2004, seminar M-6: "Recent Advances in LCD Technology", Seminar Lecture Notes, M-6/1 to M-6/26, and Miller, Ian, SID Seminar 2004, seminar M-7: "LCD-Television", Seminar Lecture Notes, M-7/1 to M-7/32. Although the response times of modern ECB displays have already been significantly improved by addressing methods with overdrive, for example: Kim, Hyeon Kyeong et al., paper 9.1: "A 57-in. Wide UXGA TFT-LCD for HDTV Application", SID 2004 International Symposium, Digest of Technical Papers, XXXV, Book I, pp. 106 to 109, the achievement of video-compatible response times, in particular on switching of grey shades, is still a problem which has not yet been satisfactorily solved.

Industrial application of this effect in electro-optical display elements requires LC phases, which have to satisfy a multiplicity of requirements. Particularly important here are chemical resistance to moisture, air and physical influences, such as heat, infrared, visible and ultraviolet radiation and direct and alternating electric fields.

Furthermore, industrially usable LC phases are required to have a liquid-crystalline mesophase in a suitable temperature range and low viscosity.

None of the hitherto-disclosed series of compounds having a liquid-crystalline mesophase includes a single compound which meets all these requirements. Mixtures of two to 25, preferably three to 18, compounds are therefore generally prepared in order to obtain substances which can be used as LC phases. However, it has not been possible to prepare optimum phases easily in this way since no liquid-crystal materials having significantly negative dielectric anisotropy and adequate long-term stability were hitherto available.

Matrix liquid-crystal displays (MLC displays) are known. Non-linear elements which can be used for individual switching of the individual pixels are, for example, active elements (i.e. transistors). The term "active matrix" is then used, where a distinction can be made between two types:
1. MOS (metal oxide semiconductor) transistors on a silicon wafer as substrate
2. thin-film transistors (TFTs) on a glass plate as substrate.

In the case of type 1, the electro-optical effect used is usually dynamic scattering or the guest-host effect. The use of single-crystal silicon as substrate material restricts the display size, since even modular assembly of various part-displays results in problems at the joints.

In the case of the more promising type 2, which is preferred, the electro-optical effect used is usually the TN effect.

A distinction is made between two technologies: TFTs containing compound semiconductors, such as, for example, CdSe, or TFTs based on polycrystalline or amorphous silicon. The latter technology is being worked on intensively worldwide.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully colour-capable displays, in which a mosaic of red, green and blue filters is arranged in such a way that a filter element is opposite each switchable pixel.

The term MLC displays here covers any matrix display with integrated non-linear elements, i.e. besides the active matrix, also displays with passive elements, such as varistors or diodes (MIM=metal-insulator-metal).

MLC displays of this type are particularly suitable for TV applications (for example pocket TVs) or for high-information displays in automobile or aircraft construction. Besides problems regarding the angle dependence of the contrast and the response times, difficulties also arise in MLC displays due to insufficiently high specific resistance of the liquid-crystal mixtures [TOGASHI, S., SEKIGUCHI, K., TANABE, H., YAMAMOTO, E., SORI-MACHI, K., TAJIMA, E., WATANABE, H., SHIMIZU, H., Proc. Eurodisplay 84, September 1984: A 210-288 Matrix LCD Controlled by Double Stage Diode Rings, pp. 141 ff., Paris; STROMER, M., Proc. Eurodisplay 84, September 1984:

Design of Thin Film Transistors for Matrix Addressing of Television Liquid Crystal Displays, pp. 145 ff., Paris]. With decreasing resistance, the contrast of an MLC display deteriorates. Since the specific resistance of the liquid-crystal mixture generally drops over the life of an MLC display owing to interaction with the inside surfaces of the display, a high (initial) resistance is very important for displays that have to have acceptable resistance values over a long operating period.

There, thus continues to be a great demand for MLC displays having very high specific resistance at the same time as a large working-temperature range, short response times and a low threshold voltage with the aid of which various grey shades can be produced. The disadvantage of the frequently-used MLC-TN displays is due to their comparatively low contrast, the relatively high viewing-angle dependence and the difficulty of generating grey shades in these displays.

VA displays have significantly better viewing-angle dependencies and are therefore principally used for televisions and monitors. However, there continues to be a need here to improve the response times, in particular with respect to the use of televisions having frame rates (image change frequency/repetition rates) of greater than 60 Hz. At the same time, however, the properties, such as, for example, the low-temperature stability, must not be impaired.

The various display technologies have been developed for a lot of applications. The flexible display, 3D display and transparent display etc. have been mentioned as the future display. The liquid crystal display is the non-emissive type which means the backlight is essential. In most LC optical devices, the incident light of LCD panel is absorbed, reflected and blocked by the several layers of LCD. For this reason, the optical efficiency of LCD is very low as 7~8%. Thus, the object of the display manufacturers is to improve the transmittance of LCD and to decrease the cost. This could be achieved for example by removing some substrates or eliminating polarizers in the LCD.

The object of the present invention is to provide LC mixtures which can be used for all kind of applications, especially for LCD panels with one glass substrate only.

Furthermore, the invention is based on the object of providing liquid crystalline mixtures, in particular for monitor and TV applications, which are based on the ECB effect or on the IPS or FFS effect, which do not have the above-mentioned disadvantages or only do so to a reduced extent. In particular, it must be ensured for monitors and televisions that they also operate at extremely high and extremely low temperatures and at the same time have short response times, have improved reliability behaviour, in particular have no or significantly reduced image sticking after long operating times.

Surprisingly it has been found that LCD which contain LC mixtures with at least two polymerisable compounds (reactive mesogens=RMs), preferably with different polymerization reactivities, can be operated with a single substrate in the display only. With the mixtures according to the present invention, it is possible to build the RM polymer layer in order to replace the top glass substrate in the LCD through UV exposure process.

The built RM polymer layer stores the LC mixture in the polyimide wall. The polyimide (PI) is used as orientation layer in the display.

The LC mixtures according to the present invention especially improve the response times, especially the response times of PS-VA mixtures.

The invention thus relates to a liquid-crystalline medium which contains at least two polymerisable compounds or reactive mesogens (RM)
and
at least one compound selected from the group of compounds of the formula IIA, IIB and IIC,

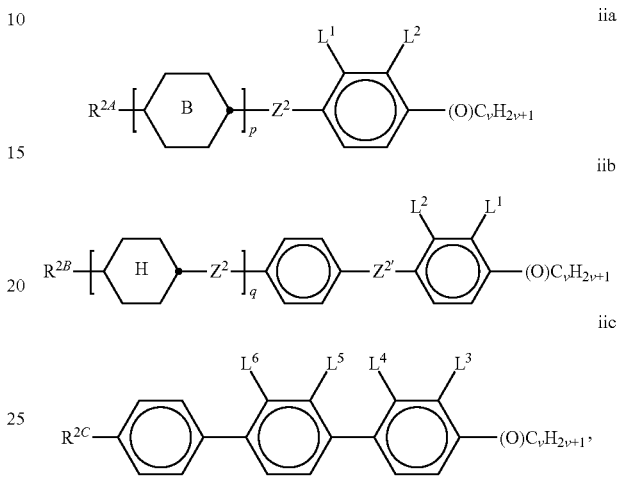

in which
$R^{2A}$, $R^{2B}$ and $R^{2C}$
each, independently of one another, denote H, an alkyl or alkenyl radical having up to 15 C atoms which is unsubstituted, monosubstituted by CN or $CF_3$ or at least monosubstituted by halogen, where, in addition, one or more $CH_2$ groups in these radicals may be replaced by —O—, —S—,

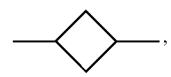

—C≡C—, —$CF_2$O—, —O$CF_2$—, —OC—O— or —O—CO— in such a way that O atoms are not linked directly to one another,

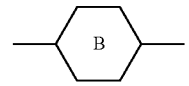

denotes

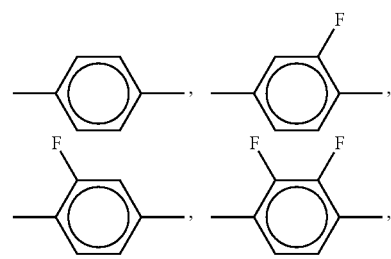

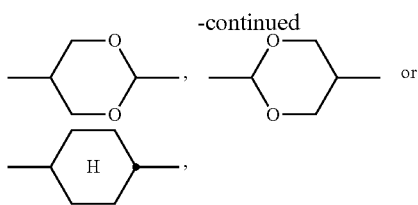

$Y^{1-6}$ each, independently of one another, denote H or F.

$L^1$ and $L^2$ each, independently of one another, denote F, Cl, $CF_3$ or $CHF_2$, $L^{3-6}$ each, independently of one another, denote H, F, Cl, $CF_3$ or $CHF_2$, but at least two of $L^{3-6}$ denote F, Cl, $CF_3$ or $CHF_2$ $Z^2$ and $Z^{2'}$ each, independently of one another, denote a single bond, —$CH_2CH_2$—, —CH=CH—, —C≡C—, —$CF_2$O—, —$OCF_2$—, —$CH_2$O—, —$OCH_2$—, —COO—, —OCO—, —$C_2F_4$—, —CF=CF—, —CH=$CHCH_2$O—, p denotes 1 or 2, and, in the case where $Z^2$=single bond, p may also denote 0, q denotes 0 or 1, $(O)C_vH_{2v+1}$ denotes $OC_vH_{2v+1}$ or $C_vH_{2v+1}$, and v denotes 1 to 6.

The mixtures according to the invention preferably exhibit very broad nematic phase ranges having clearing points ≥70° C., preferably ≥75° C., in particular ≥80° C., very favourable values for the capacitive threshold, relatively high values for the holding ratio and at the same time very good low-temperature stabilities at −20° C. and −30° C., as well as very low rotational viscosities and short response times. The mixtures according to the invention are furthermore distinguished by the fact that, in addition to the improvement in the rotational viscosity $\gamma_1$, relatively high values of the elastic constant $K_{33}$ for improving the response times can be observed.

The invention further relates to the use of the LC mixture in LC displays, especially in PS or PSA displays.

The invention further relates to a method of preparing an LC medium as described above and below, by mixing one or more compounds of formula IIA, IIB and/or IIC with two or more polymerisable compounds or RMs and optionally with one or more further liquid-crystalline compounds and/or additives.

Especially preferred PS and PSA displays are PSA-VA, PSA-OCB, PS-IPS, PS-FFS and PS-TN displays, very preferred PSA-VA and PSA-IPS displays.

The mixture according to the invention is highly suitable for panel structures wherein one of the outer plate is substituted by the polymer layer and the PI layer in the bottom side is not rubbed for VA.

The invention further relates to an LC medium, its use in PS and PSA displays, and to PS and PSA displays containing it as described above and below, wherein the polymerisable components or polymerisable compounds or RMs are polymerised.

The mixtures according to the present invention containing at least two polymerisable compounds and at least one compound of the formula IIA, IIB or IIC show an advantageous rotational viscosity $\gamma_1$/clearing point ratio. They are therefore particularly suitable for achieving liquid crystalline mixtures having low $\gamma_1$, high transmittance and a relatively high clearing point. In addition, the compounds of the formulae IIA, IIB and IIC exhibit good solubility in LC media. LC media according to the invention containing at least one compound of the formula IIA, IIB and/or IIC have a low rotational viscosity, fast response times, a high clearing point, very high positive dielectric anisotropy, relatively high birefringence and a broad nematic phase range and a high transmittance. They are therefore particularly suitable for mobile telephones, video applications, smart phones, tablet PC and especially for TV, flexible displays and for displays with high transmission.

Polymerisable compounds, so-called reactive mesogens (RMs), for example as disclosed in U.S. Pat. No. 6,861,107, are added to the mixtures according to the invention in concentrations of preferably 0.1-5% by weight, particularly preferably 0.2-2% by weight in total, based on the mixture. These mixtures may optionally also contain an initiator, as described, for example, in U.S. Pat. No. 6,781,665. The initiator, for example Irganox-1076 from Ciba, is preferably added to the mixture containing polymerisable compounds in amounts of 0-1%. Mixtures of this type can be used for so-called polymer-stabilised VA modes (PS-VA) or PSA (polymer sustained VA), in which polymerisation of the reactive mesogens is intended to take place in the liquid-crystalline mixture. The prerequisite for this is that the liquid-crystal mixture does not itself contain any polymerisable components.

In a preferred embodiment of the invention, the polymerisable compounds are selected from the compounds of the formula I $$R^{Ma}-A^{M1}-(Z^{M1}-A^{M2})_{m1}-R^{Mb} \qquad I$$

in which the individual radicals have the following meanings:

$R^{Ma}$ and $R^{Mb}$ each, independently of one another, denote P, P-Sp-, H, halogen, $SF_5$, $NO_2$, an alkyl, alkenyl or alkynyl group, where at least one of the radicals $R^{Ma}$ and $R^{Mb}$ preferably denotes or contains a group P or P-Sp-, P denotes a polymerisable group, Sp denotes a spacer group or a single bond, $A^{M1}$ and $A^{M2}$ each, independently of one another, denote an aromatic, heteroaromatic, alicyclic or heterocyclic group, preferably having 4 to 25 ring atoms, preferably C atoms, which may also encompass or contain fused rings, and which may optionally be mono- or polysubstituted by L, L denotes P, P-Sp-, OH, $CH_2OH$, F, Cl, Br, I, —CN, —$NO_2$, —NCO, —NCS, —OCN, —SCN, —C(=O)N($R^x$)$_2$, —C(=O)$Y^1$, —C(=O)$R^x$, —N($R^x$)$_2$, optionally substituted silyl, optionally substituted aryl having 6 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may be replaced by F, Cl, P or P-Sp-, preferably P, P-Sp-, H, OH, $CH_2OH$, halogen, $SF_5$, $NO_2$, an alkyl, alkenyl or alkynyl group, $Y^1$ denotes halogen, $Z^{M1}$ denotes —O—, —S—, —CO—, —CO—O—, —OCO—, —O—CO—O—, —$OCH_2$—, —$CH_2O$—, —$SCH_2$—, —$CH_2S$—, —$CF_2O$—, —$OCF_2$—, —$CF_2S$—, —$SCF_2$—, —$(CH_2)_{n1}$—, —$CF_2CH_2$—, —$CH_2CF_2$—, —$(CF_2)_{n1}$—, —CH=CH—, —CF=CF—, —C≡C—, —CH=CH—, —COO—, —OCO—CH=CH—, $CR^0R^{00}$ or a single bond, $R^0$ and $R^{00}$ each, independently of one another, denote H or alkyl having 1 to 12 C atoms, $R^x$ denotes P, P-Sp-, H, halogen, straight-chain, branched or cyclic alkyl having 1 to 25 C atoms, in which, in addition, one or more non-adjacent $CH_2$ groups may be replaced by —O—, —S—, —CO—, —CO—O—, —O—CO—, —O—CO—O— in such a way that O and/or S atoms are not linked directly to one another, and in which, in addition, one or more H atoms may be replaced by F, Cl, P or P-Sp-, an optionally substituted aryl or aryloxy group having 6 to 40 C atoms, or an optionally substituted heteroaryl or heteroaryloxy group having 2 to 40 C atoms, m1 denotes 0, 1, 2, 3 or 4, and n1 denotes 1, 2, 3 or 4, where at least one, preferably one, two or three, particularly preferably one or two, from the group $R^{Ma}$, $R^{Mb}$ and the substituents L present denotes a group P or P-Sp- or contains at least one group P or P-Sp-.

Particularly preferred compounds of the formula I are those in which $R^{Ma}$ and $R^{Mb}$ each, independently of one another, denote P, P-Sp-, H, F, Cl, Br, I, —CN, —NO$_2$, —NCO, —NCS, —OCN, —SCN, SF$_5$ or straight-chain or branched alkyl having 1 to 25 C atoms, in which, in addition, one or more non-adjacent CH$_2$ groups may each be replaced, independently of one another, by —C(R$^0$)=C(R$^{00}$)—, —C≡C—, —N(R$^{00}$)—, —O—, —S—, —CO—, —CO—O—, —O—CO—, —O—CO—O— in such a way that O and/or S atoms are not linked directly to one another, and in which, in addition, one or more H atoms may be replaced by F, Cl, Br, I, CN, P or P-Sp-, where at least one of the radicals $R^{Ma}$ and $R^{Mb}$ preferably denotes or contains a group P or P-Sp-, $A^{M1}$ and $A^{M2}$ each, independently of one another, denote 1,4-phenylene, naphthalene-1,4-diyl, naphthalene-2,6-diyl, phenanthrene-2,7-diyl, anthracene-2,7-diyl, fluorene-2,7-diyl, coumarine, flavone, where, in addition, one or more CH groups in these groups may be replaced by N, cyclohexane-1,4-diyl, in which, in addition, one or more non-adjacent CH$_2$ groups may be replaced by O and/or S, 1,4-cyclohexenylene, bicyclo[1.1.1]-pentane-1,3-diyl, bicyclo[2.2.2]octane-1,4-diyl, spiro[3.3]heptane-2,6-diyl, piperidine-1,4-diyl, decahydronaphthalene-2,6-diyl, 1,2,3,4-tetrahydronaphthalene-2,6-diyl, indane-2,5-diyl or octahydro-4,7-methanoindane-2,5-diyl, where all these groups may be unsubstituted or mono- or polysubstituted by L, L denotes P, P-Sp-, OH, CH$_2$OH, F, Cl, Br, I, —CN, —NO$_2$, —NCO, —NCS, —OCN, —SCN, —C(=O)N(R$^x$)$_2$, —C(=O)Y$^1$, —C(=O)R$^x$, —N(R$^x$)$_2$, optionally substituted silyl, optionally substituted aryl having 6 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may be replaced by F, Cl, P or P-Sp-, P denotes a polymerisable group, Y$^1$ denotes halogen, R$^x$ denotes P, P-Sp-, H, halogen, straight-chain, branched or cyclic alkyl having 1 to 25 C atoms, in which, in addition, one or more non-adjacent CH$_2$ groups may be replaced by —O—, —S—, —CO—, —CO—O—, —O—CO—, —O—CO—O— in such a way that O and/or S atoms are not linked directly to one another, and in which, in addition, one or more H atoms may be replaced by F, Cl, P or P-Sp-, an optionally substituted aryl or aryloxy group having 6 to 40 C atoms, or an optionally substituted heteroaryl or heteroaryloxy group having 2 to 40 C atoms.

Very particular preference is given to compounds of the formula I in which one of $R^{Ma}$ and $R^{Mb}$ or both denote(s) P or P-Sp-.

Suitable and preferred polymerisable compounds for use in liquid-crystalline media and PS mode displays, preferably PS-VA and PSA displays, according to the invention are selected, for example, from the following formulae:

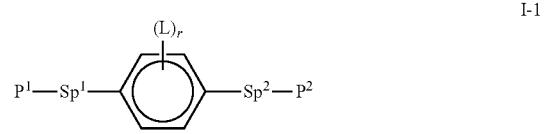

I-1

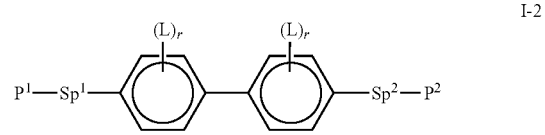

I-2

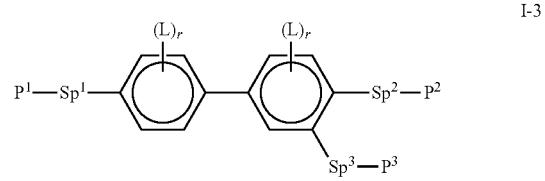

I-3

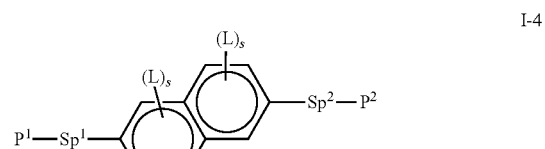

I-4

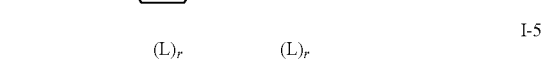

I-5

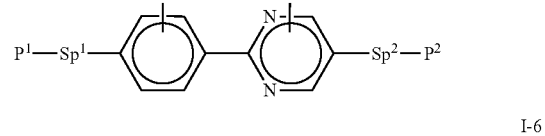

I-6

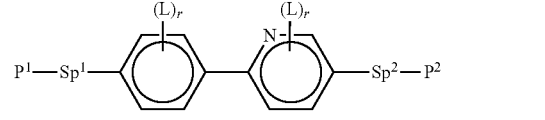

I-7

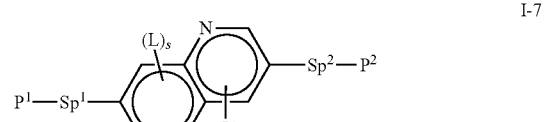

I-8

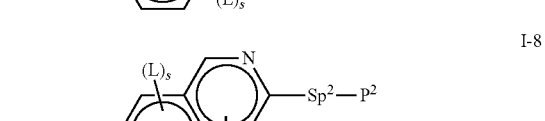

I-9

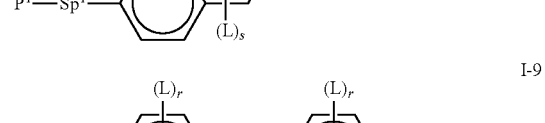

I-10

-continued
I-11
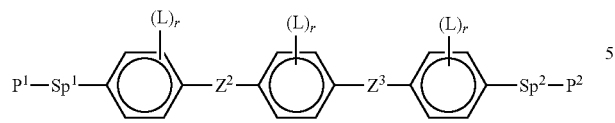
I-12
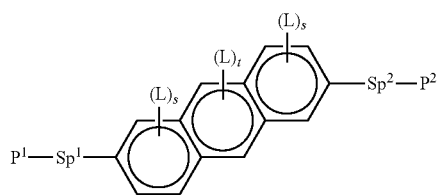
I-13
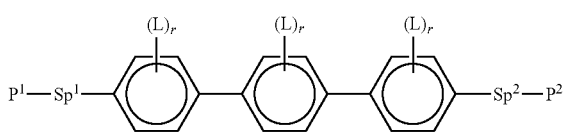
I-14
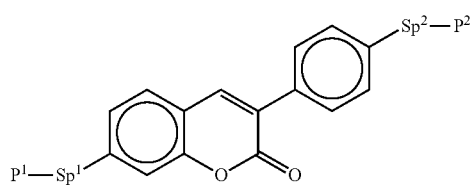
I-15
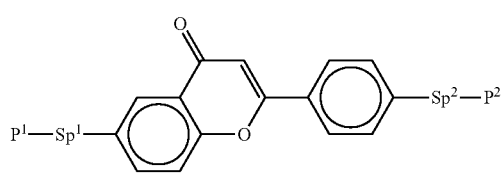
I-16
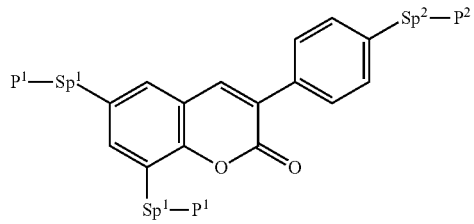
I-17
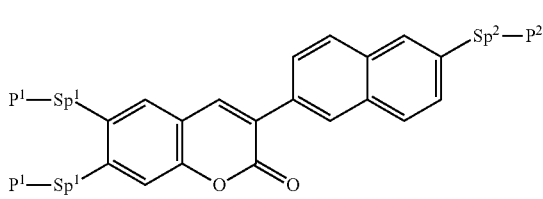
I-18
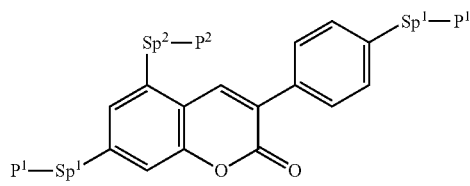
-continued
I-19
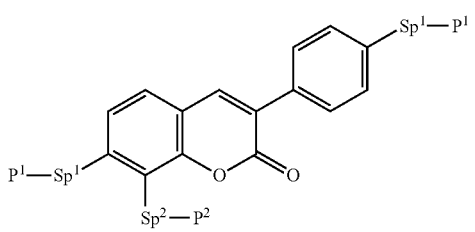
I-20
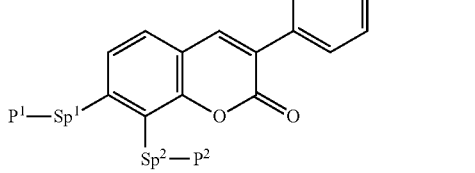
I-21
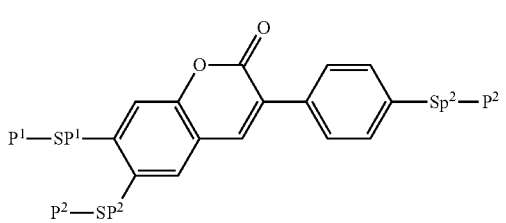
I-22
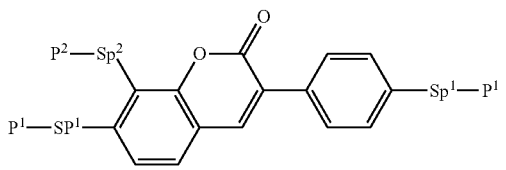
I-23
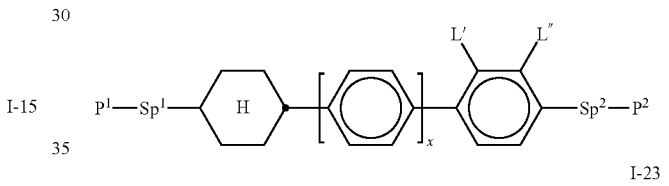
I-24
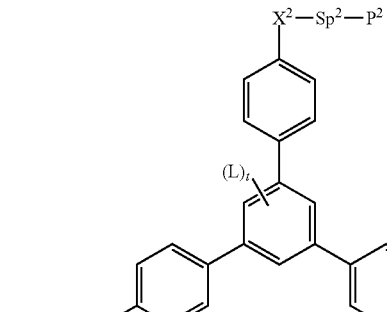
I-25
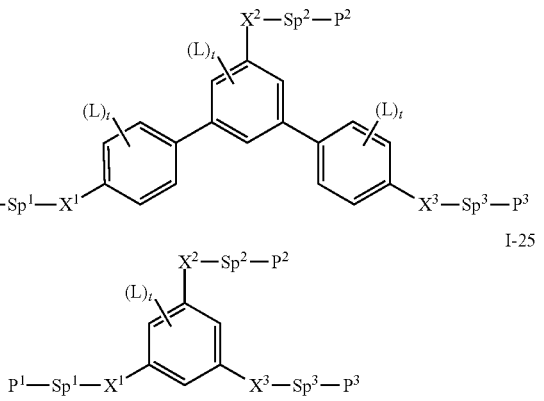

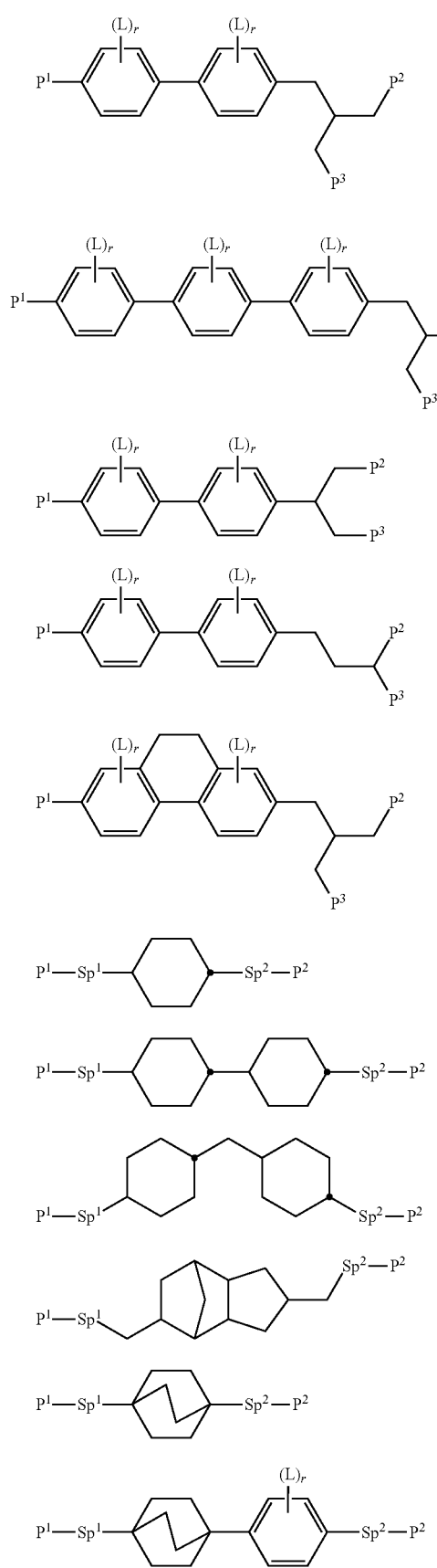
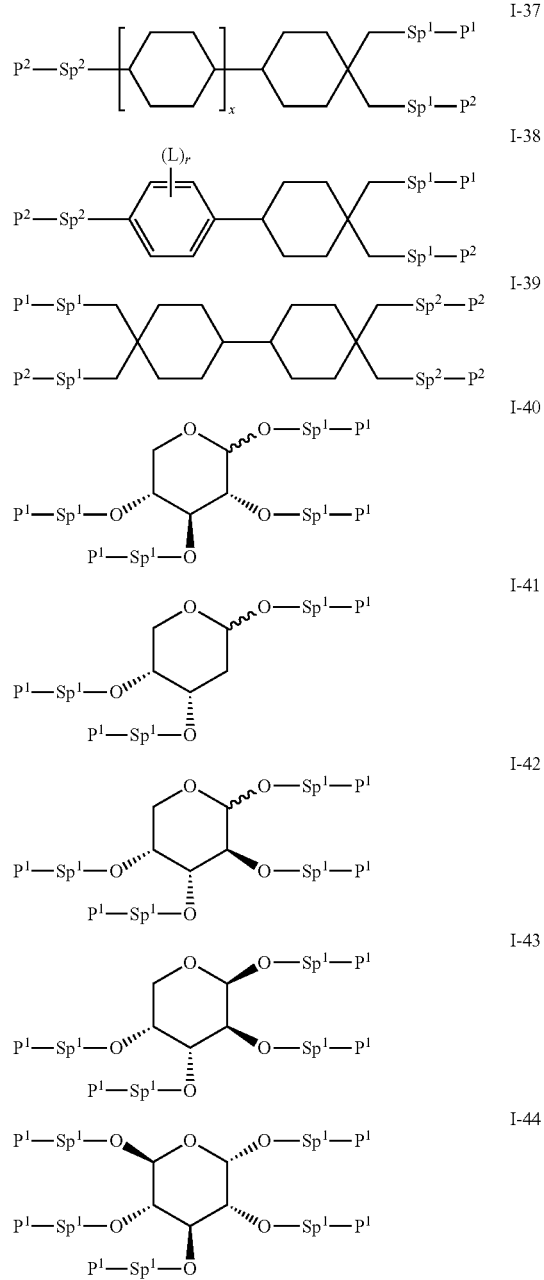

in which the individual radicals have the following meanings:

$P^1$ and $P^2$ each, independently of one another, denote a polymerisable group, preferably having one of the meanings indicated above and below for P, particularly preferably an acrylate, methacrylate, fluoroacrylate, oxetane, vinyloxy or epoxy group, $Sp^1$ and $Sp^2$ each, independently of one another, denote a single bond or a spacer group, preferably having one of the meanings indicated above and below for Sp, and particularly preferably —$(CH_2)_{p1}$—, —$(CH_2)_{p1}$—O—, —$(CH_2)_{p1}$—CO—O— or —$(CH_2)_{p1}$—O—CO—O—, in which p1 is an integer from 1 to 12, and where the linking of the last-mentioned groups to the adjacent ring takes place via the O atom, where one of the radicals $P^1$-$Sp^1$- and $P^2$-$Sp^2$- may also denote $R^{aa}$, $R^{aa}$ denotes H, F, Cl, CN or straight-chain or branched alkyl having 1 to 25 C atoms, in which, in addition, one or more non-adjacent CH$_2$ groups may each be replaced, independently of one another, by —C(R$^0$)=C(R$^{00}$)—, —C≡C—, —N(R$^0$)—, —O—, —S—, —CO—, —CO—O—, —O—CO—, —O—CO—O— in such a way that O and/or S atoms are not linked directly to one another, and in which, in addition, one or more H atoms may be replaced by F, Cl, CN or P$^1$-Sp$^1$-, particularly preferably straight-chain or branched, optionally mono- or polyfluorinated alkyl, alkoxy, alkenyl, alkynyl, alkylcarbonyl, alkoxycarbonyl or alkylcarbonyloxy having 1 to 12 C atoms (where the alkenyl and alkynyl radicals have at least two C atoms and the branched radicals have at least three C atoms), $R^0$, $R^{00}$ each, independently of one another and on each occurrence identically or differently, denote H or alkyl having 1 to 12 C atoms, $R^y$ and $R^z$ each, independently of one another, denote H, F, CH$_3$ or CF$_3$, $Z^1$ denotes —O—, —CO—, —C(R$^y$R$^z$)— or —CF$_2$CF$_2$—, $Z^2$ and $Z^3$ each, independently of one another, denote —CO—O—, —O—CO—, —CH$_2$O—, —OCH$_2$—, —CF$_2$O—, —OCF$_2$— or —(CH$_2$)$_n$—, where n is 2, 3 or 4, L on each occurrence, identically or differently, denotes F, Cl, CN, or straight-chain or branched, optionally mono- or polyfluorinated alkyl, alkoxy, alkenyl, alkynyl, alkylcarbonyl, alkoxycarbonyl or alkylcarbonyloxy having 1 to 12 C atoms, preferably F, L' and L" each, independently of one another, denote H, FCl or CF$_3$, r denotes 0, 1, 2, 3 or 4, s denotes 0, 1, 2 or 3, t denotes 0, 1 or 2, and x denotes 0 or 1.

Especially preferred polymerisable compounds of the formula I are listed in Table D.

The liquid-crystalline media in accordance with the present application preferably contain in total 0.1 to 10%, preferably 0.2 to 4.0%, particularly preferably 0.2 to 2.0%, of at least two polymerisable compounds. Preferred mixtures contain 2, 3 or 4 polymerisable compounds, preferably two polymerisable compounds.

Particular preference is given to the polymerisable compounds of the formula I.

Especially preferred mixtures contain the following two polymerisable compounds

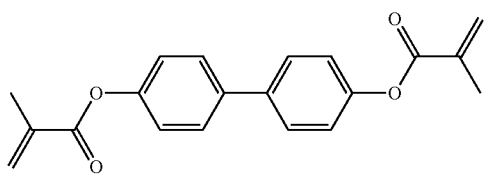

RM-1

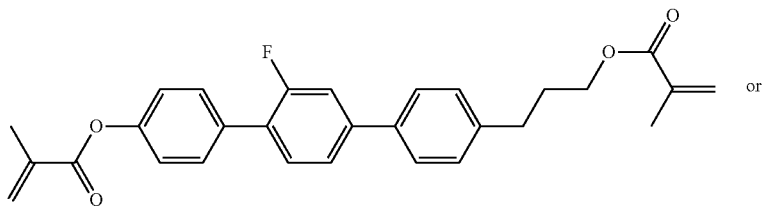

RM-41 or

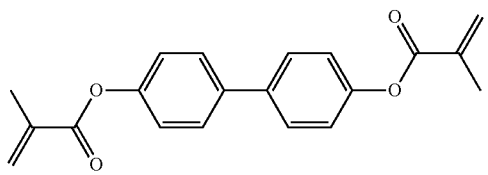

RM-1

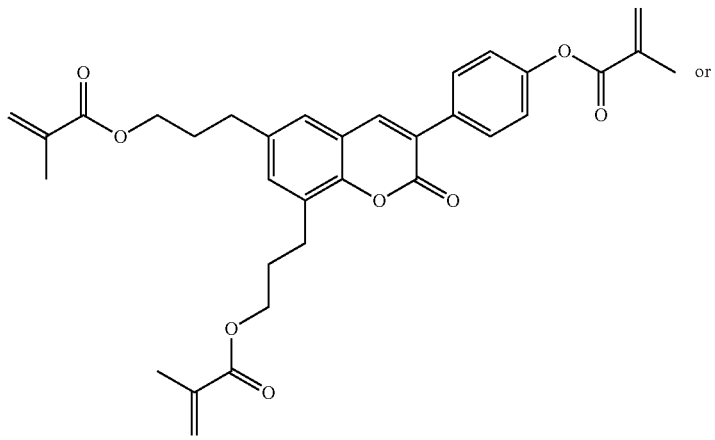

RM-56 or

RM-1
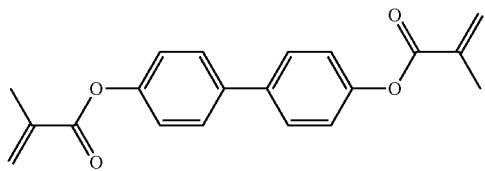

RM-32
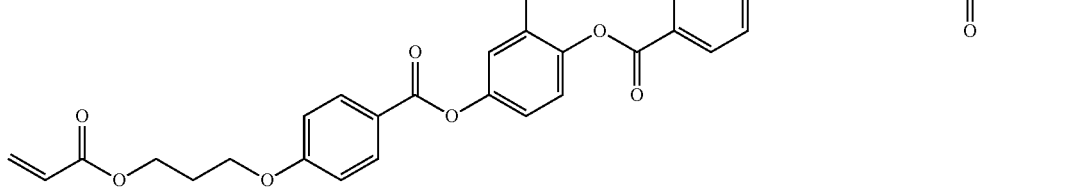
or

RM-15
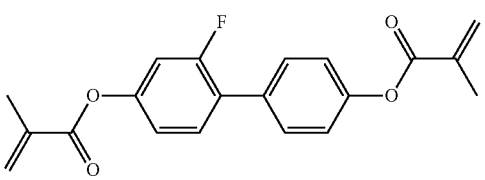

RM-41
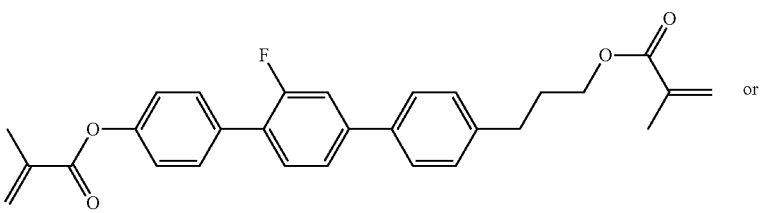
or

RM-17
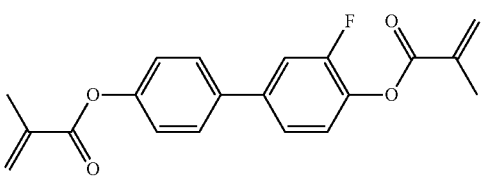

RM-41
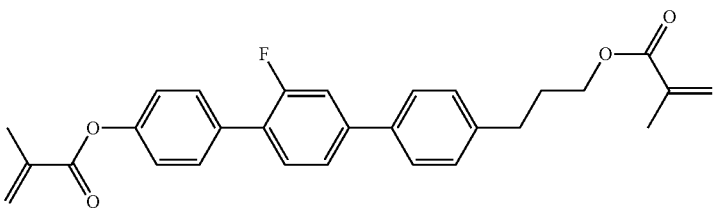

Preferred mixtures contain RM-1 or RM-15 or RM-17 in amounts of 0.1-1.0 wt. %, preferably 0.2-0.5 wt. %, based on the total mixture.

Preferred mixtures contain RM-41 in amounts of 0.1-5 wt. %, preferably 0.2-2.0 wt. %, based on the total mixture.

Preferred mixtures contain RM-56 in amounts of 0.1-5 wt. %, preferably 0.2-2.0 wt. %, based on the total mixture.

Preferred mixtures contain RM-32 in amounts of 0.1-5 wt. %, preferably 0.2-2.0 wt. %, based on the total mixture.

Preferred mixtures which contain two polymerisable compounds, contain RM-1 in amounts of 0.1-1.0 wt. %, preferably 0.2-0.5 wt. % and RM-41 in amounts of 0.1-5 wt. %, preferably 0.2-2.0 wt. %, based on the total mixture.

In another preferred embodiment, the mixtures according to the present invention which contain two polymerisable compounds, contain RM-1 in amounts of 0.1-10 wt. %, preferably 0.2-0.5 wt. % and RM-56 in amounts of 0.1-5 wt. %, preferably 0.2-2.0 wt. %, based on the total mixture.

In another preferred embodiment, the mixtures according to the present invention which contain two polymerisable compounds, contain RM-1 in amounts of 0.1-10 wt. %, preferably 0.2-0.5 wt. % and RM-32 in amounts of 0.1-5 wt. %, preferably 0.2-2.0 wt. %, based on the total mixture.

Preferred mixtures are VA mixtures which contain two polymerisable compounds with different polymerisation reactivity and different miscibility in the LC mixture.

RMs with different UV absorption band show different reactivity under the certain UV exposure. By measurement of the UV-visible spectrum of each RM it is possible to determine the reactivity of each RM.

Preferred mixtures contain at least one RM (RM-A) which is responsible for the building of the RM polymer layer and at least one RM (RM-B) which is responsible for the pre-tilt generation via PS-VA process.

RM-A for polymer layer should be separated from LCs easily, move towards the LC-air interface, and be polymerized by UV exposure to build the polymer layer not polymer network in the bulk. RM-B should be alive during the $1^{st}$ UV exposure for the next PS-VA process.

The mixture according to the present invention contains at least one compound selected from the compounds of the formula IIA, IIB and IIC. The compounds of the formulae IIA, IIB and IIC have a broad range of applications. Depending on the choice of substituents, they can serve as base materials of which liquid-crystalline media are predominantly composed; however, liquid-crystalline base materials from other classes of compound can also be added to the compounds of the formulae IIA, IIB, IIC in order, for example, to modify the dielectric and/or optical anisotropy of a dielectric of this type and/or to optimise its transmittance, threshold voltage and/or its viscosity.

In the pure state, the compounds of the formulae IIA, IIB and IIC are colourless and form liquid-crystalline mesophases in a temperature range which is favourably located for electro-optical use. They are stable chemically, thermally and to light.

The compounds of the formulae IIA, IIB and IIC are prepared by methods known per se, as described in the literature (for example in the standard works, such as Houben-Weyl, Methoden der organischen Chemie [Methods of Organic Chemistry], Georg-Thieme-Verlag, Stuttgart), to be precise under reaction conditions which are known and suitable for the said reactions. Use can also be made here of variants known per se, which are not mentioned here in greater detail.

The compounds of the formulae IIA, IIB and IIC are known, for example, from EP 0 364 538 and U.S. Pat. No. 5,273,680.

If $R^{2A}$, $R^{2B}$ and $R^{2C}$ in the formulae above and below denote an alkyl radical and/or an alkoxy radical, this may be straight-chain or branched. It is preferably straight-chain, has 2, 3, 4, 5, 6 or 7 C atoms and accordingly preferably denotes ethyl, propyl, butyl, pentyl, hexyl, heptyl, ethoxy, propoxy, butoxy, pentoxy, hexyloxy or heptyloxy, furthermore methyl, octyl, nonyl, decyl, undecyl, dodecyl, tridecyl, tetradecyl, pentadecyl, methoxy, octyloxy, nonyloxy, decyloxy, undecyloxy, dodecyloxy, tridecyloxy or tetradecyloxy. $R^{2A}$, $R^{2B}$ and $R^{2C}$ in the formulae above and below preferably denote straight-chain alkyl having 2-6 C atoms.

Oxaalkyl preferably denotes straight-chain 2-oxapropyl (=methoxymethyl), 2-(=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, 2-, 3-, 4-, 5-, 6-, 7-, 8- or 9-oxadecyl.

If $R^{2A}$, $R^{2B}$ and $R^{2C}$ denote an alkyl radical in which one $CH_2$ group has been replaced by $—CH=CH—$, this may be straight-chain or branched. It is preferably straight-chain and has 2 to 10 C atoms. Accordingly, it denotes, in particular, vinyl, prop-1- or -2-enyl, but-1-, -2- or -3-enyl, pent-1-, -2-, -3- or -4-enyl, hex-1-, -2-, -3-, -4- or -5-enyl, hept-1-, -2-, -3-, -4-, -5- or -6-enyl, oct-1-, -2-, -3-, -4-, -5-, -6- or -7-enyl, non-1-, -2-, -3-, -4-, -5-, -6-, -7- or -8-enyl, dec-1-, -2-, -3-, -4-, -5-, -6-, -7-, -8- or -9-enyl.

If $R^{2A}$, $R^{2B}$ and $R^{2C}$ denote an alkyl or alkenyl radical which is at least monosubstituted by halogen, this radical is preferably straight-chain, and halogen is preferably F or Cl. In the case of polysubstitution, halogen is preferably F. The resultant radicals also include perfluorinated radicals. In the case of monosubstitution, the fluorine or chlorine substituent may be in any desired position, but is preferably in the co-position.

In the compounds of the formulae IIA and IIB, $Z^2$ may have identical or different meanings. In the compounds of the formula IIB, $Z^2$ and $Z^{2'}$ may have identical or different meanings.

In the compounds of the formulae IIA, IIB and IIC, $R^{2A}$, $R^{2B}$ and $R^{2C}$ each preferably denote alkyl having 1-6 C atoms, in particular $CH_3$, $C_2H_5$, n-$C_3H_7$, n-$C_4H_9$, n-$C_5H_{11}$.

In the compounds of the formulae IIA, IIB and IIC, $L^1$, $L^2$, $L^3$, $L^4$, $L^5$ and $L^6$ preferably denote $L^1=L^2=F$ and $L^5=L^6=F$ and $L^3=L^4=H$, furthermore $L^1=F$ and $L^2=Cl$ or $L^1=Cl$ and $L^2=F$, $L^3=L^4=F$ and $L^6=F$ and $L^5=H$. $Z^2$ and $Z^{2'}$ in the formulae IIA and IIB preferably each, independently of one another, denote a single bond, furthermore a $—CH_2O—$ or $—C_2H_4—$ bridge.

In the compounds of the formulae IIA and IIB, $Z^2$ may have identical or different meanings. In the compounds of the formula IIB, $Z^2$ and $Z^{2'}$ may have identical or different meanings.

If in the formula IIB $Z^2=—C_2H_4—$, $—CH_2O—$, $—COO—$ or $—CH=CH—$, $Z^{2'}$ is preferably a single bond or, if $Z^{2'}=—C_2H_4—$, $—CH_2O—$, $—COO—$ or $—CH=CH—$, $Z^2$ is preferably a single bond. In the compounds of the formulae IIA and IIB, $(O)C_vH_{2v+1}$ preferably denotes $OC_vH_{2v+1}$, furthermore $C_vH_{2v+1}$. In the compounds of the formula IIC, $(O)C_vH_{2v+1}$ preferably denotes $C_vH_{2v+1}$. In the compounds of the formula IIC, $L^3$ and $L^4$ preferably each denote F.

Preferred compounds of the formulae IIA, IIB and IIC are indicated below:

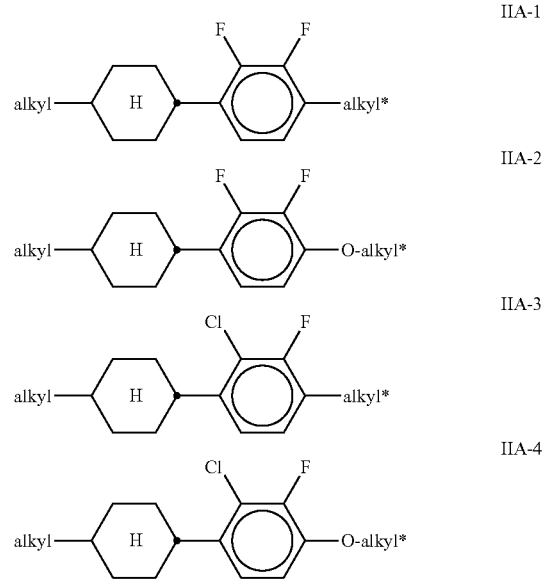

-continued
IIA-5
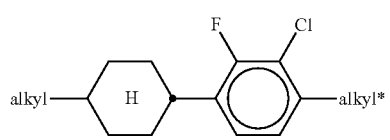
IIA-6
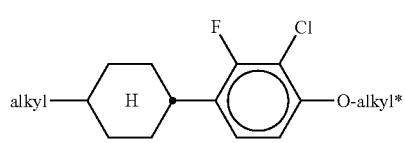
IIA-7
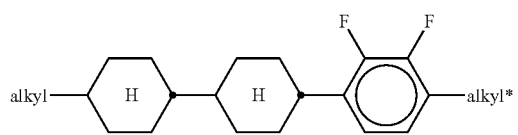
IIA-8
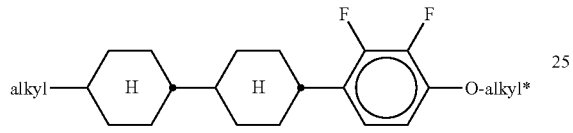
IIA-9
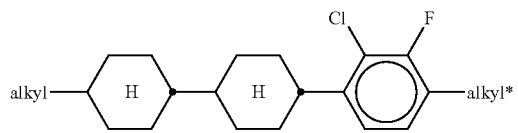
IIA-10
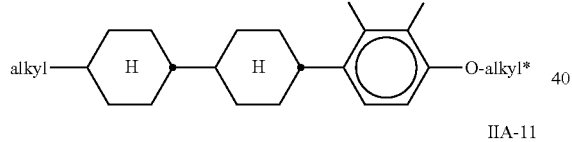
IIA-11
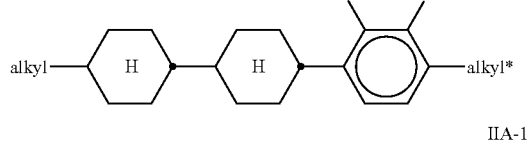
IIA-12
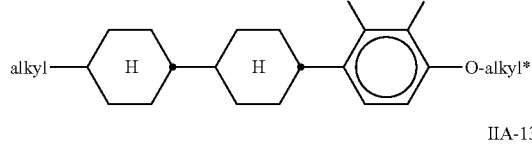
IIA-13
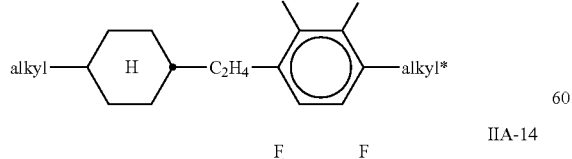
IIA-14
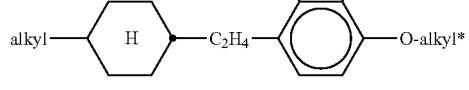
-continued
IIA-15
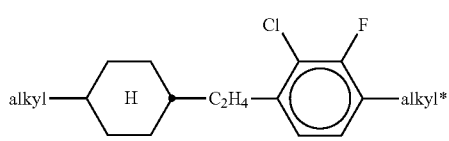
IIA-16
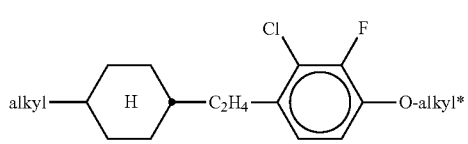
IIA-17
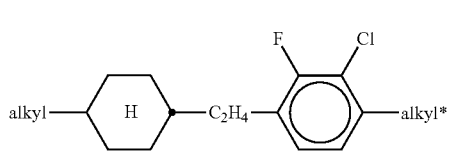
IIA-18
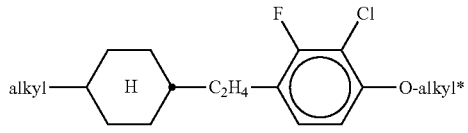
IIA-19
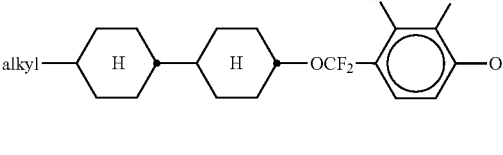
IIA-20
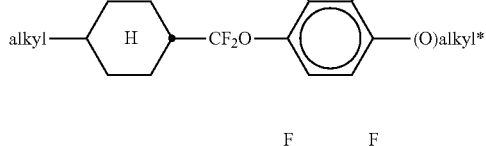
IIA-21
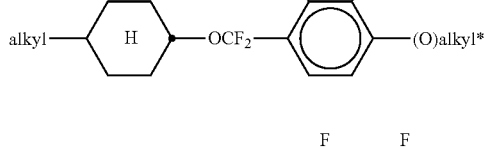
IIA-22
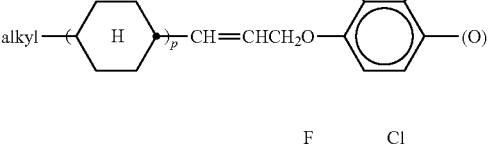
IIA-23
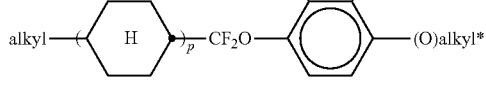
IIA-24

IIA-25
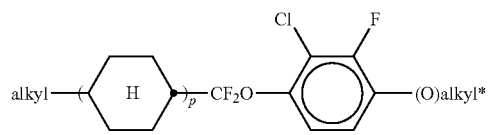
IIA-26
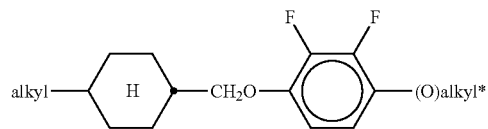
IIA-27
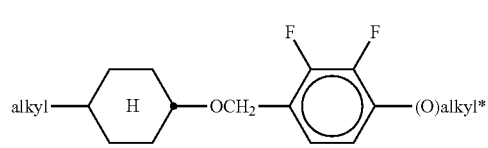
IIA-28
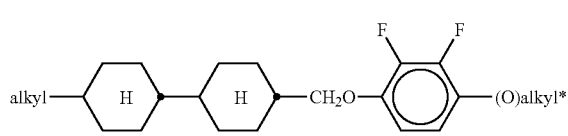
IIA-29
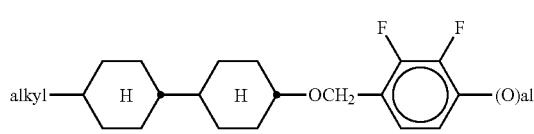
IIA-30
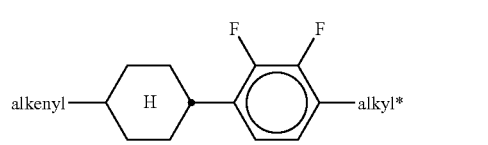
IIA-31
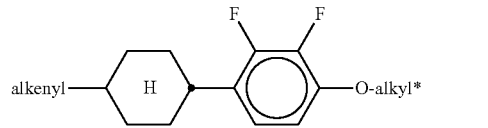
IIA-32
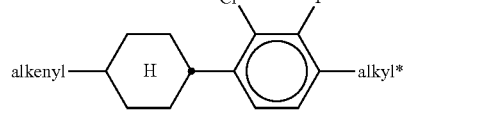
IIA-33
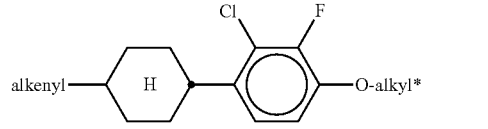
IIA-34
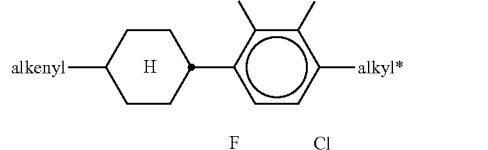
IIA-35
IIA-36
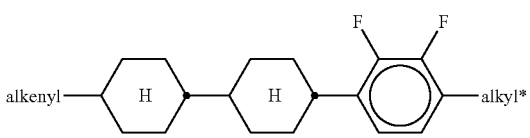
IIA-37
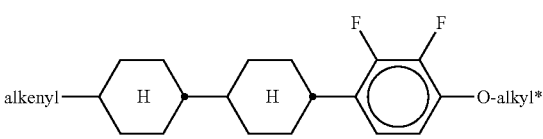
IIA-38
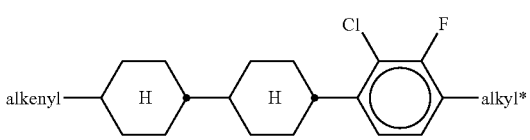
IIA-39
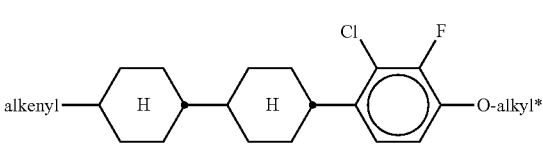
IIA-40
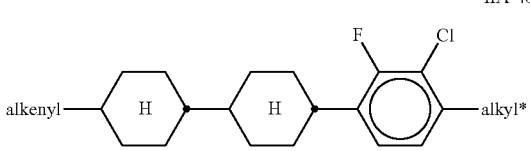
IIA-41
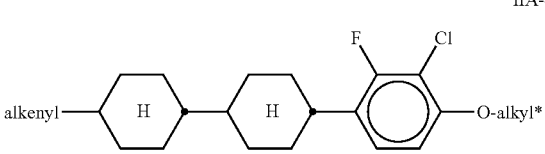
IIA-42
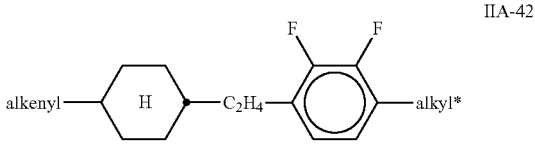
IIA-43
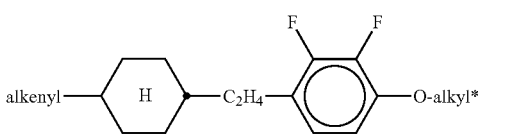
IIA-44
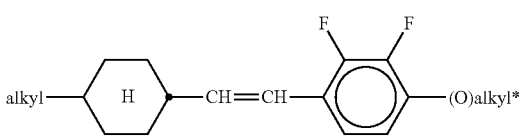
IIA-45
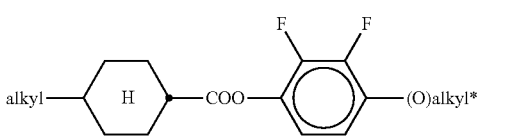

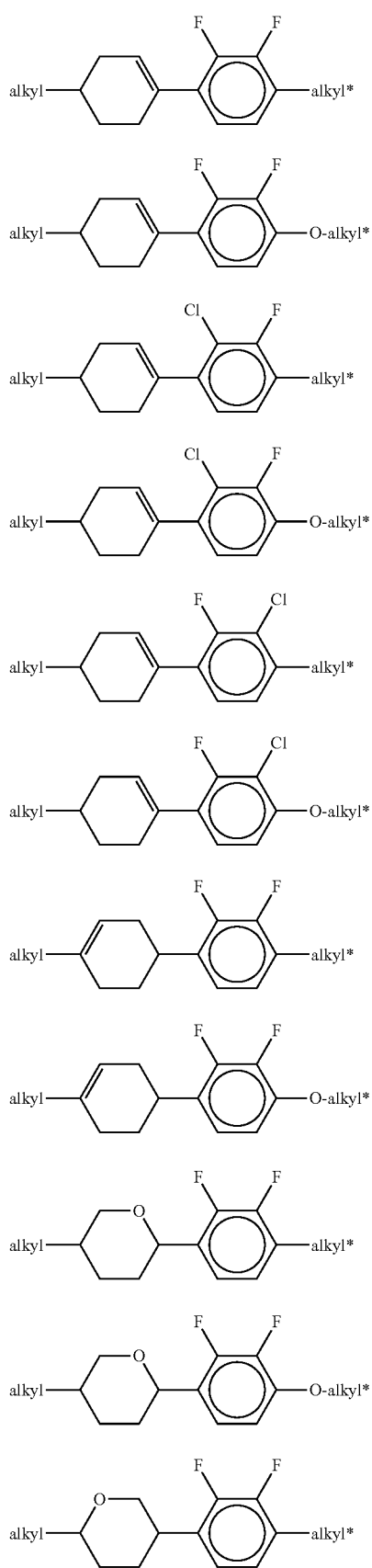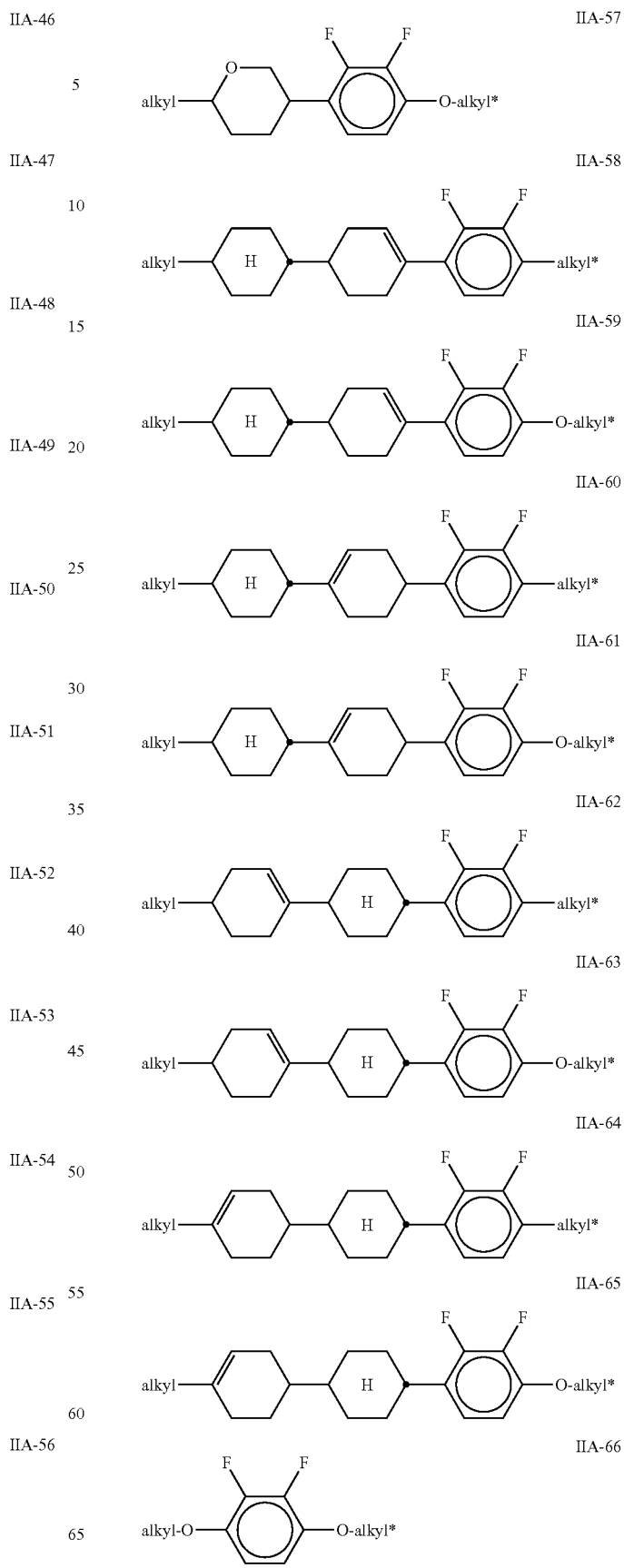

IIA-67
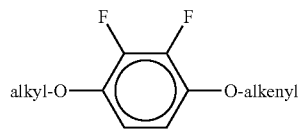
IIB-1
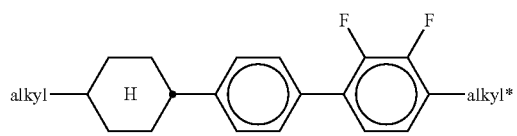
IIB-2
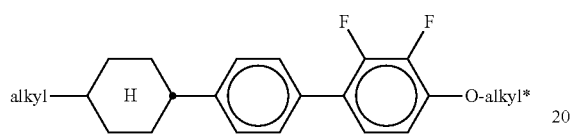
IIB-3
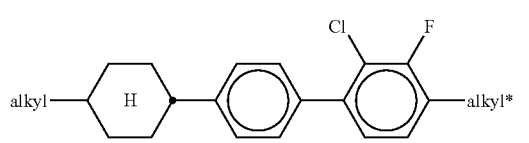
IIB-4
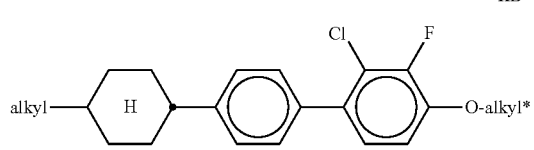
IIB-5
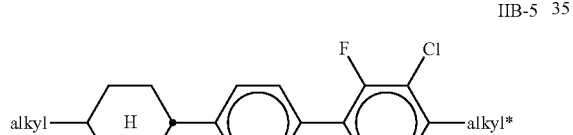
IIB-6
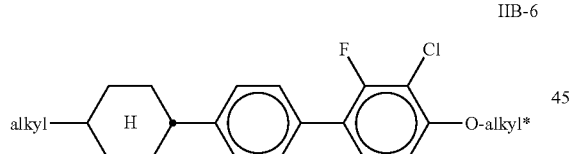
IIB-7
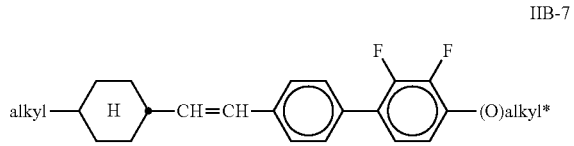
IIB-8
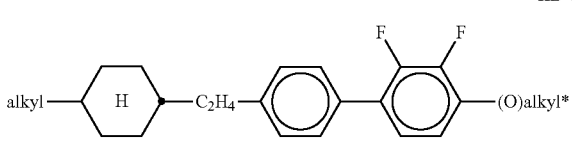
IIB-9
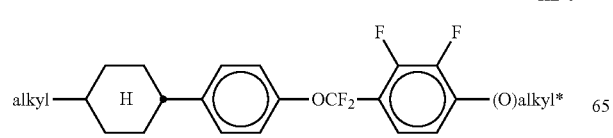
IIB-10
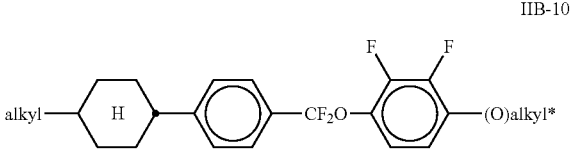
IIB-11
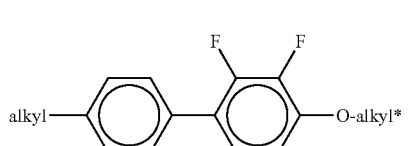
IIB-12
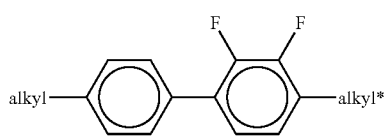
IIB-13
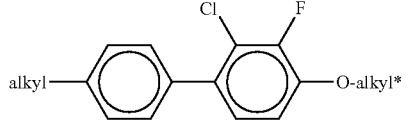
IIB-14
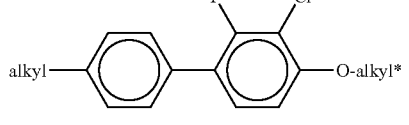
IIB-15
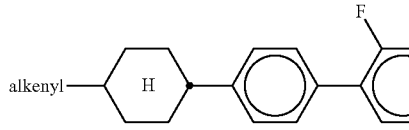
IIB-16
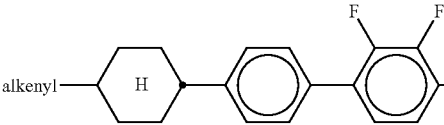
IIC-1
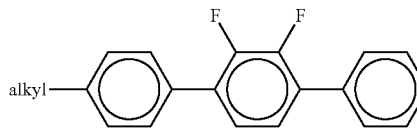
IIC-2
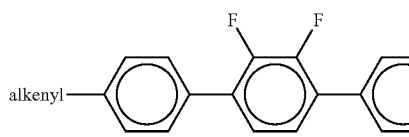
IIC-3
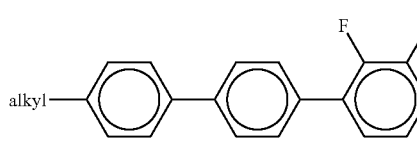

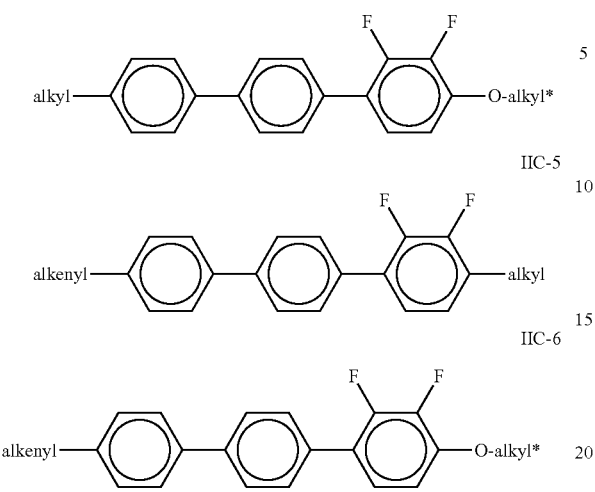

in which alkyl and alkyl* each, independently of one another, denote a straight-chain alkyl radical having 1-6 C atoms and alkenyl denotes a straight-chain alkenyl radical having 2-6 C atoms.

Particularly preferred mixtures according to the invention contain one or more compounds of the formulae IIA-2, IIA-8, IIA-14, IIA-26, IIA-29, IIA-35, IIA-45, IIA-57, IIB-2, IIB-11, IIB-16 and IIC-1.

The proportion of compounds of the formulae IIA, IIB and/or IIC in the mixture as a whole is preferably 3-40%, preferably 5-30% by weight, most preferably 3-20%, by weight.

Particularly preferred media according to the invention contain at least one compound of the formula IIC-1,

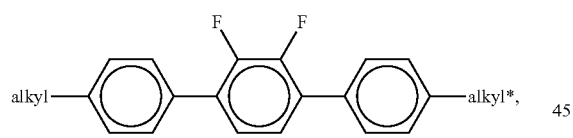

in which alkyl and alkyl* have the meanings indicated above, preferably in amounts of ≥3% by weight, in particular ≥5% by weight and particularly preferably 5-15% by weight.

Preferred mixtures contain one or more compounds of the formula IIA-66 and/or IIA-67:

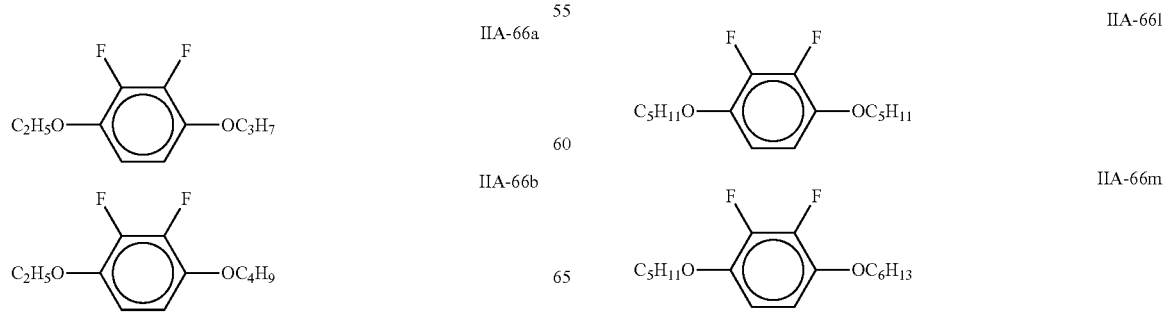

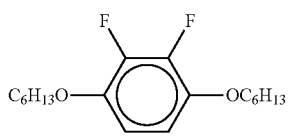
IIA-66n

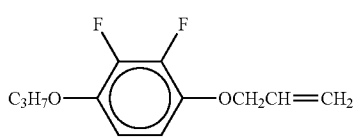
IIA-67a

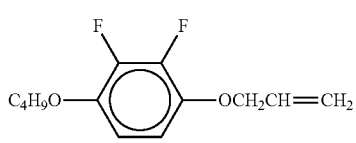
IIA-67b

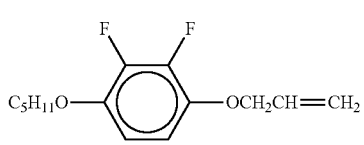
IIA-67c

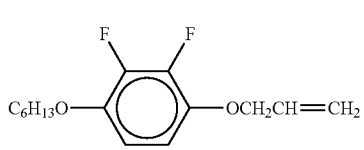
IIA-67d

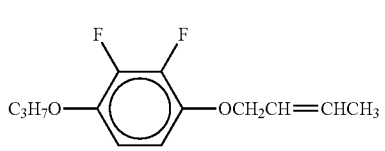
IIA-67e

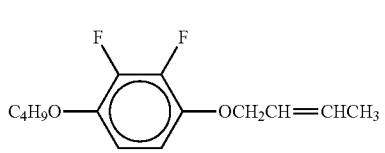
IIA-67f

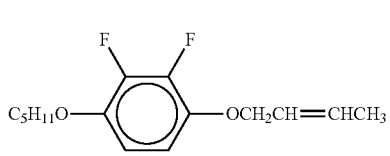
IIA-67g

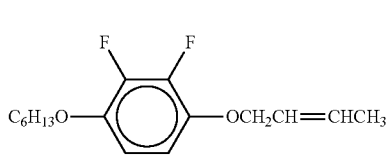
IIA-67h

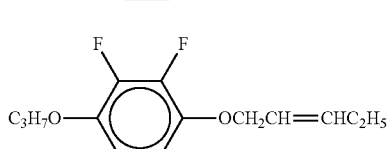
IIA-67i

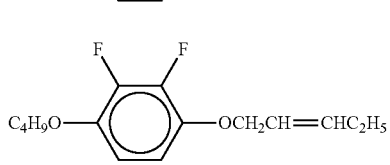
IIA-67j

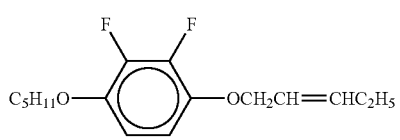
IIA-67k

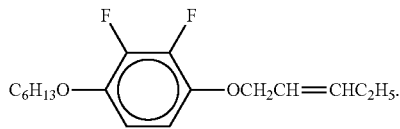
IIA-67l

Preferred mixtures contain at least one compound of the formula IIA-66a to IIA-66n.

Preferred mixtures contain one or more tolan compound(s) of the formula IIB-T1 and IIB-T2,

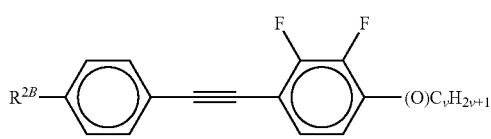
IIB-T1

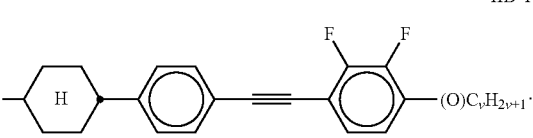
IIB-T2

The mixtures according to the invention additionally can contain at least one compound of the formula To-1

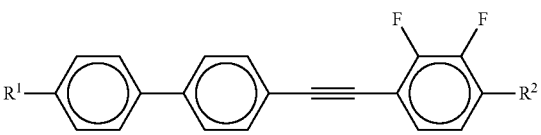
To-1 in which $R^1$ has the meaning for $R^{2A}$ and $R^2$ has the meaning of $(O)C_vH_{2v+1}$. $R^1$ preferably denotes straight-chain alkyl having 1-6 C atoms. $R^2$ preferably denotes alkoxy having 1-5 C atoms, in particular $OC_2H_5$, $OC_3H_7$, $OC_4H_9$, $OC_5H_{11}$, furthermore $OCH_3$.

The compounds of the formulae IIB-T1 and IIB-T2 are preferably employed in concentrations of 3-25% by weight, in particular 5-15% by weight based on the total mixture.

Preferred embodiments of the liquid-crystalline medium according to the invention are indicated below:
a) Liquid-crystalline medium which additionally contains two or more compounds selected from the group of the compounds of the formulae IIA, IIB and IIC.
b) Liquid-crystalline medium which additionally contains one or more compounds of the formula III,

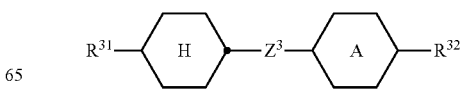
III in which

R$^{31}$ and R$^{32}$ each, independently of one another, denote a straight-chain alkyl, alkoxyalkyl or alkoxy radical having up to 12 C atoms, and

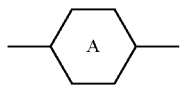

denotes

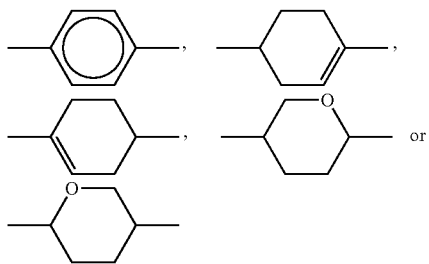

Z$^3$ denotes a single bond, —CH$_2$CH$_2$—, —CH═CH—, —CF$_2$O—, —OCF$_2$—, —CH$_2$O—, —OCH$_2$—, —COO—, —OCO—, —C$_2$F$_4$—, —C$_4$H$_8$—, —CF═CF—.

Preferred compounds of the formula III are indicated below:

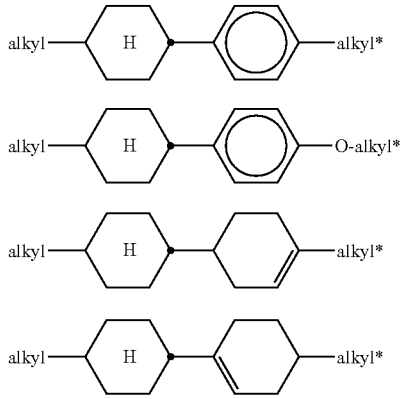

IIIa
IIIb
IIIc
IIId in which alkyl and alkyl* each, independently of one another, denote a straight-chain alkyl radical having 1-6 C atoms.

The medium according to the invention preferably contains at least one compound of the formula IIIa and/or formula IIIb.

The proportion of compounds of the formula III in the mixture as a whole is preferably at least 5% by weight.

c) Liquid-crystalline medium additionally containing a compound of the formula

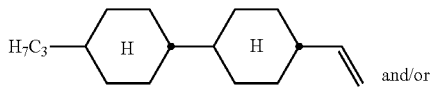

and/or

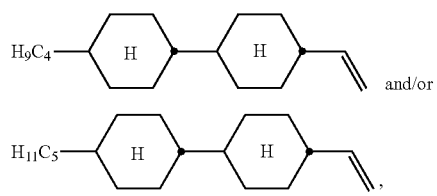

and/or preferably in total amounts of ≥5% by weight, in particular ≥10% by weight.

Preference is furthermore given to mixtures according to the invention containing the compound

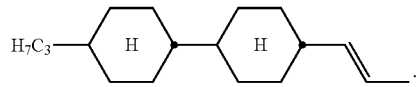

d) Liquid-crystalline medium which additionally contains one or more tetracyclic compounds of the formulae

V-1

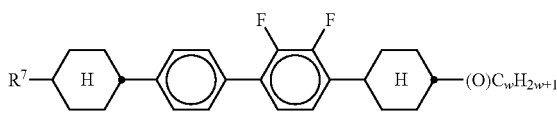

V-2

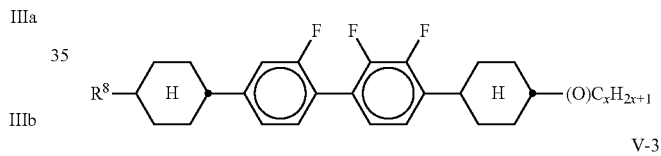

V-3

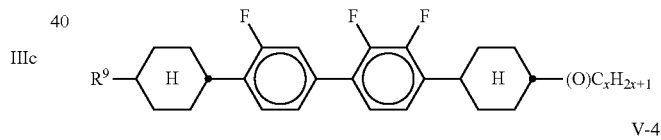

V-4

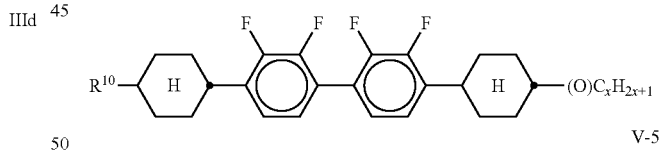

V-5

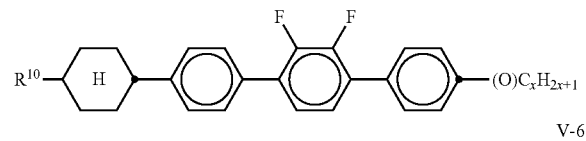

V-6

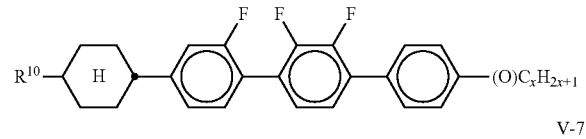

V-7

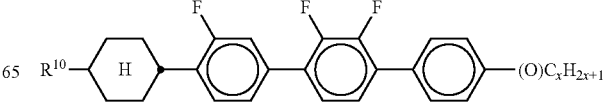

-continued

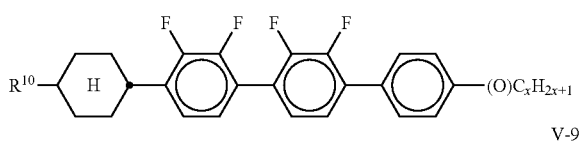
V-8

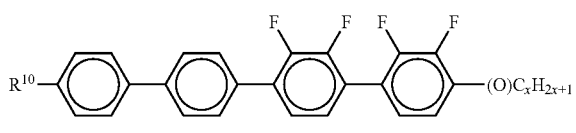
V-9 in which

R$^{7-10}$ each, independently of one another, have one of the meanings indicated for R$^{2,4}$ in claim 2, and w and x each, independently of one another, denote 1 to 6.

Particular preference is given to mixtures containing at least one compound of the formula V-9.

e) Liquid-crystalline medium which additionally contains one or more compounds of the formulae Y-1 to Y-6,

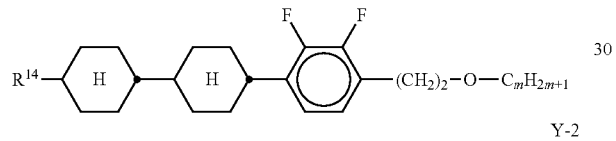
Y-1

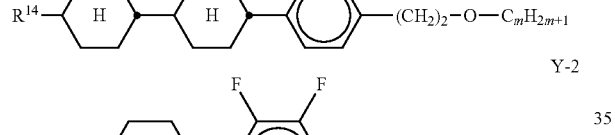
Y-2

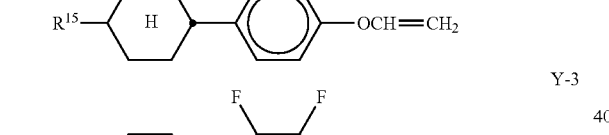
Y-3

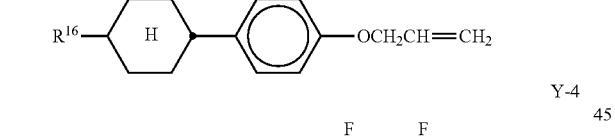
Y-4

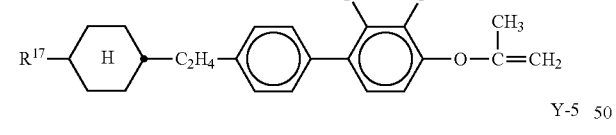
Y-5

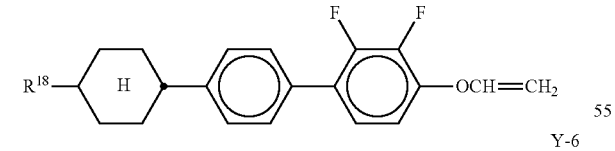
Y-6 in which R$^{14}$-R$^{19}$ each, independently of one another, denote an alkyl or alkoxy radical having 1-6 C atoms; z and m each, independently of one another, denote 1-6; x denotes 0, 1, 2 or 3.

The medium according to the invention particularly preferably contains one or more compounds of the formulae Y-1 to Y-6, preferably in amounts of 5% by weight.

f) Liquid-crystalline medium additionally containing one or more fluorinated terphenyls of the formulae T-1 to T-21,

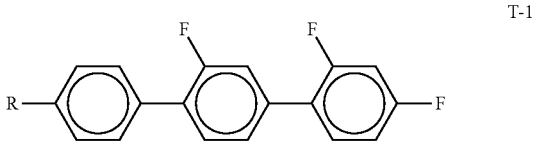
T-1

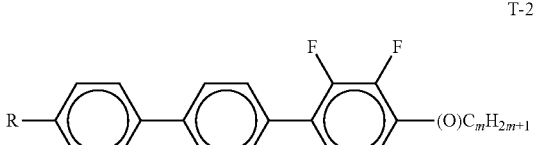
T-2

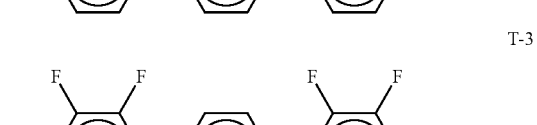
T-3

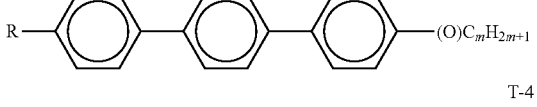
T-4

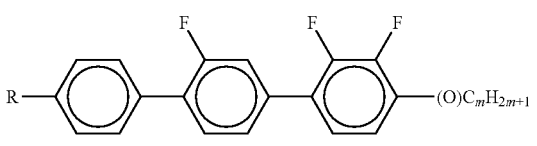
T-5

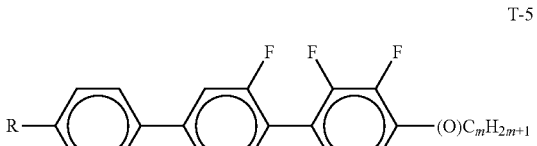
T-6

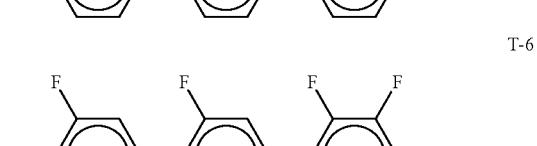
T-7

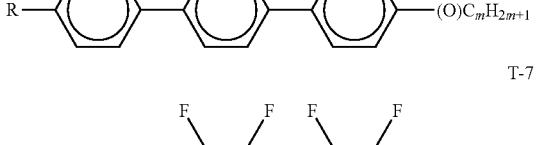
T-8

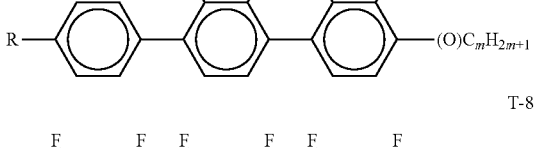
T-9

T-10
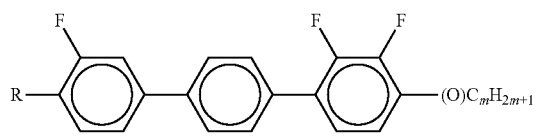

T-11
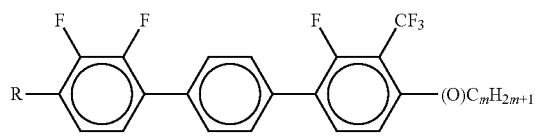

T-12
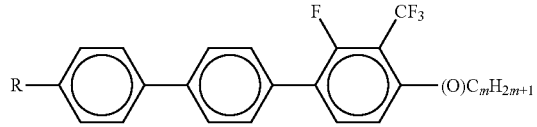

T-13
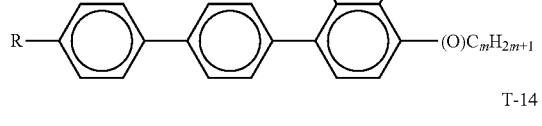

T-14
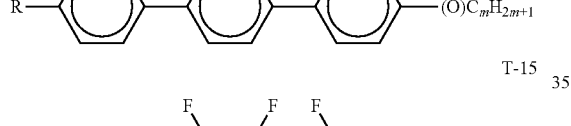

T-15
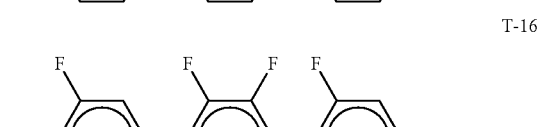

T-16
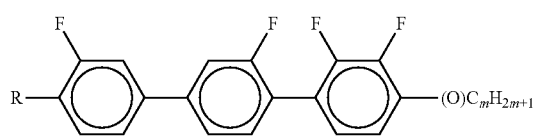

T-17
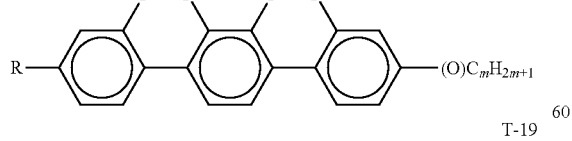

T-18

T-19

T-20
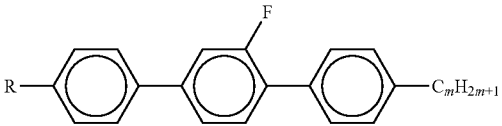

T-21
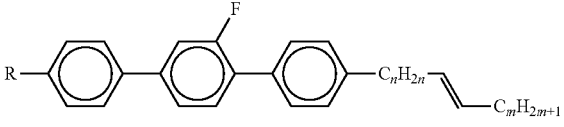

in which
R denotes a straight-chain alkyl or alkoxy radical having 1-7 C atoms, and m=0, 1, 2, 3, 4, 5 or 6 and n denotes 0, 1, 2, 3 or 4.
R preferably denotes methyl, ethyl, propyl, butyl, pentyl, hexyl, methoxy, ethoxy, propoxy, butoxy, pentoxy.
The medium according to the invention preferably contains the terphenyls of the formulae T-1 to T-21 in amounts of 2-30% by weight, in particular 5-20% by weight.
Particular preference is given to compounds of the formulae T-1, T-2, T-20 and T-21. In these compounds, R preferably denotes alkyl, furthermore alkoxy, each having 1-5 C atoms. In the compounds of the formula T-20, R preferably denotes alkyl or alkenyl, in particular alkyl. In the compound of the formula T-21, R preferably denotes alkyl.
The terphenyls are preferably employed in the mixtures according to the invention if the Δn value of the mixture is to be ≥0.1. Preferred mixtures contain 2-20% by weight of one or more terphenyl compounds selected from the group of the compounds T-1 to T-21.

g) Liquid-crystalline medium additionally containing one or more biphenyls of the formulae B-1 to B-3, B-1
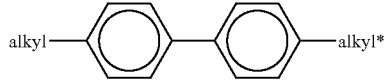

B-2
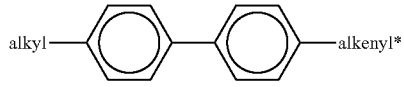

B-3
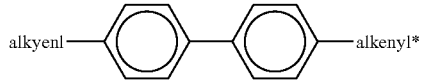

in which
alkyl and alkyl* each, independently of one another, denote a straight-chain alkyl radical having 1-6 C atoms, and
alkenyl and alkenyl* each, independently of one another, denote a straight-chain alkenyl radical having 2-6 C atoms.
The proportion of the biphenyls of the formulae B-1 to B-3 in the mixture as a whole is preferably at least 3% by weight, in particular ≥5% by weight.
Of the compounds of the formulae B-1 to B-3, the compounds of the formula B-2 are particularly preferred.

Particularly preferred biphenyls are

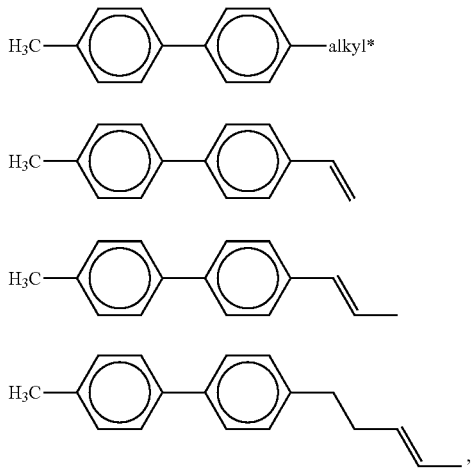

in which alkyl* denotes an alkyl radical having 1-6 C atoms. The medium according to the invention particularly preferably contains one or more compounds of the formulae B-1a and/or B-2c.

h) Liquid-crystalline medium containing at least one compound of the formulae Z-1 to Z-7,

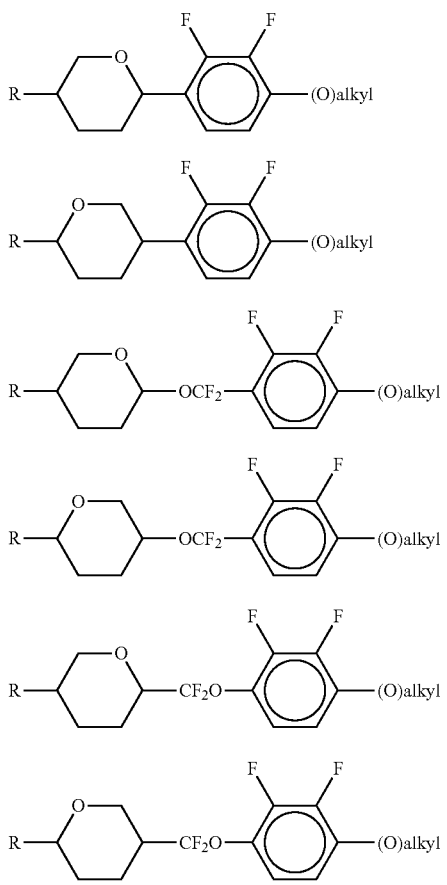

in which R and alkyl have the meanings indicated above.

i) Liquid-crystalline medium containing at least one compound of the formulae O-1 to O-16,

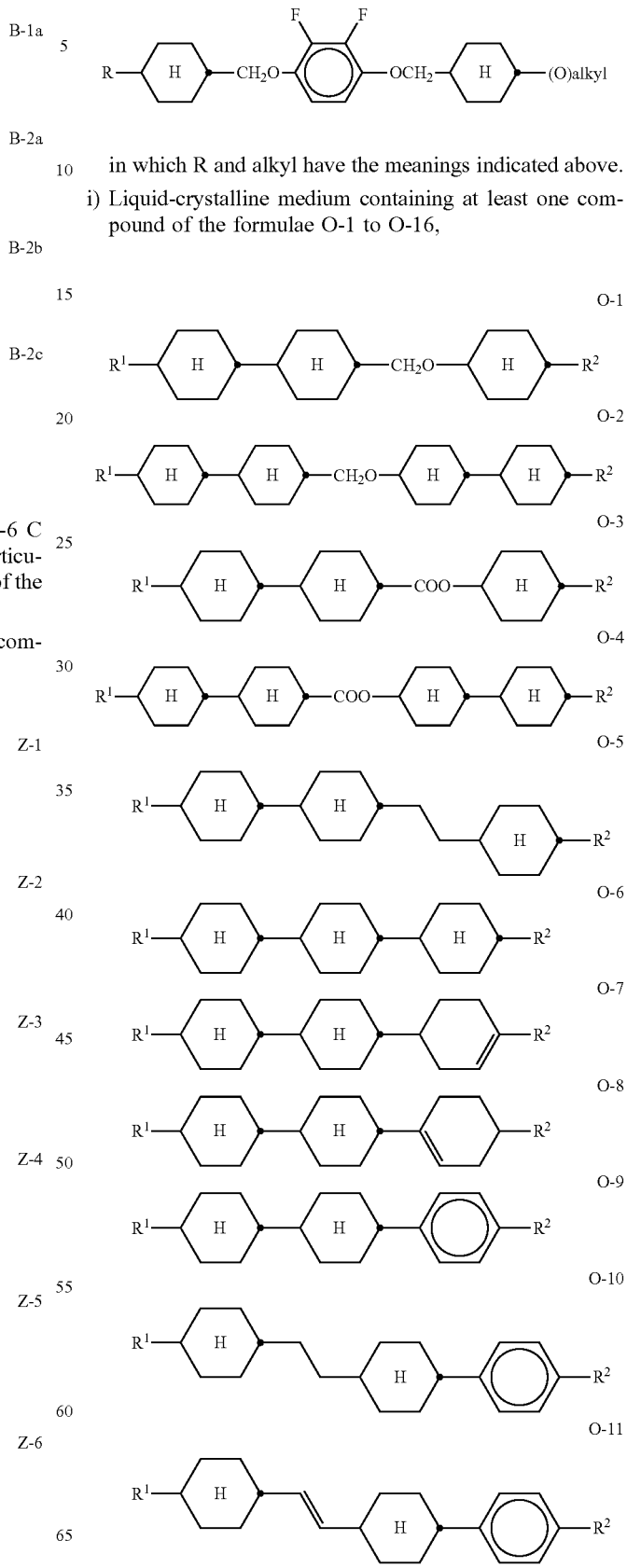

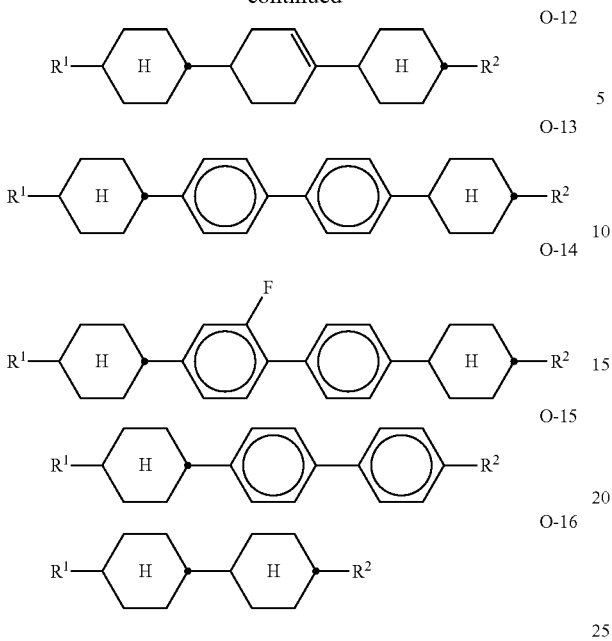

in which $R^1$ and $R^2$ have the meanings indicated for $R^{2A}$. $R^1$ and $R^2$ preferably each, independently of one another, denote straight-chain alkyl.

Preferred media contain one or more compounds of the formulae O-1, O-3, O-4, O-5, O-9, O-13, O-14, O-15 and/or O-16.

Mixtures according to the invention very particularly preferably contain the compounds of the formula O-9, O-15 and/or O-16, in particular in amounts of 5-30%.

Preferred compounds of the formulae O-15 and O-16 are indicated below:

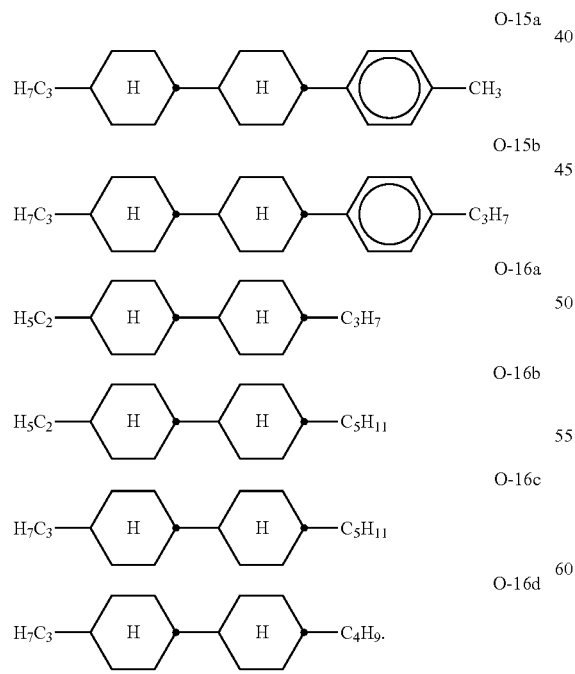

The medium according to the invention particularly preferably contains the tricyclic compounds of the formula O-15a and/or of the formula O-15b in combination with one or more bicyclic compounds of the formulae O-16a to O-16d. The total proportion of the compounds of the formulae O-15a and/or O-15b in combination with one or more compounds selected from the bicyclic compounds of the formulae O-16a to O-16d is 5-40%, very particularly preferably 15-35%.

Very particularly preferred mixtures contain compounds O-15a and O-16a:

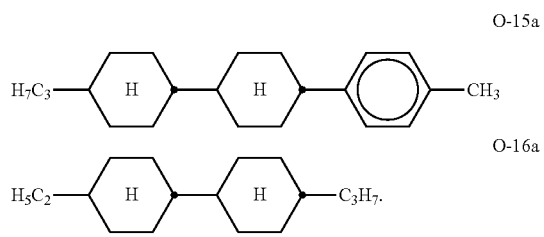

Compounds O-15a and O-16a are preferably present in the mixture in a concentration of 15-35%, particularly preferably 15-25% and especially preferably 18-22%, based on the mixture as a whole.

Very particularly preferred mixtures contain compounds O-15b and O-16a:

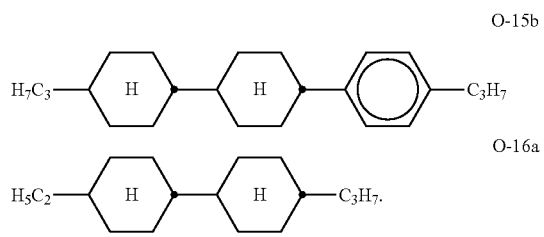

Compounds O-15b and O-16a are preferably present in the mixture in a concentration of 15-35%, particularly preferably 15-25% and especially preferably 18-22%, based on the mixture as a whole.

Very particularly preferred mixtures contain the following three compounds:

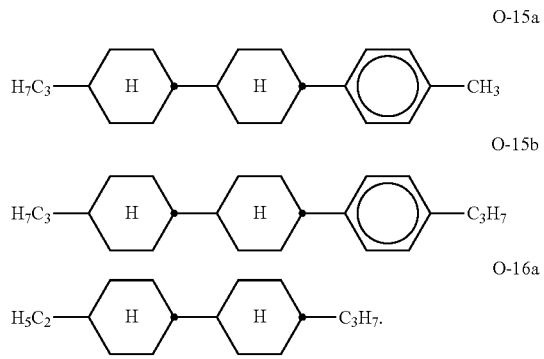

Compounds O-15a, O-15b and O-16a are preferably present in the mixture in a concentration of 15-35%, particularly preferably 15-25% and especially preferably 18-22%, based on the mixture as a whole.

j) Preferred liquid-crystalline media according to the invention contain one or more substances which contain a tetrahydronaphthyl or naphthyl unit, such as, for example, the compounds of the formulae N-1 to N-5,

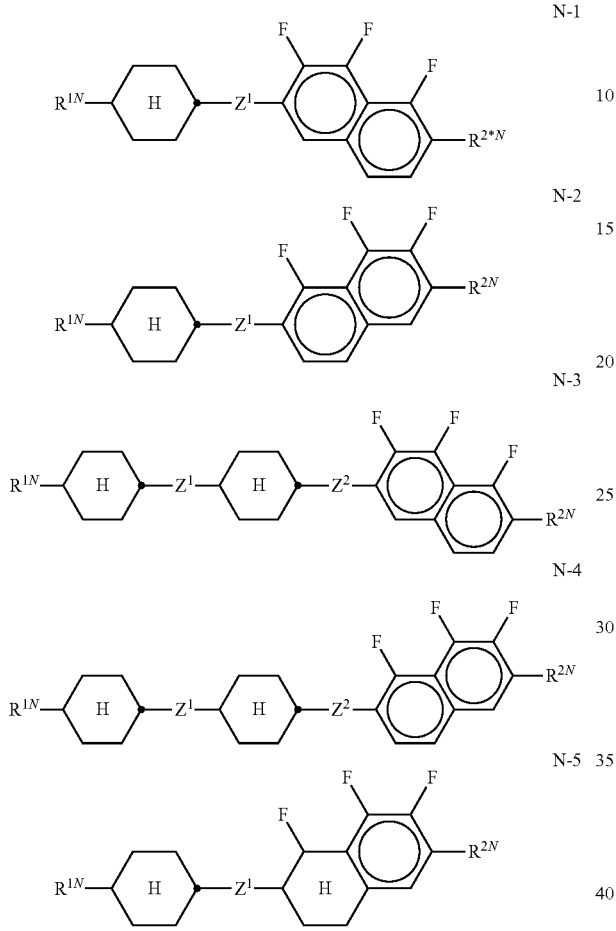

in which $R^{1N}$ and $R^{2N}$ each, independently of one another, have the meanings indicated for $R^{2A}$, preferably denote straight-chain alkyl, straight-chain alkoxy or straight-chain alkenyl, and $Z^1$ and $Z^2$ each, independently of one another, denote —$C_2H_4$—, —CH=CH—, —$(CH_2)_4$—, —$(CH_2)_3O$—, —$O(CH_2)_3$—, —CH=CH$CH_2CH_2$—, —$CH_2CH_2$CH=CH—, —$CH_2O$—, —$OCH_2$—, —COO—, —OCO—, —$C_2F_4$—, —CF=CF—, —CF=CH—, —CH=CF—, —$CF_2O$—, —$OCF_2$—, —$CH_2$— or a single bond.

k) Preferred mixtures contain one or more compounds selected from the group of the difluorodibenzochroman compounds of the formula BC, chromans of the formula CR, fluorinated phenanthrenes of the formulae PH-1 and PH-2, fluorinated dibenzofurans of the formula BF,

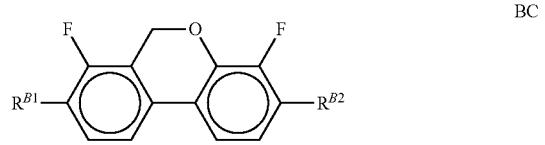

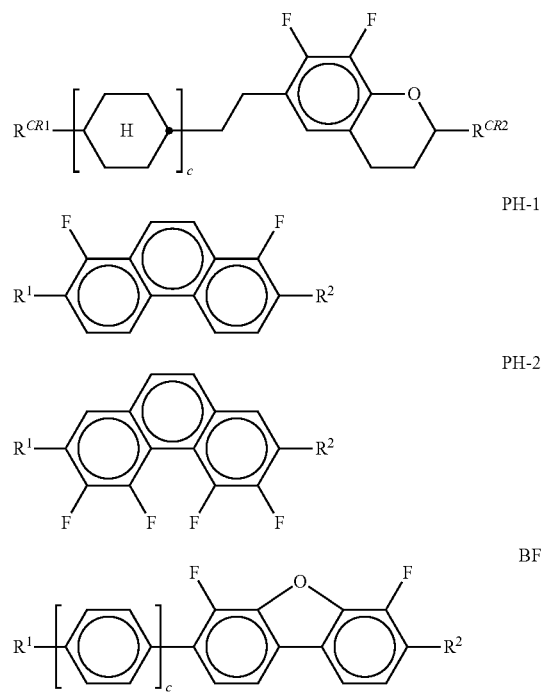

in which $R^{B1}$, $R^{B2}$, $R^{CR1}$, $R^{CR2}$, $R^1$, $R^2$ each, independently of one another, have the meaning of $R^{2A}$. c is 0, 1 or 2.

The mixtures according to the invention preferably contain the compounds of the formulae BC, CR, PH-1, PH-2 and/or BF in amounts of 3 to 20% by weight, in particular in amounts of 3 to 15% by weight. Particularly preferred compounds of the formulae BC and CR are the compounds BC-1 to BC-7 and CR-1 to CR-5,

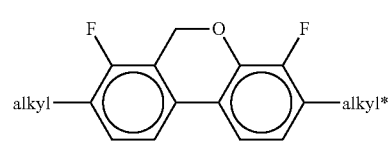

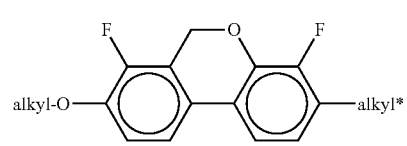

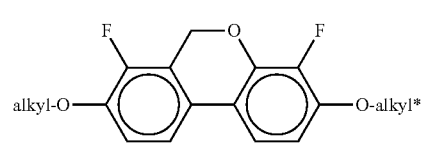

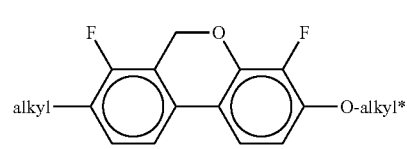

-continued

BC-5
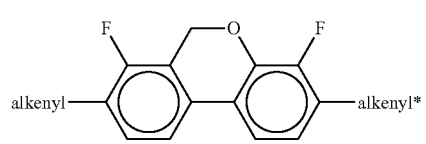

BC-6
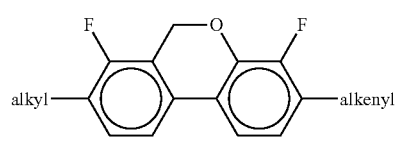

BC-7
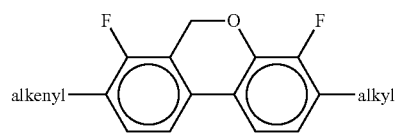

CR-1
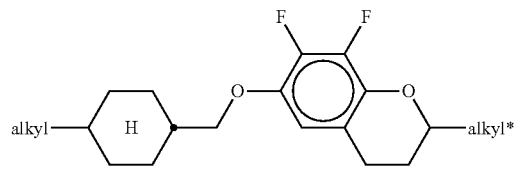

CR-2
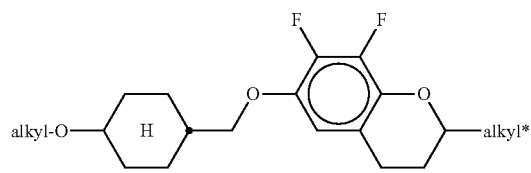

CR-3
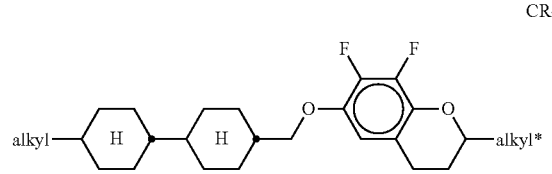

CR-4
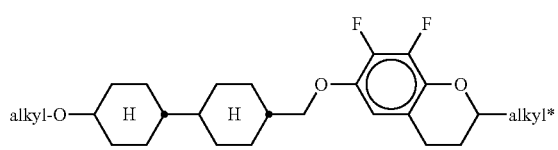

CR-5
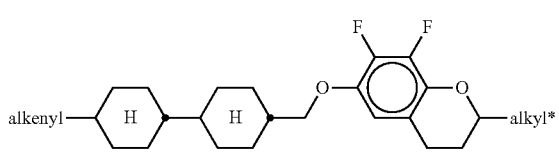

in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms.

Very particular preference is given to mixtures containing one, two or three compounds of the formula BC-2.

l) Preferred mixtures contain one or more indane compounds of the formula In,

In
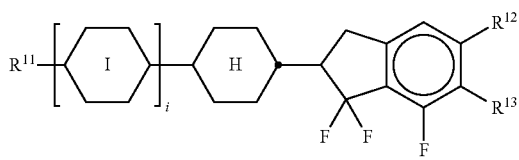

in which $R^{11}$, $R^{12}$, $R^{13}$ each, independently of one another, denote a straight-chain alkyl, alkoxy, alkoxyalkyl or alkenyl radical having $R^{12}$ and $R^{13}$ additionally denote halogen, preferably F,

denotes

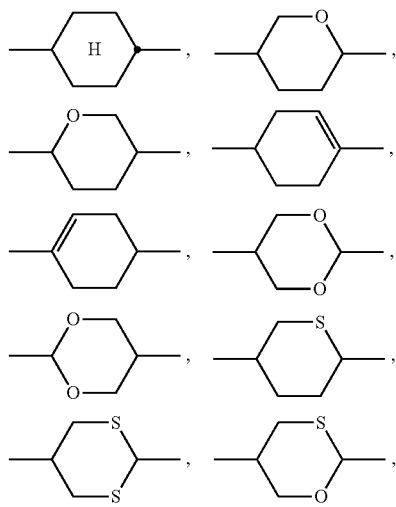

i denotes 0, 1 or 2.

Preferred compounds of the formula In are the compounds of the formulae In-1 to In-16 indicated below:

In-1
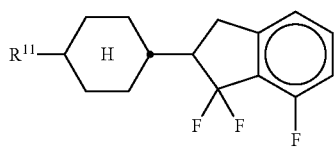

In-2
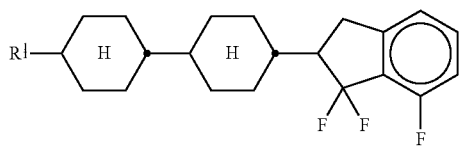

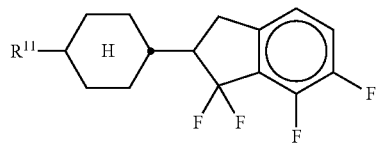
In-3

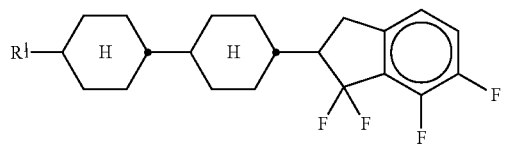
In-4

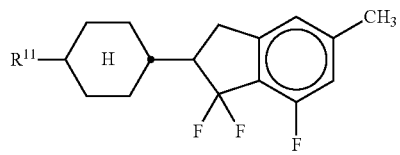
In-5

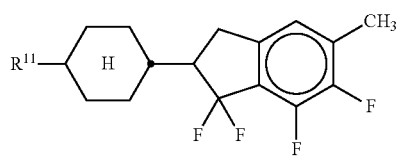
In-6

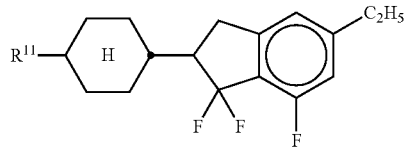
In-7

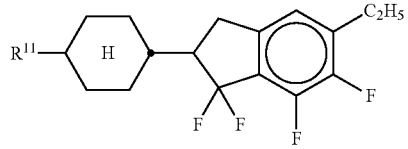
In-8

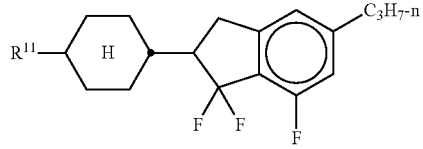
In-9

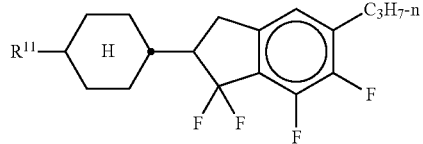
In-10

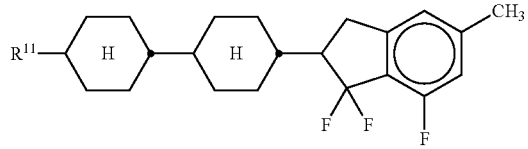
In-11

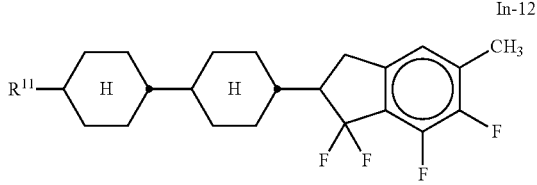
In-12

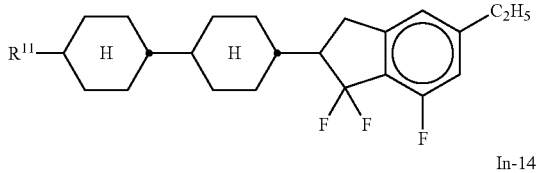
In-13

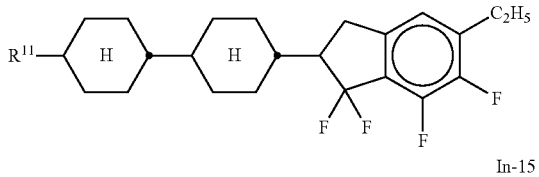
In-14

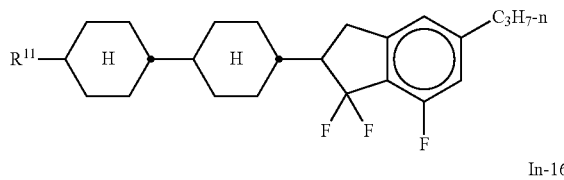
In-15

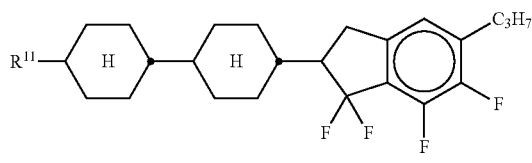
In-16

Particular preference is given to the compounds of the formulae In-1, In-2, In-3 and In-4.

The compounds of the formula In and the sub-formulae In-1 to In-16 are preferably employed in the mixtures according to the invention in concentrations ≥5% by weight, in particular 5-30% by weight and very particularly preferably 5-25% by weight.

m) Preferred mixtures additionally contain one or more compounds of the formulae L-1 to L-11,

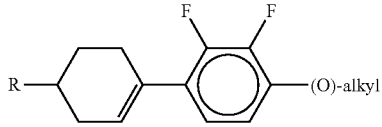
L-1

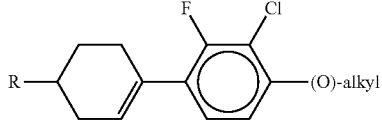
L-2

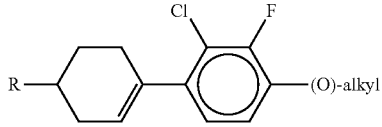
L-3

-continued

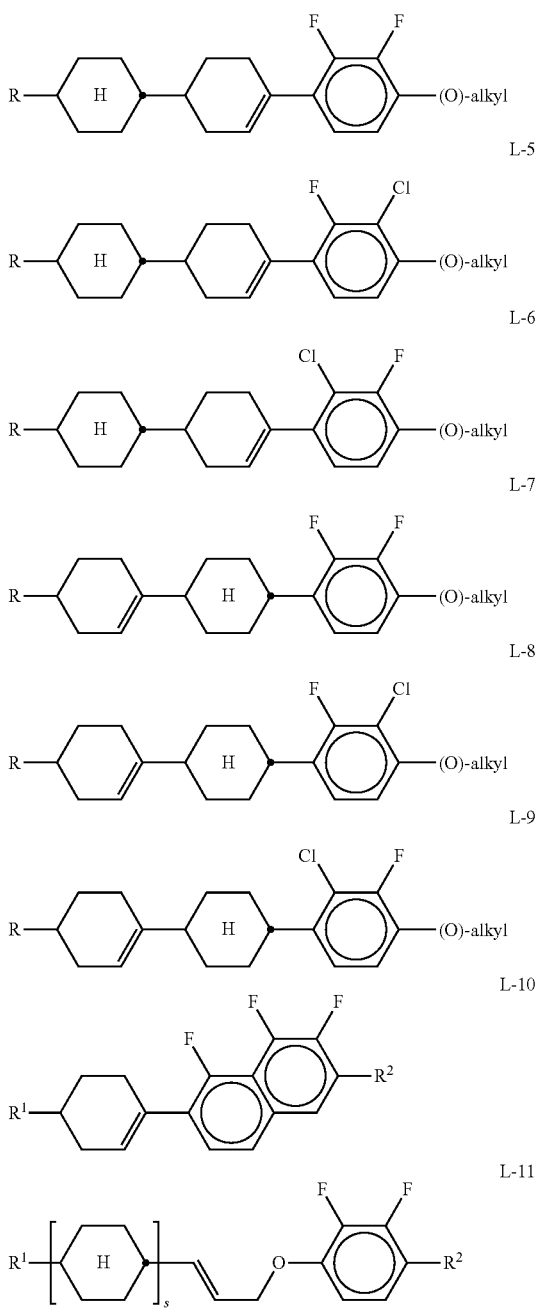

in which
R, $R^1$ and $R^2$ each, independently of one another, have the meanings indicated for $R^{24}$ in claim 1, and alkyl denotes an alkyl radical having 1-6 C atoms. s denotes 1 or 2.

Particular preference is given to the compounds of the formulae L-1 and L-4, in particular L-4.

The compounds of the formulae L-1 to L-11 are preferably employed in concentrations of 5-50% by weight, in particular 5-40% by weight and very particularly preferably 10-40% by weight.

Particularly preferred mixture concepts are indicated below: (the acronyms used are explained in Table A. n and m here each denote, independently of one another, 1-6).

The mixtures according to the invention preferably contain
CPY-n-Om, in particular CPY-2-O2, CPY-3-O2 and/or CPY-5-O2, preferably in concentrations >5%, in particular 10-30%, based on the mixture as a whole,
and/or
CY-n-Om, preferably CY-3-O2, CY-3-O4, CY-5-O2 and/or CY-5-O4, preferably in concentrations >5%, in particular 15-50%, based on the mixture as a whole,
and/or
CCY-n-Om, preferably CCY-4-O2, CCY-3-O2, CCY-3-O3, CCY-3-O1 and/or CCY-5-O2, preferably in concentrations >5%, in particular 10-30%, based on the mixture as a whole,
and/or
CLY-n-Om, preferably CLY-2-O4, CLY-3-O2 and/or CLY-3-O3, preferably in concentrations >5%, in particular 10-30%, based on the mixture as a whole,
and/or
CK-n-F, preferably CK-3-F, CK-4-F and/or CK-5-F, preferably in concentrations of >5%, in particular 5-25%, based on the mixture as a whole.

Preference is furthermore given to mixtures according to the invention which contain the following mixture concepts: (n and m each denote, independently of one another, 1-6.)
CPY-n-Om and CY-n-Om, preferably in concentrations of 10-80%, based on the mixture as a whole,
and/or
CPY-n-Om and CK-n-F, preferably in concentrations of 10-70%, based on the mixture as a whole,
and/or
CPY-n-Om and CLY-n-Om, preferably in concentrations of 10-80%, based on the mixture as a whole.

The invention furthermore relates to an electro-optical display having active-matrix addressing based on the ECB, VA, PS-VA, IPS or FFS effect, characterised in that it contains, as dielectric, a liquid-crystalline medium according to one or more of Claims 1 to 12.

The liquid-crystalline medium according to the invention preferably has a nematic phase from ≤−20° C. to ≥70° C., particularly preferably from ≤−30° C. to ≥80° C., very particularly preferably from ≤−40° C. to ≥90° C.

The expression "have a nematic phase" here means on the one hand that no smectic phase and no crystallisation are observed at low temperatures at the corresponding temperature and on the other hand that clearing still does not occur on heating from the nematic phase. The investigation at low temperatures is carried out in a flow viscometer at the corresponding temperature and checked by storage in test cells having a layer thickness corresponding to the electro-optical use for at least 100 hours. If the storage stability at a temperature of −20° C. in a corresponding test cell is 1000 h or more, the medium is referred to as stable at this temperature. At temperatures of −30° C. and −40° C., the corresponding times are 500 h and 250 h respectively. At high temperatures, the clearing point is measured by conventional methods in capillaries.

The liquid-crystal mixture preferably has a nematic phase range of at least 60 K and a flow viscosity $v_{20}$ of at most 30 $mm^2 \cdot s^{-1}$ at 20° C.

The values of the birefringence Δn in the liquid-crystal mixture are generally between 0.07 and 0.16, preferably between 0.08 and 0.12.

The liquid-crystal mixture according to the invention has a Δ∈ of −0.5 to −8.0, in particular −2.5 to −6.0, where Δ∈ denotes the dielectric anisotropy. The rotational viscosity $\gamma_1$ at 20° C. is preferably ≤165 mPa·s, in particular ≤140 mPa·s.

The liquid-crystal media according to the invention have relatively low values for the threshold voltage ($V_0$). They are preferably in the range from 1.7 V to 3.0 V, particularly preferably ≤2.5 V and very particularly preferably ≤2.3 V.

For the present invention, the term "threshold voltage" relates to the capacitive threshold ($V_0$), also known as the Freedericks threshold, unless explicitly indicated otherwise.

In addition, the liquid-crystal media according to the invention have high values for the voltage holding ratio in liquid-crystal cells.

In general, liquid-crystal media having a low addressing voltage or threshold voltage exhibit a lower voltage holding ratio than those having a higher addressing voltage or threshold voltage and vice versa.

For the present invention, the term "dielectrically positive compounds" denotes compounds having a $\Delta\epsilon > 1.5$, the term "dielectrically neutral compounds" denotes those having $-1.5 \leq \Delta\epsilon \leq 1.5$ and the term "dielectrically negative compounds" denotes those having $\Delta\epsilon < -1.5$. The dielectric anisotropy of the compounds is determined here by dissolving 10% of the compounds in a liquid-crystalline host and determining the capacitance of the resultant mixture in at least one test cell in each case having a layer thickness of 20 μm with homeotropic and with homogeneous surface alignment at 1 kHz. The measurement voltage is typically 0.5 V to 1.0 V, but is always lower than the capacitive threshold of the respective liquid-crystal mixture investigated.

All temperature values indicated for the present invention are in ° C.

The mixtures according to the invention are suitable for all VA-TFT applications, such as, for example, VAN, MVA, (S)-PVA, ASV, PSA (polymer sustained VA) and PS-VA (polymer stabilized VA). They are furthermore suitable for IPS (in-plane switching) and FFS (fringe field switching) applications having negative A.

The nematic liquid-crystal mixtures in the displays according to the invention generally contain two components A and B, which themselves consist of one or more individual compounds.

Component A has significantly negative dielectric anisotropy and gives the nematic phase a dielectric anisotropy of ≤−0.5. Besides the polymerisable compounds, it preferably contains the compounds of the formulae IIA, IIB and/or IIC, furthermore compounds of the formula III.

The proportion of component A is preferably between 45 and 100%, in particular between 60 and 100%.

For component A, one (or more) individual compound(s) which has (have) a value of $\Delta\epsilon \leq -0.8$ is (are) preferably selected. This value must be more negative, the smaller the proportion A in the mixture as a whole.

Component B has pronounced nematogeneity and a flow viscosity of not greater than 30 $mm^{2} \cdot s^{-1}$, preferably not greater than 25 $mm^{2} \cdot s^{-1}$, at 20° C.

Particularly preferred individual compounds in component B are extremely low-viscosity nematic liquid crystals having a flow viscosity of not greater than 18 $mm^{2} \cdot s^{-1}$, preferably not greater than 12 $mm^{2} \cdot s^{-1}$, at 20° C.

Component B is monotropically or enantiotropically nematic, has no smectic phases and is able to prevent the occurrence of smectic phases down to very low temperatures in liquid-crystal mixtures. For example, if various materials of high nematogeneity are added to a smectic liquid-crystal mixture, the nematogeneity of these materials can be compared through the degree of suppression of smectic phases that is achieved.

The mixture may optionally also contain a component C, containing compounds having a dielectric anisotropy of $\Delta\epsilon \geq 1.5$. These so-called positive compounds are generally present in a mixture of negative dielectric anisotropy in amounts of ≤10%, preferably ≤5% by weight, based on the mixture as a whole.

A preferred compound of the component C is the compound of the formula

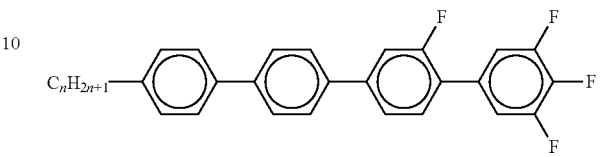

wherein n denotes 1, 2, 3, 4, 5 or 6, preferably n is 3.

A multiplicity of suitable materials is known to the person skilled in the art from the literature. Particular preference is given to compounds of the formula III.

In addition, these liquid-crystal phases may also contain more than 18 components, preferably 18 to 25 components.

The mixture according to the invention preferably contain 4 to 15, in particular 5 to 12, and particularly preferably ≤10, compounds of the formulae IIA, IIB and/or IIC and optionally III.

Besides compounds of the formulae IIA, IIB and/or IIC and optionally III, other constituents may also be present, for example in an amount of up to 45% of the mixture as a whole, but preferably up to 35%, in particular up to 10%.

The other constituents are preferably selected from nematic or nematogenic substances, in particular known substances, from the classes of the azoxybenzenes, benzylideneanilines, biphenyls, terphenyls, phenyl or cyclohexyl benzoates, phenyl or cyclohexyl cyclo hexanecarboxylates, phenylcyclohexanes, cyclohexylbiphenyls, cyclohexylcyclohexanes, cyclohexylnaphthalenes, 1,4-biscyclohexylbiphenyls or cyclohexylpyrimidines, phenyl- or cyclohexyldioxanes, optionally halogenated stilbenes, benzyl phenyl ethers, tolans and substituted cinnamic acid esters.

The most important compounds which are suitable as constituents of liquid-crystal phases of this type can be characterised by the formula IV $$R^{20}\text{-L-G-E-}R^{21} \qquad \text{IV}$$

in which L and E each denote a carbo- or heterocyclic ring system from the group formed by 1,4-disubstituted benzene and cyclohexane rings, 4,4'-disubstituted biphenyl, phenylcyclohexane and cyclohexylcyclohexane systems, 2,5-disubstituted pyrimidine and 1,3-dioxane rings, 2,6-disubstituted naphthalene, di- and tetrahydronaphthalene, quinazoline and tetrahydroquinazoline,

| G denotes | —CH═CH— | —N(O)═N— |
|---|---|---|
| | —CH═CQ— | —CH═N(O)— |
| | —C≡C— | —CH$_2$—CH$_2$— |
| | —CO—O— | —CH$_2$—O— |
| | —CO—S— | —CH$_2$—S— |
| | —CH═N— | —COO-Phe-COO— |
| | —CF$_2$O— | —CF═CF— |
| | —OCF$_2$— | —OCH$_2$— |
| | —(CH$_2$)$_4$— | —(CH$_2$)$_3$O— | or a C—C single bond, Q denotes halogen, preferably chlorine, or —CN, and $R^{20}$ and $R^{21}$ each denote alkyl, alkenyl, alkoxy, alkoxyalkyl or alkoxycarbonyloxy having up to 18, preferably up to 8, carbon atoms, or one of these radicals alternatively denotes CN, NC, $NO_2$, NCS, $CF_3$, $SF_5$, $OCF_3$, F, Cl or Br.

In most of these compounds, $R^{20}$ and $R^{21}$ are different from one another, one of these radicals usually being an alkyl or alkoxy group. Other variants of the proposed substituents are also common. Many such substances or also mixtures thereof are commercially available. All these substances can be prepared by methods known from the literature.

It goes without saying for the person skilled in the art that the VA, PS-VA, PSA, IPS, PS-IPS, FFS or PS-FFS mixture according to the invention may also contain compounds in which, for example, H, N, O, Cl and F have been replaced by the corresponding isotopes.

The mixtures according to the invention may furthermore contain conventional additives, such as, for example, stabilisers, antioxidants, UV absorbers, nanoparticles, microparticles, etc.

The structure of the liquid-crystal displays according to the invention corresponds to the usual geometry, as described, for example, in EP-A 0 240 379.

For PS-VA applications the preferred process can be carried out for example by using a band pass filter and/or a cut-off filter, which are substantially transmissive for UV light with the respective desired wavelength(s) and are substantially blocking light with the respective undesired wavelengths. For example, when irradiation with UV light of wavelengths λ of 300-400 nm is desired, UV exposure can be carried out using a wide band pass filter being substantially transmissive for wavelengths 300 nm<λ<400 nm. When irradiation with UV light of wavelength λ of more than 320 nm is desired, UV exposure can be carried out using a cut-off filter being substantially transmissive for wavelengths λ>320 nm.

"Substantially transmissive" means that the filter transmits a substantial part, preferably at least 50% of the intensity, of incident light of the desired wavelength(s). "Substantially blocking" means that the filter does not transmit a substantial part, preferably at least 50% of the intensity, of incident light of the undesired wavelengths. "Desired (undesired) wavelength" e.g. in case of a band pass filter means the wavelengths inside (outside) the given range of λ, and in case of a cut-off filter means the wavelengths above (below) the given value of λ.

This preferred process enables the manufacture of displays by using longer UV wavelengths, thereby reducing or even avoiding the hazardous and damaging effects of short UV light components.

UV radiation energy is in general from 6 to 100 J, depending on the production process conditions.

The liquid-crystal mixtures which can be used in accordance with the invention are prepared in a manner which is conventional per se. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

By means of suitable additives, the liquid-crystal phases according to the invention can be modified in such a way that they can be employed in any type of, for example, ECB, VAN, IPS, GH or ASM-VA LCD display that has been disclosed to date.

The dielectrics may also contain further additives known to the person skilled in the art and described in the literature, such as, for example, UV absorbers, antioxidants, nanoparticles and free-radical scavengers. For example, 0-15% of pleochroic dyes, stabilisers or chiral dopants may be added. Suitable stabilisers for the mixtures according to the invention are, in particular, those listed in Table B.

For example, 0-15% of pleochroic dyes may be added, furthermore conductive salts, preferably ethyldimethyldodecylammonium 4-hexoxybenzoate, tetrabutylammonium tetraphenylboranate or complex salts of crown ethers (cf., for example, Haller et al., Mol. Cryst. Liq. Cryst. Volume 24, pages 249-258 (1973)), may be added in order to improve the conductivity or substances may be added in order to modify the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728.

Throughout the patent application, 1,4-cyclohexylene rings and 1,4-phenylene rings are depicted as follows:

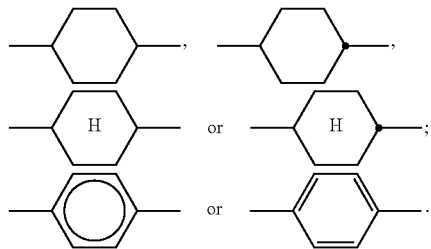

Besides the compounds of the formulae IIA and/or IIB and/or IIC, one or more compounds of the formula I, the mixtures according to the invention preferably contain one or more of the compounds from Table A indicated below.

TABLE A

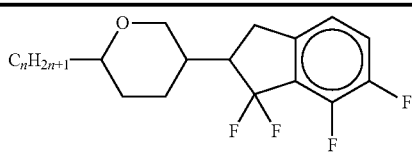

AlK-n-F

BCH-nm

TABLE A-continued
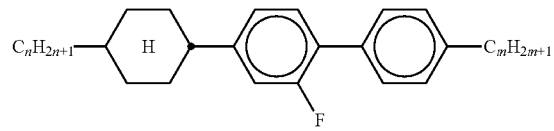
BCH-nmF
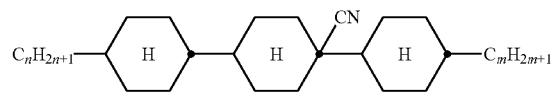
BCN-nm
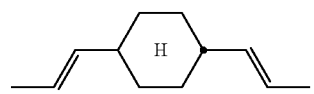
C-1V-V1
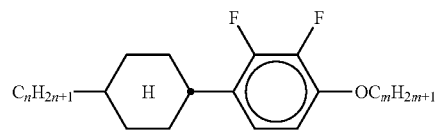
CY-n-Om
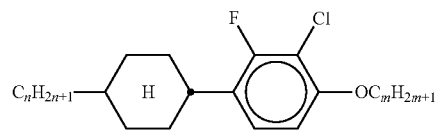
CY(F,Cl)-n-Om
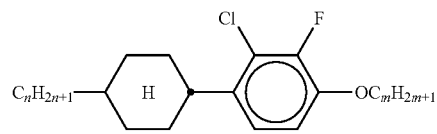
CY(Cl,F)-n-Om
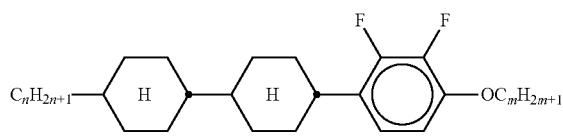
CCY-n-Om
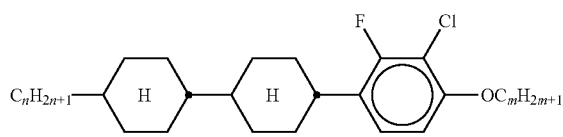
CCY(F,Cl)-n-Om
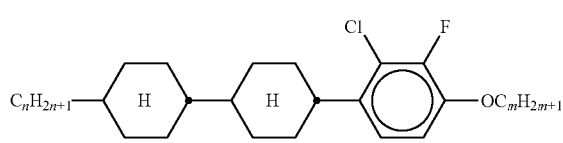
CCY(Cl,F)-n-Om TABLE A-continued
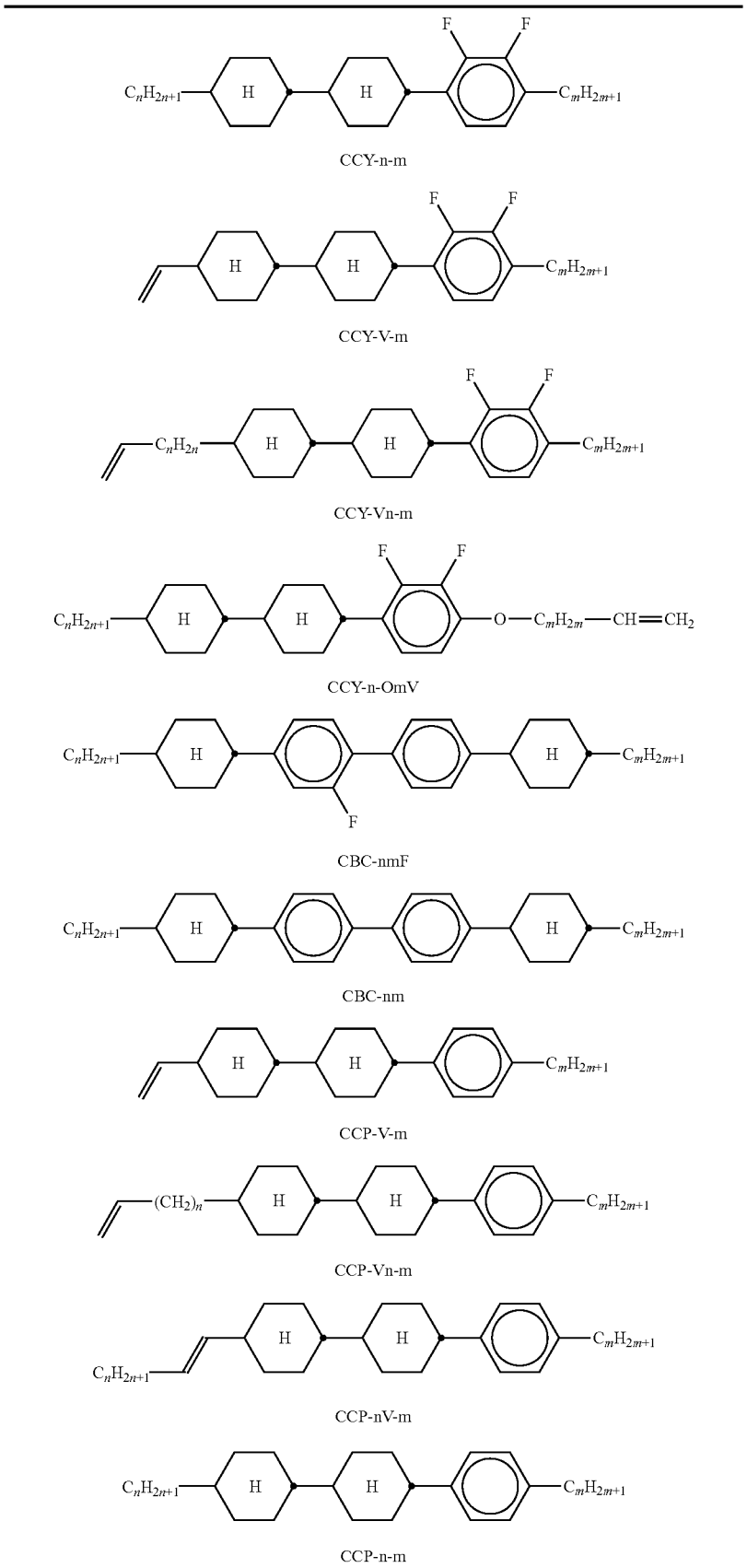

TABLE A-continued
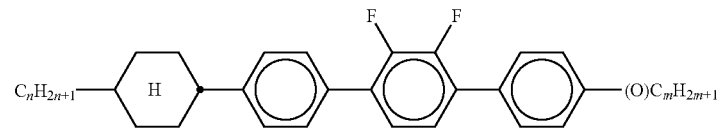
CPYP-n-(O)m
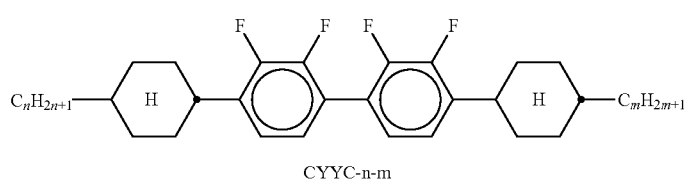
CYYC-n-m
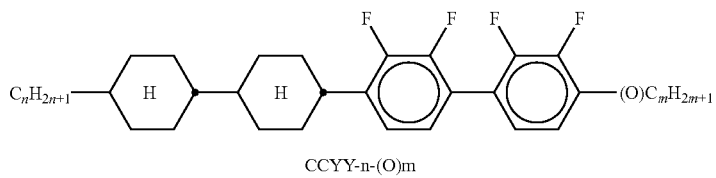
CCYY-n-(O)m
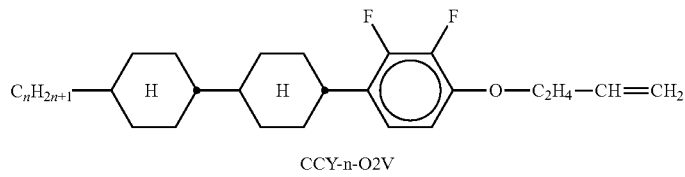
CCY-n-O2V
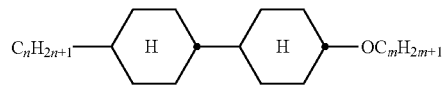
CCH-nOm
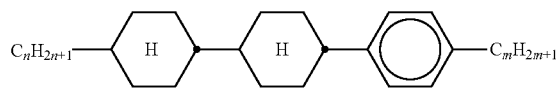
CCP-n-m
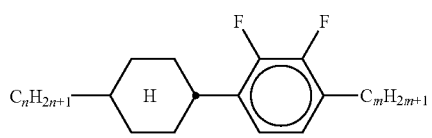
CY-n-m
CCH-nm
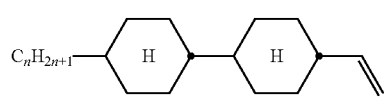
CC-n-V
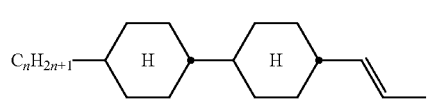
CC-n-V1

TABLE A-continued
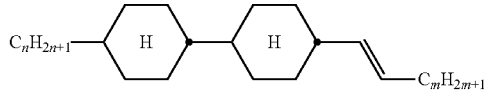
CC-n-Vm
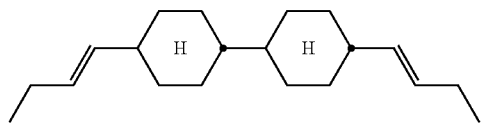
CC-2V-V2
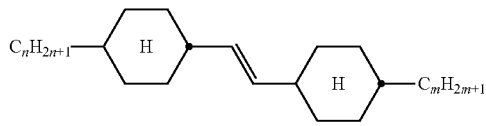
CVC-n-m
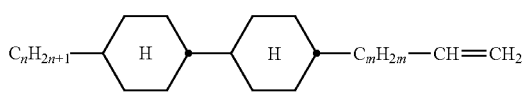
CC-n-mV
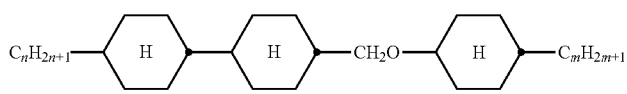
CCOC-n-m
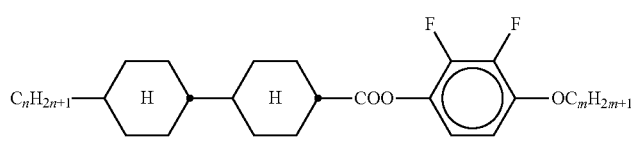
CP-nOmFF
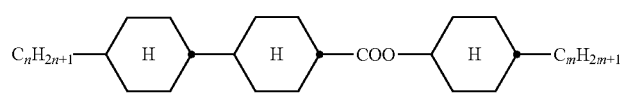
CH-nm
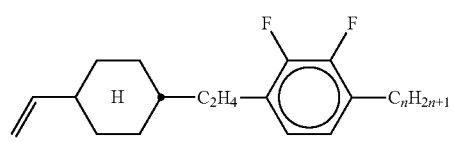
CEY-V-n
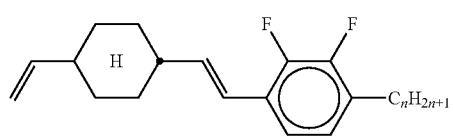
CVY-V-n
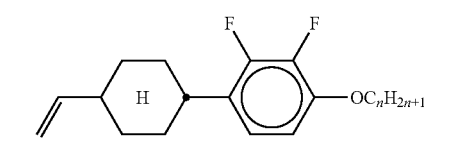
CY-V-On TABLE A-continued
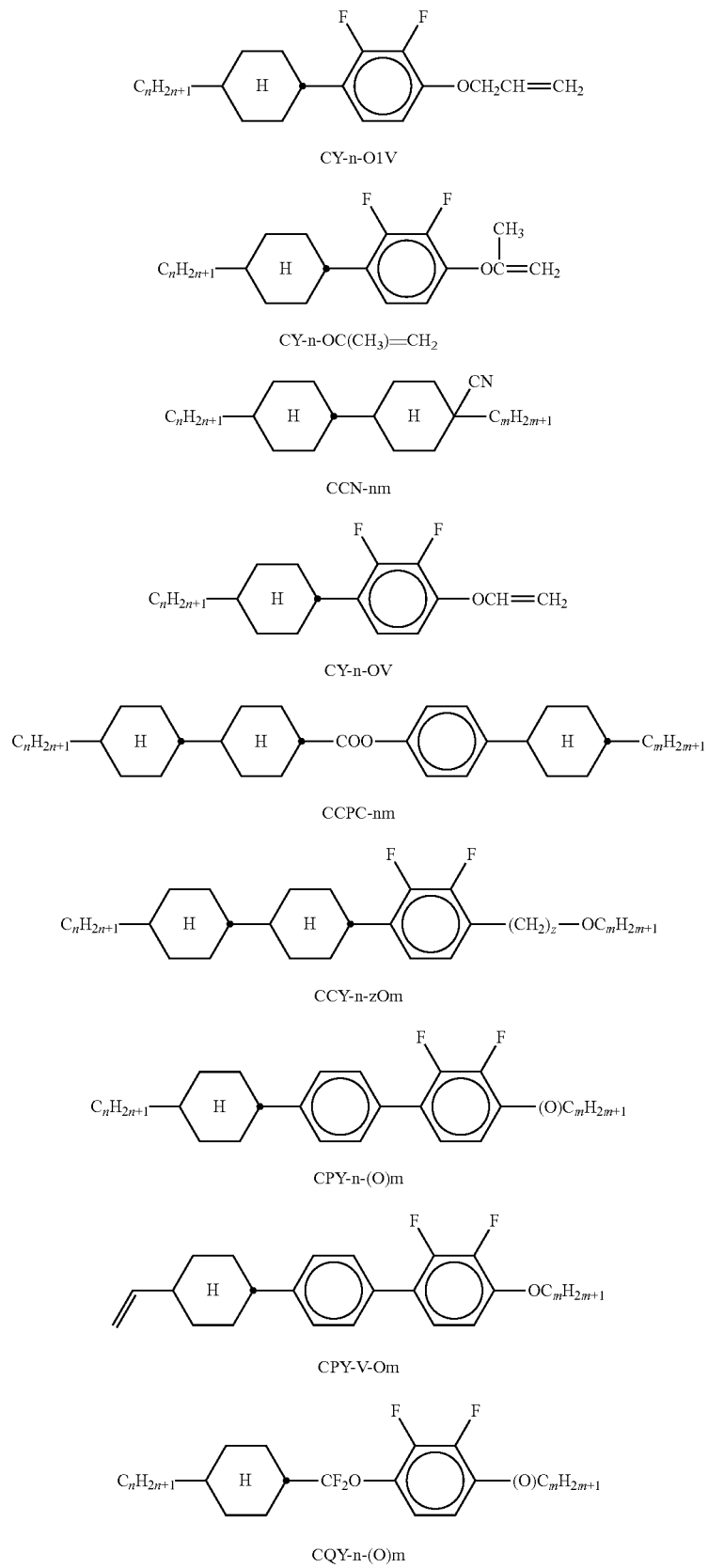

TABLE A-continued
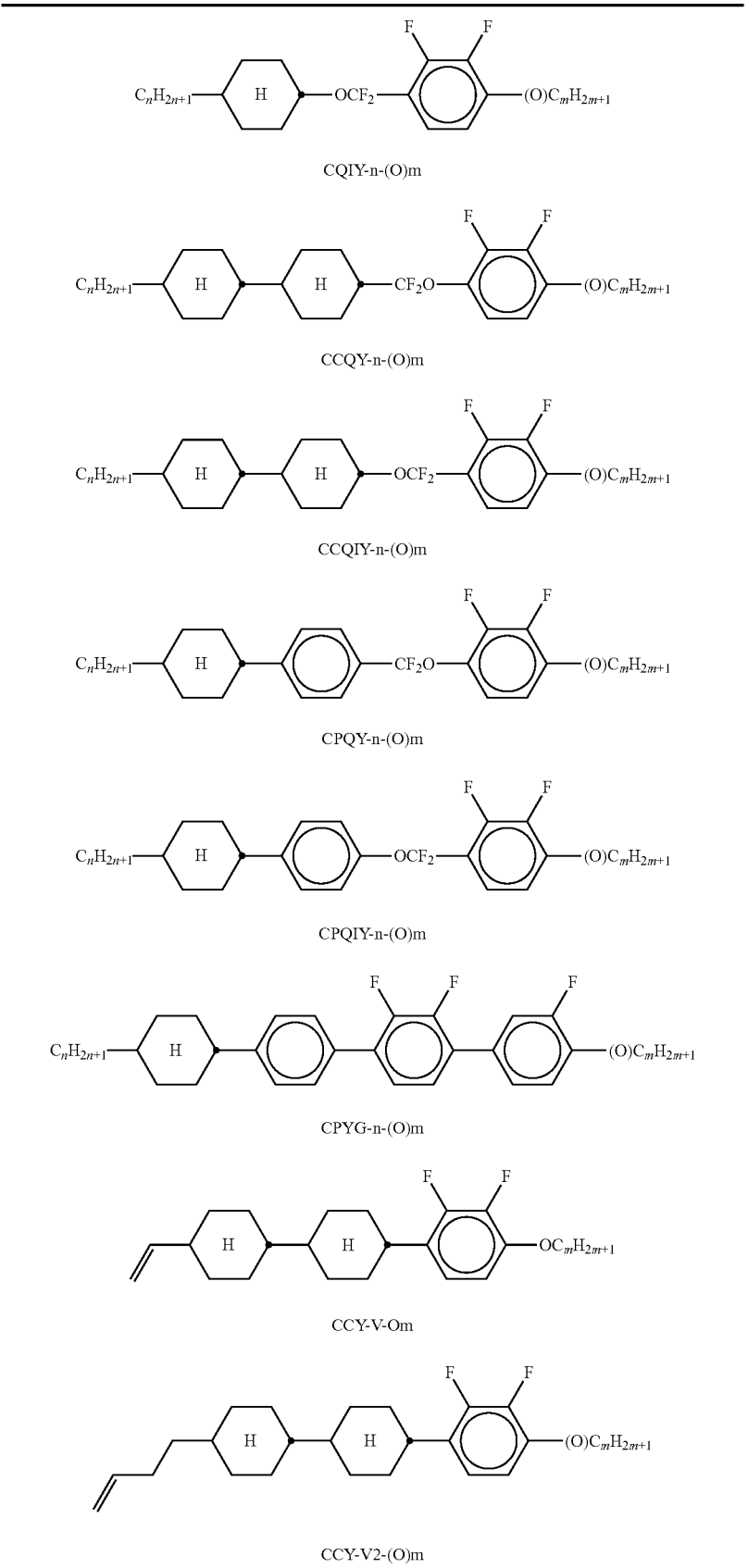

TABLE A-continued
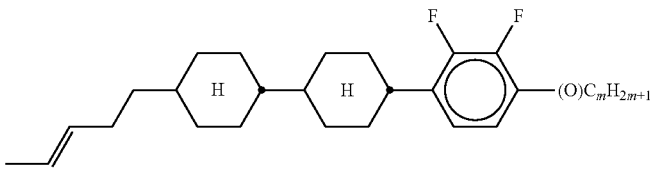
CCY-1V2-(O)m
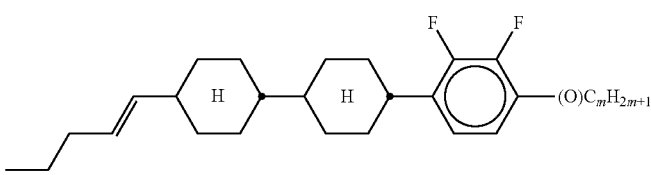
CCY-3V-(O)m
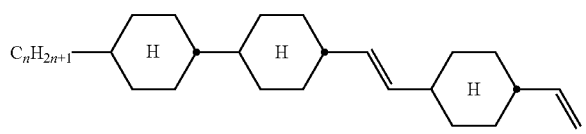
CCVC-n-V
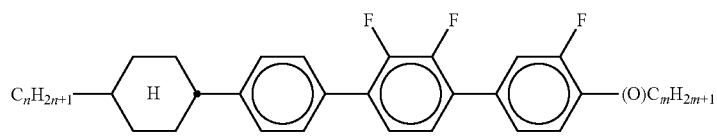
CPYG-n-(O)m
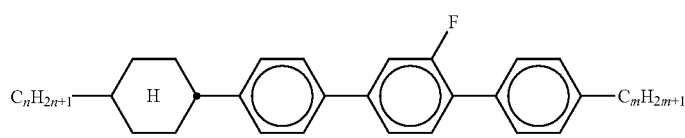
CPGP-n-m
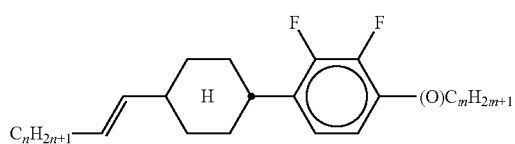
CY-nV-(O)m
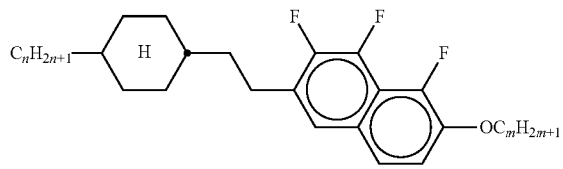
CENaph-n-Om
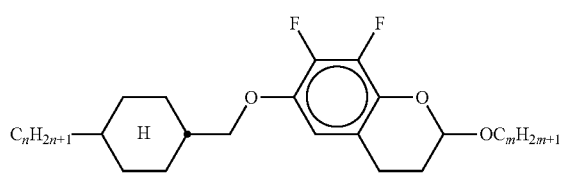
COChrom-n-Om TABLE A-continued
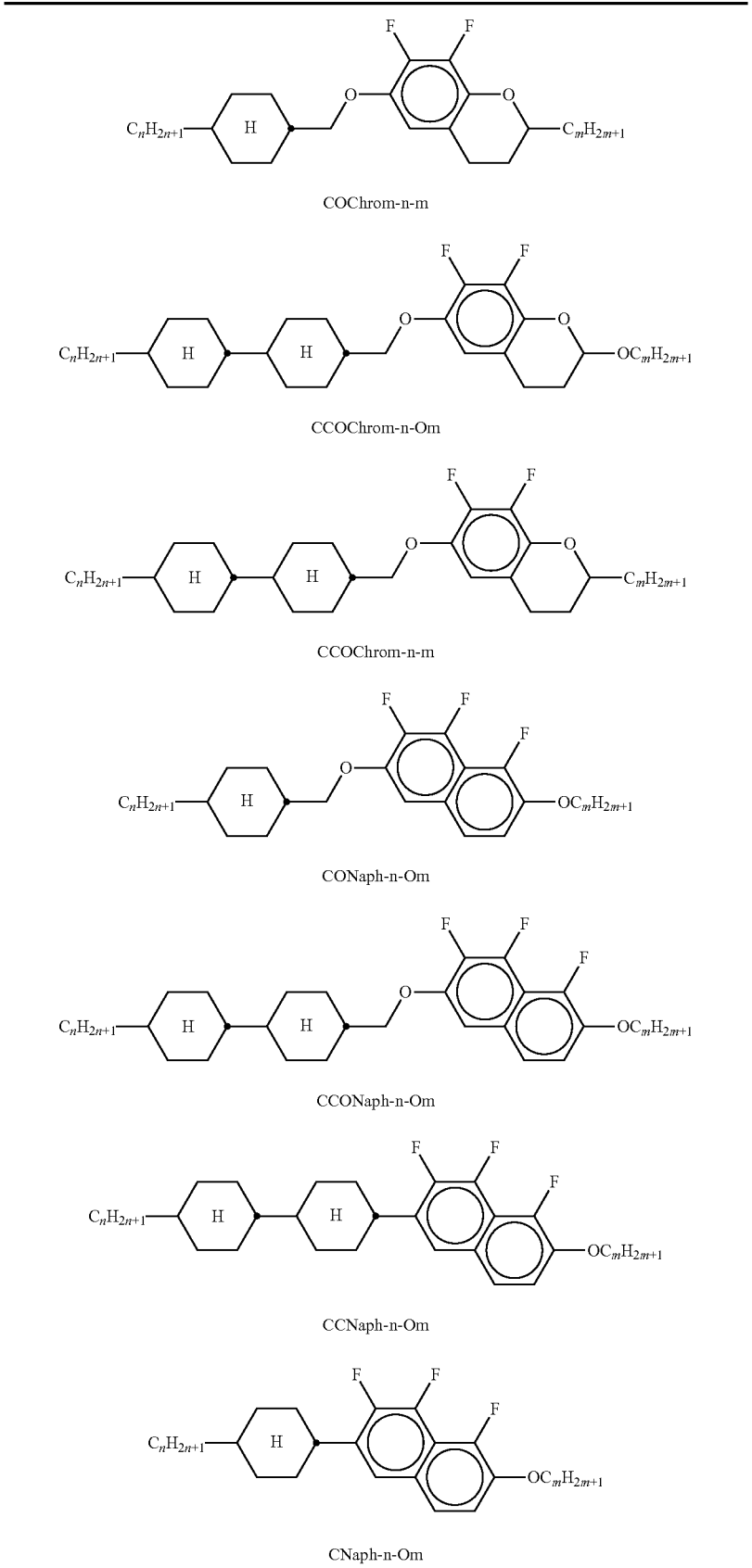

TABLE A-continued
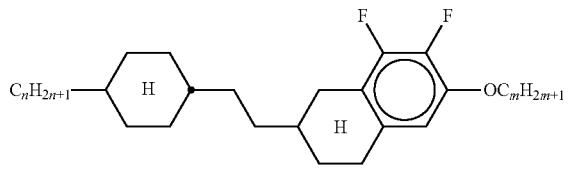
CETNaph-n-Om
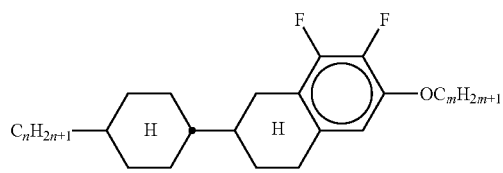
CTNaph-n-Om
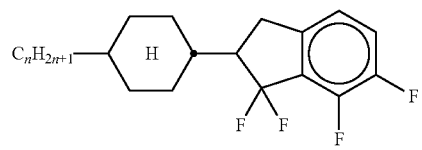
CK-n-F
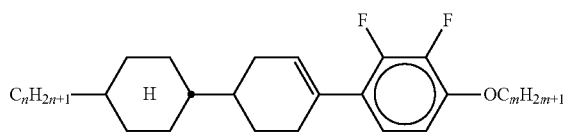
CLY-n-Om
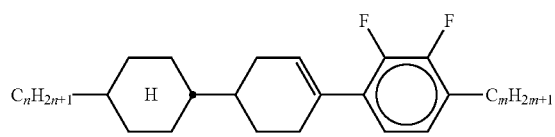
CLY-n-m
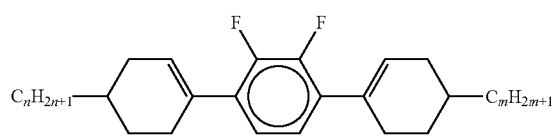
LYLI-n-m
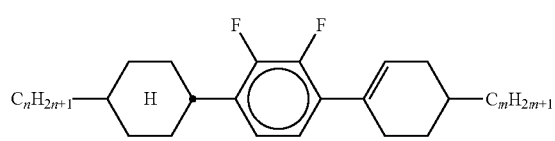
CYLI-n-m
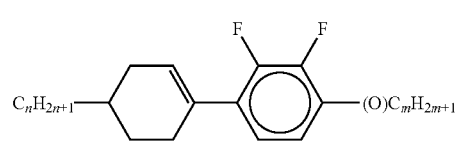
LY-n-(O)m TABLE A-continued
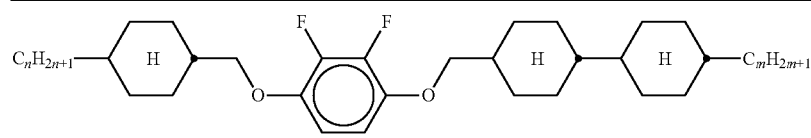
COYOICC-n-m
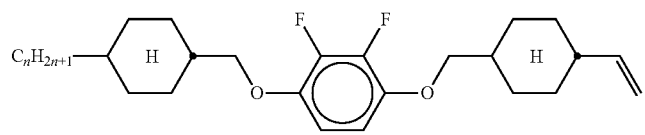
COYOIC-n-V
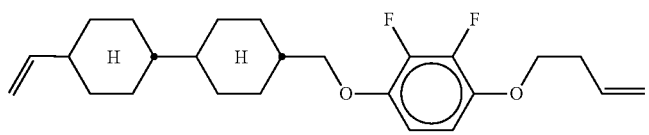
CCOY-V-O2V
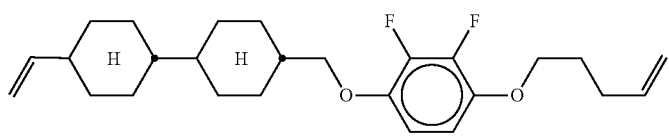
CCOY-V-O3V
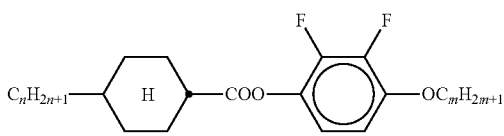
D-nOmFF
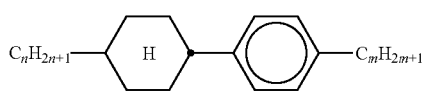
PCH-nm
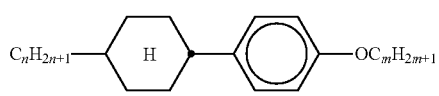
PCH-nOm
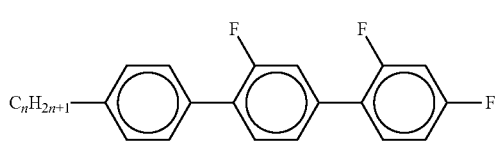
PGIGI-n-F
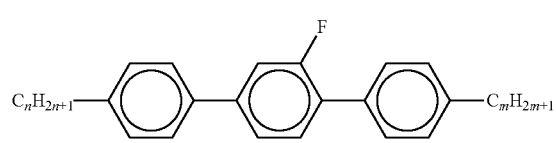
PGP-n-m TABLE A-continued
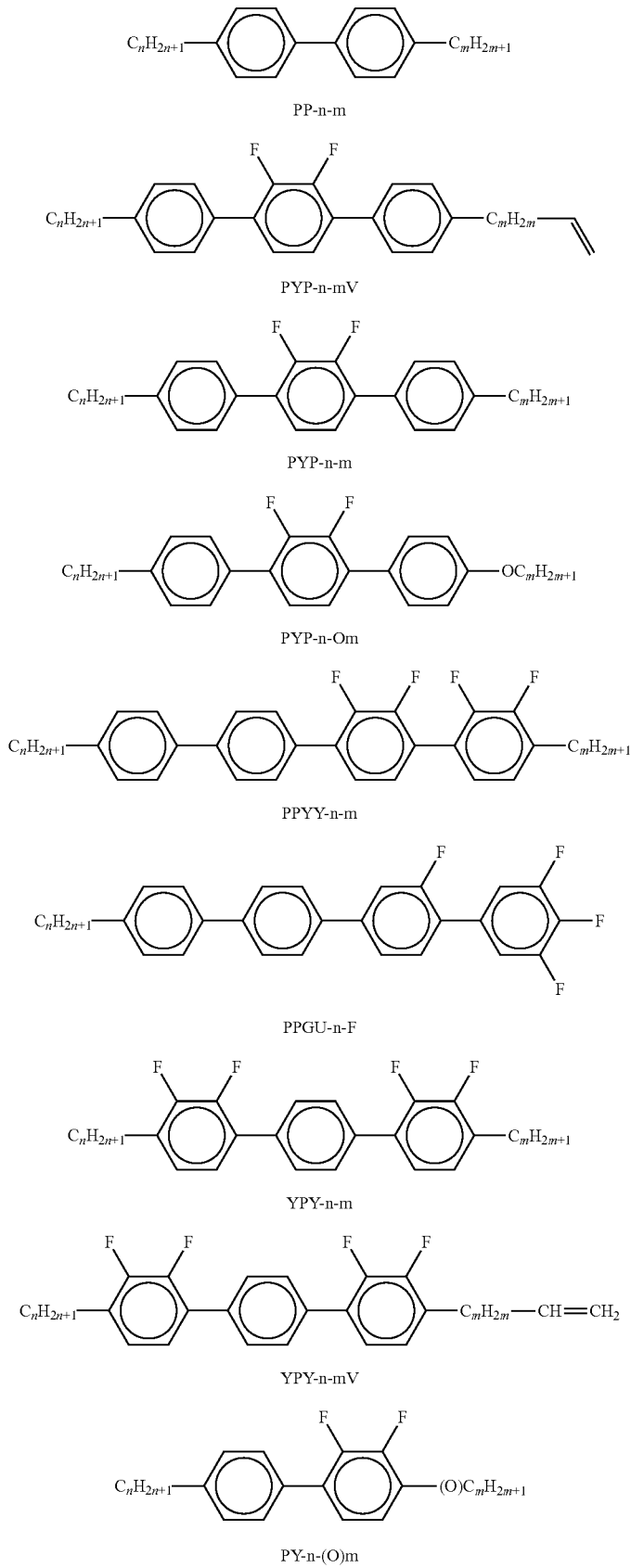

TABLE A-continued
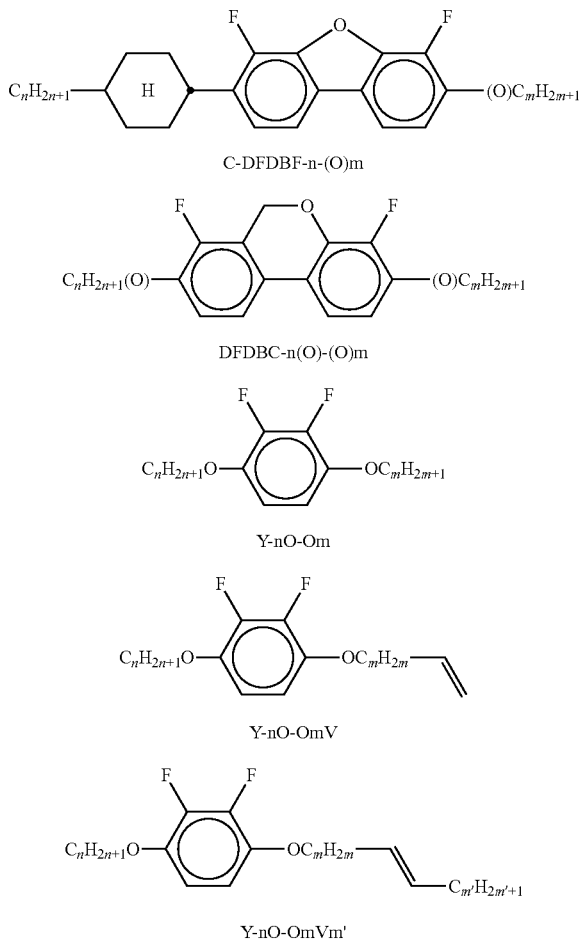
The following abbreviations are used:
(n, m, m', z: each, independently of one another, 1, 2, 3, 4, 5 or 6;
(O)$C_mH_{2m+1}$ means above and below $OC_mH_{2m+1}$ or $C_mH_{2m+1}$)
Table B shows possible dopants which can be added to the mixtures according to the invention. If the mixtures contain a dopant, it is employed in amounts of 0.01-4% by weight, preferably 0.1-1.0% by weight.
TABLE B
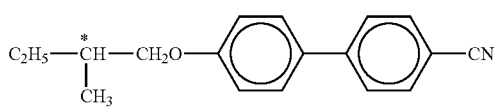
C15
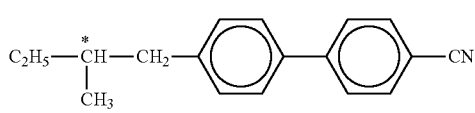
CB15
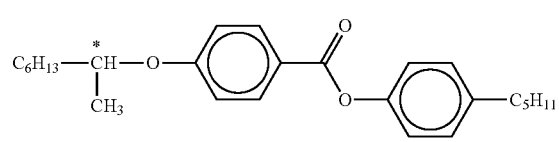
CM21

TABLE B-continued
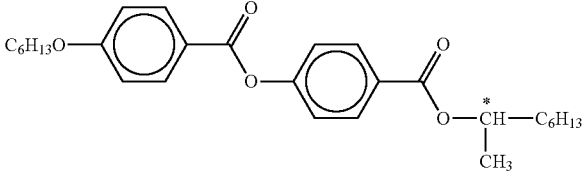 R/S-811
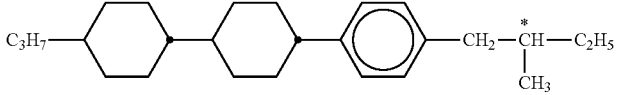 CM44
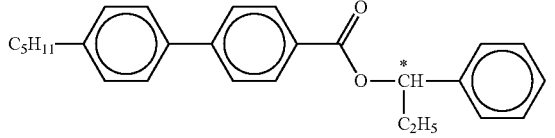 CM45
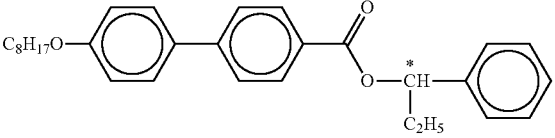 CM47
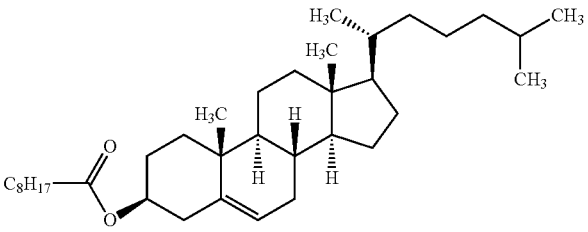 CN
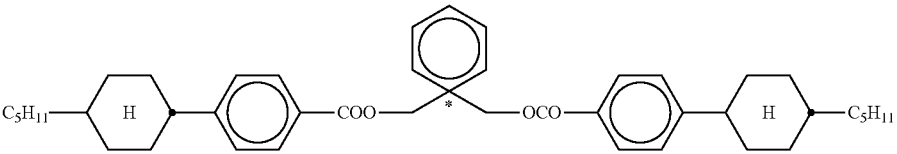 R/S-1011
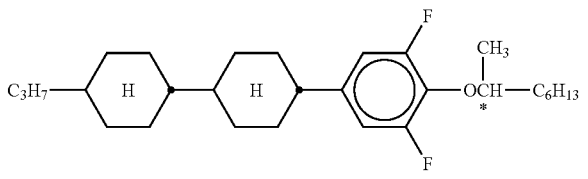 R/S-2011
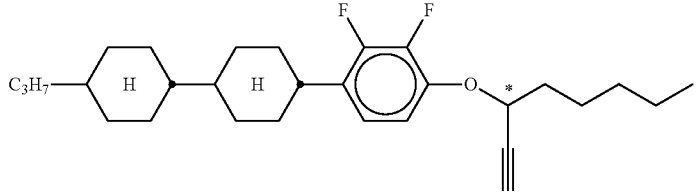 R/S-3011
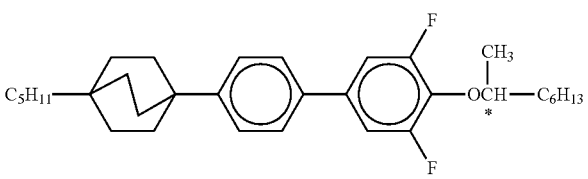 R/S-4011

TABLE B-continued

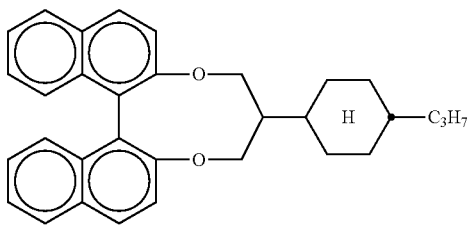

R/S-5011

Stabilisers which can be added, for example, to the mixtures according to the invention in amounts of up to 10% by weight, based on the total amount of the mixture, preferably 0.01 to 6% by weight, in particular 0.1 to 3% by weight, are shown below in Table C. Preferred stabilisers are, in particular, BHT derivatives, for example 2,6-di-tert-butyl-4-alkylphenols, and Tinuvin 770.

TABLE C (n = 1-12)

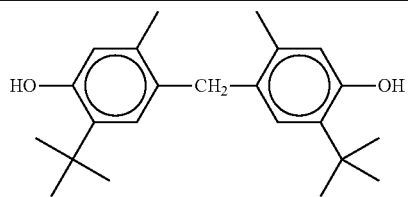

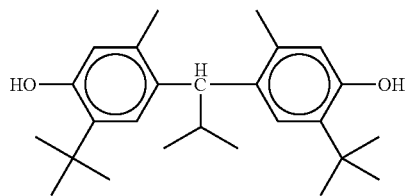

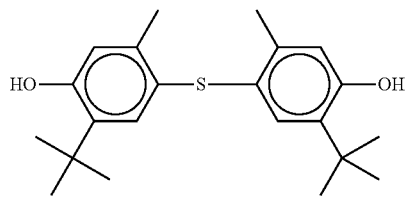

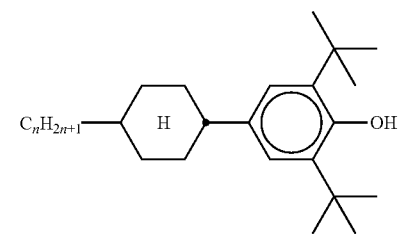

n = 1, 2, 3, 4, 5, 6 or 7

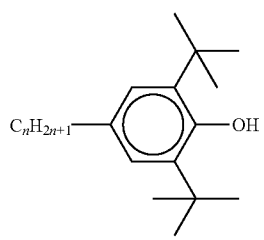

n = 1, 2, 3, 4, 5, 6 or 7

TABLE C-continued
(n = 1-12)
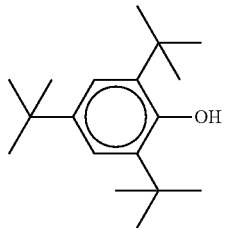
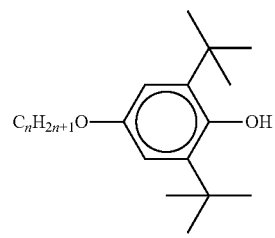
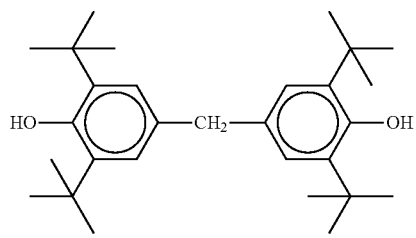
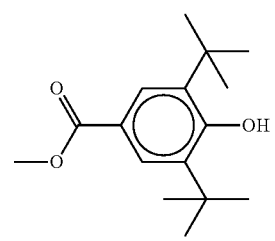
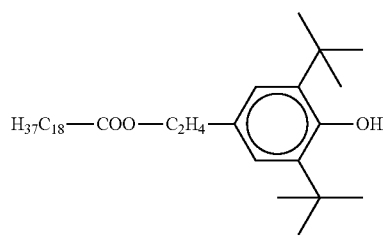
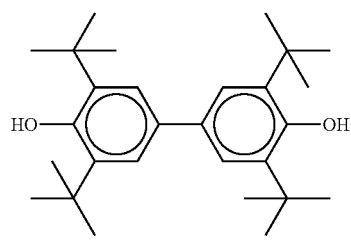

TABLE C-continued
(n = 1-12)
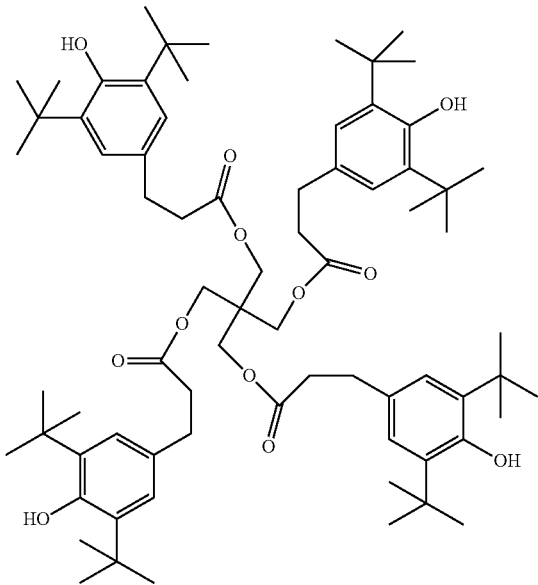 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]
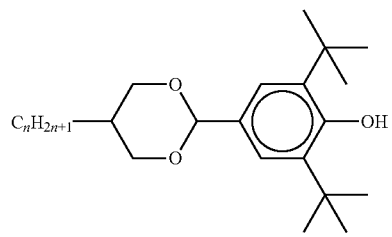
n = 1, 2, 3, 4, 5, 6 or 7
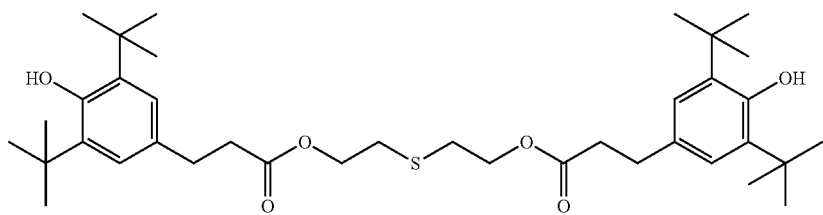 [SMILES: CC(C)(C)c1cc(CCC(=O)OCCSCCOC(=O)CCc2cc(C(C)(C)C)c(O)c(C(C)(C)C)c2)cc(C(C)(C)C)c1O]
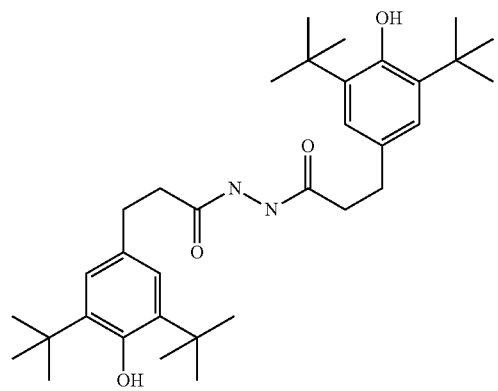 [SMILES: CC(C)(C)c1cc(CCC(=O)NNC(=O)CCc2cc(C(C)(C)C)c(O)c(C(C)(C)C)c2)cc(C(C)(C)C)c1O]

TABLE C-continued
(n = 1-12)
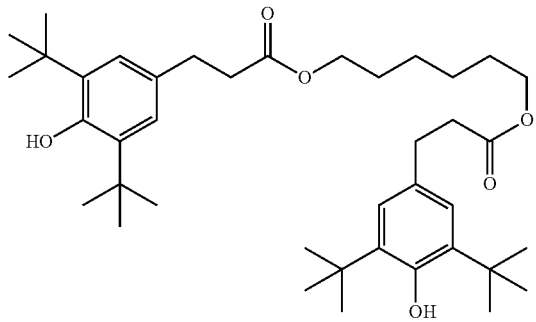 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]
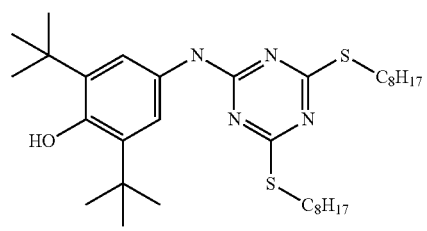
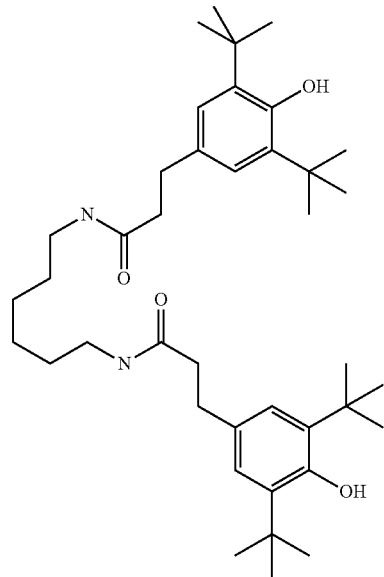 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]
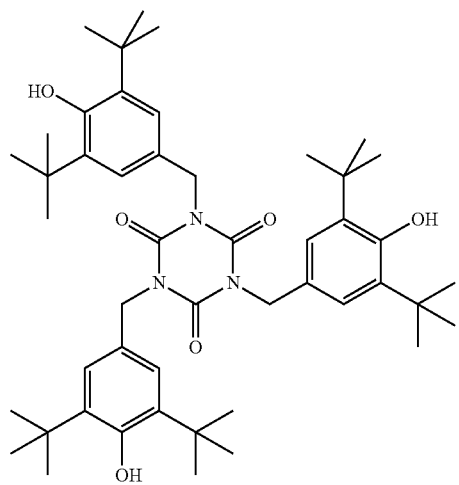 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]

TABLE C-continued
(n = 1-12)
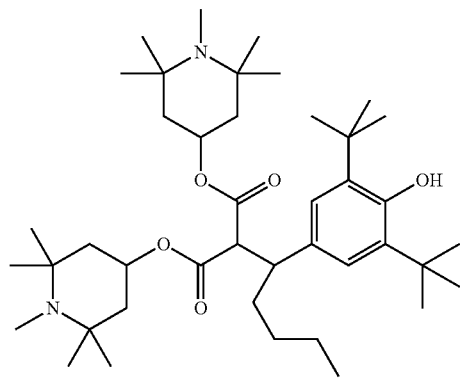 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]
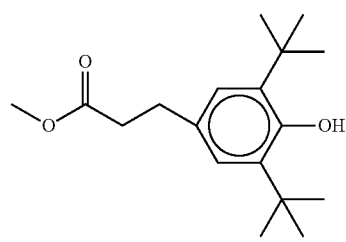
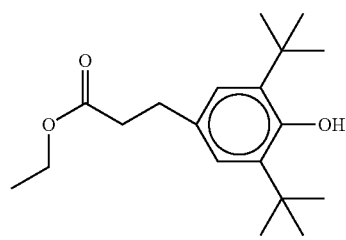
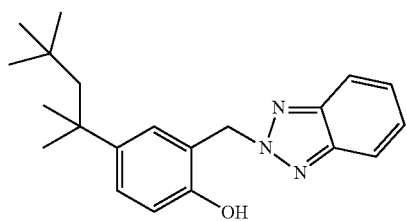 [SMILES: CC(C)(C)CC(C)(C)c1ccc(O)c(Cn2nc3ccccc3n2)c1]
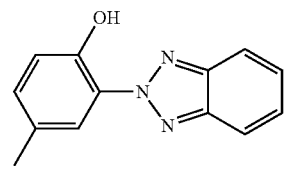 [SMILES: Cc1ccc(O)c(-n2nc3ccccc3n2)c1]
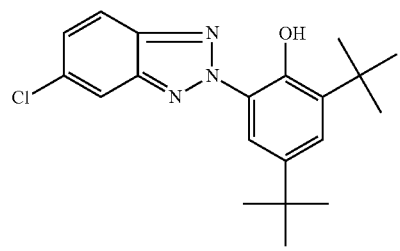 [SMILES: CC(C)(C)c1cc(-n2nc3ccc(Cl)cc3n2)c(O)c(C(C)(C)C)c1]

TABLE C-continued
(n = 1-12)
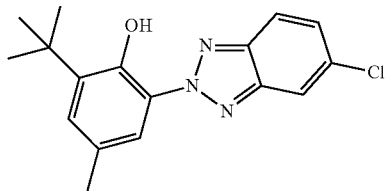 [SMILES: Cc1cc(-n2nc3ccc(Cl)cc3n2)c(O)c(C(C)(C)C)c1]
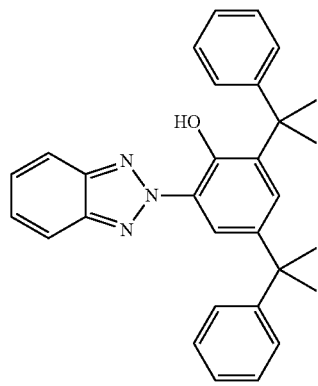 [SMILES: CC(C)(c1ccccc1)c1cc(-n2nc3ccccc3n2)c(O)c(C(C)(C)c2ccccc2)c1]
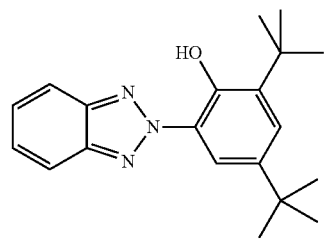 [SMILES: CC(C)(C)c1cc(-n2nc3ccccc3n2)c(O)c(C(C)(C)C)c1]
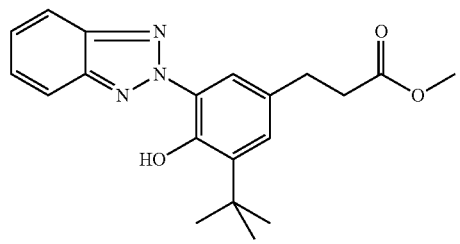 [SMILES: COC(=O)CCc1cc(-n2nc3ccccc3n2)c(O)c(C(C)(C)C)c1]
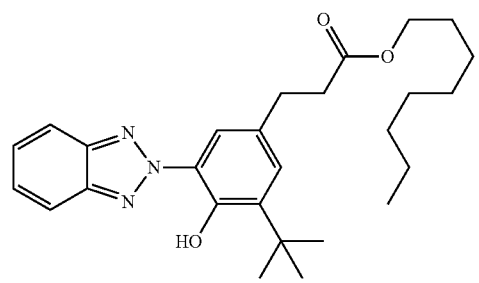 [SMILES: CCCCCCCCOC(=O)CCc1cc(-n2nc3ccccc3n2)c(O)c(C(C)(C)C)c1]

TABLE C-continued
(n = 1-12)
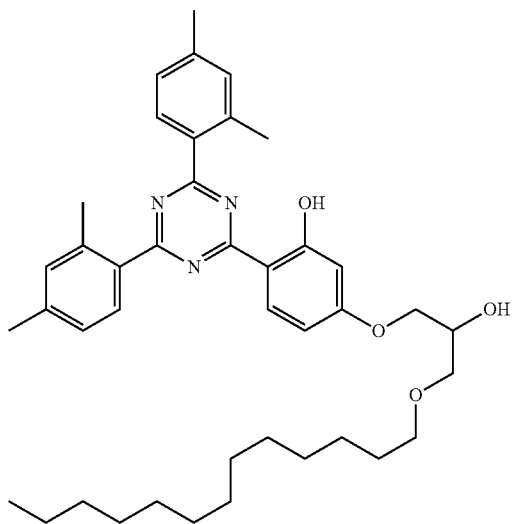 [SMILES: CCCCCCCCCCCCCOCC(O)COc1ccc(-c2nc(-c3ccc(C)cc3C)nc(-c3ccc(C)cc3C)n2)c(O)c1]
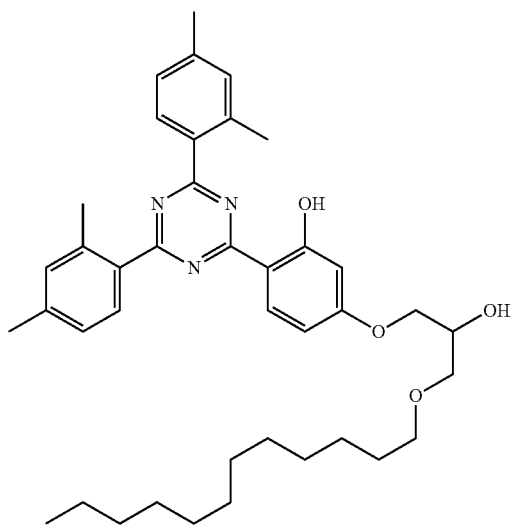 [SMILES: CCCCCCCCCCCCOCC(O)COc1ccc(-c2nc(-c3ccc(C)cc3C)nc(-c3ccc(C)cc3C)n2)c(O)c1]
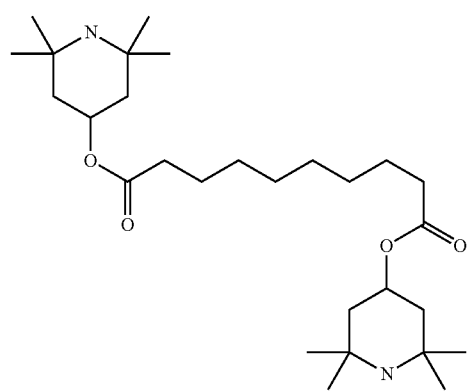

TABLE C-continued
(n = 1-12)
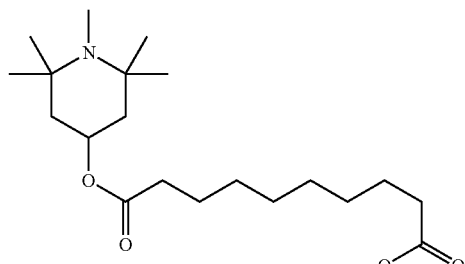
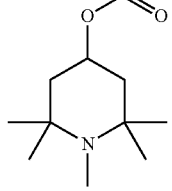
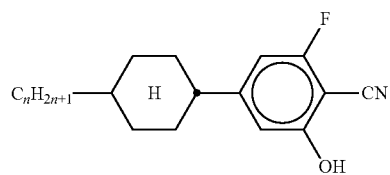
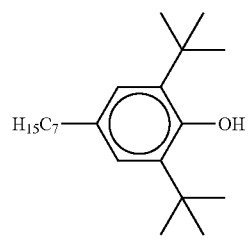
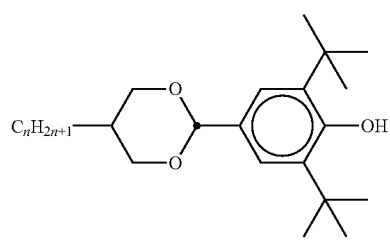
n = 1, 2, 3, 4, 5, 6 oder 7
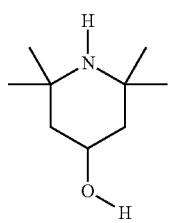
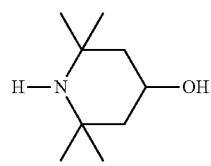

TABLE C-continued
(n = 1-12)
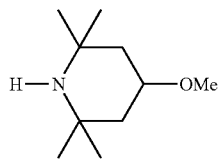
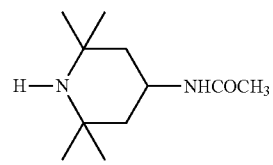
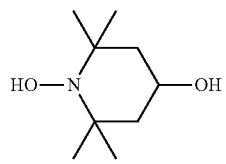
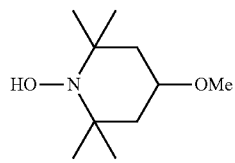
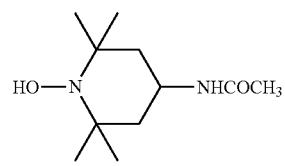
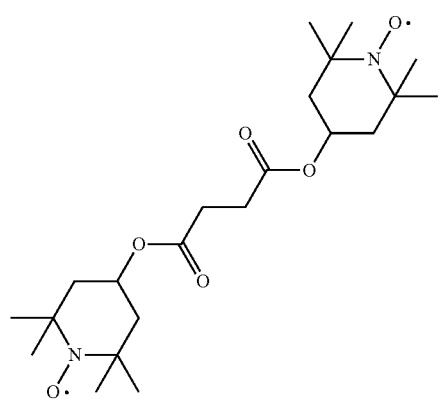

TABLE C-continued
(n = 1-12)
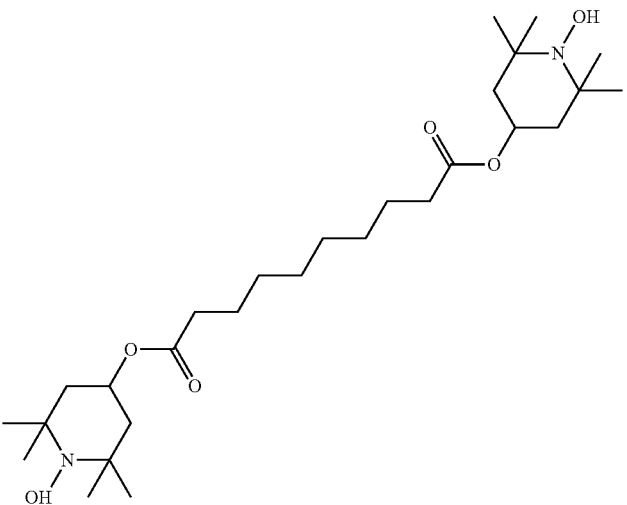
Suitable reactive mesogens for use in the mixtures according to the invention, preferably in PSA and PS-VA applications are shown in Table D below:
TABLE D
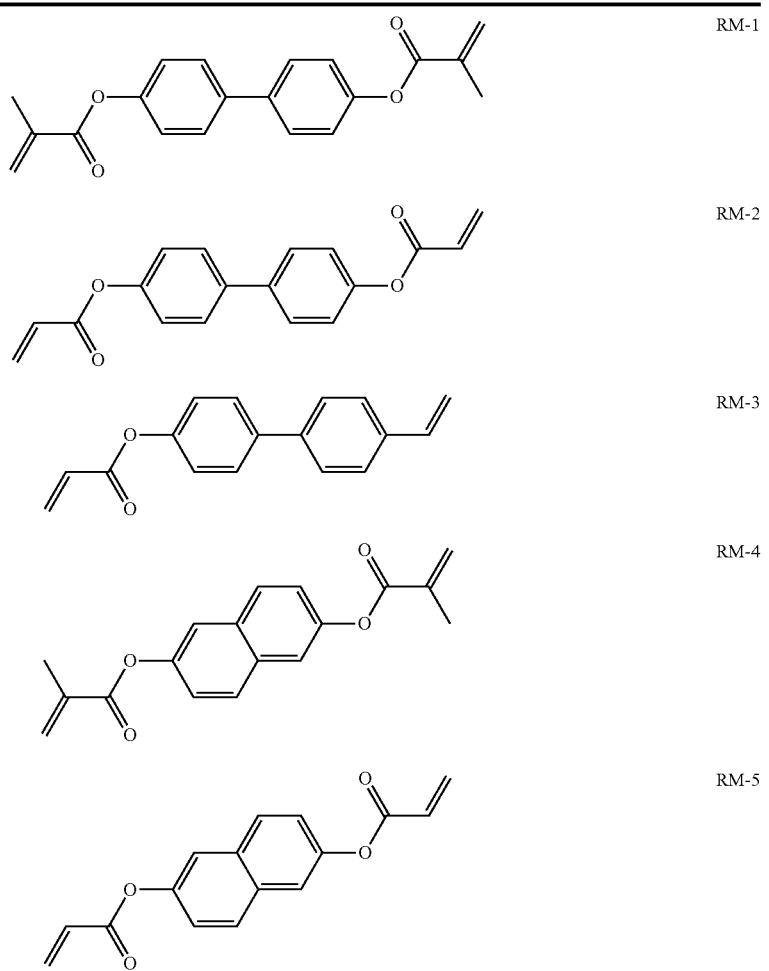

TABLE D-continued
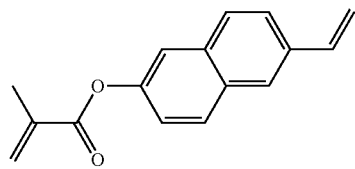
RM-6
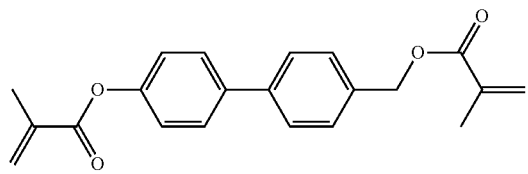
RM-7
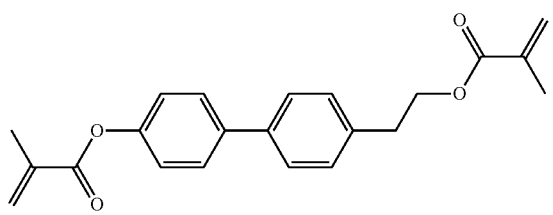
RM-8
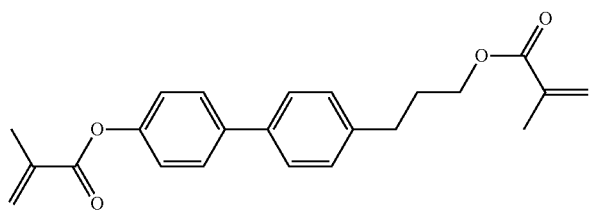
RM-9
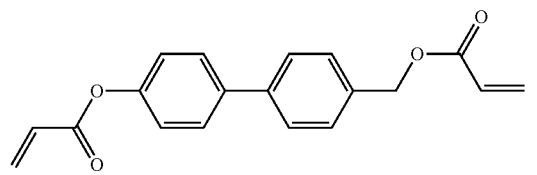
RM-10
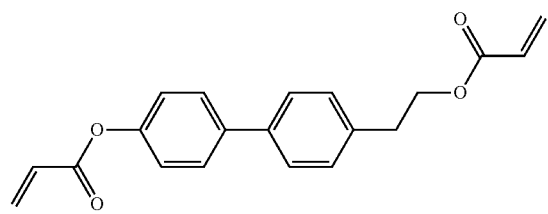
RM-11
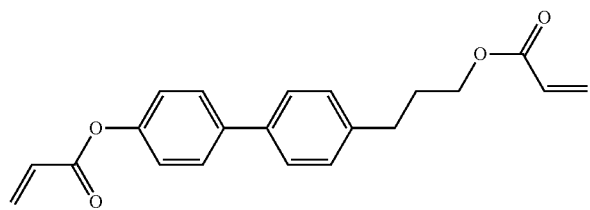
RM-12
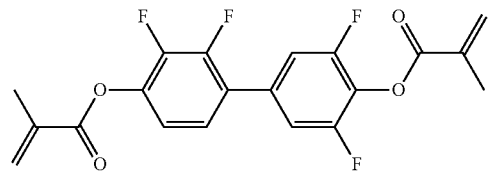
RM-13

TABLE D-continued
| | |
|---|---|
| 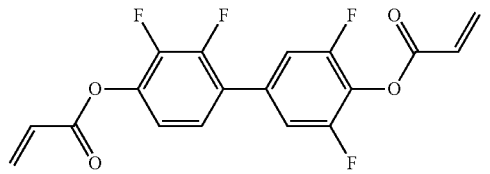 | RM-14 |
| 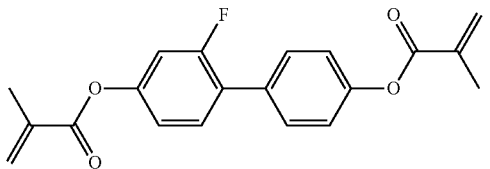 | RM-15 |
| 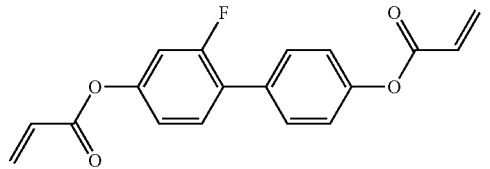 | RM-16 |
| 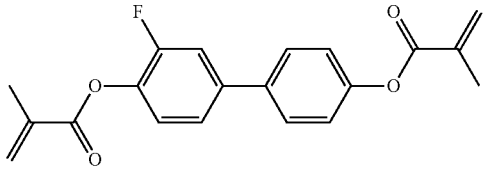 | RM-17 |
| 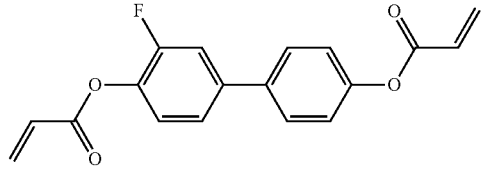 | RM-18 |
| 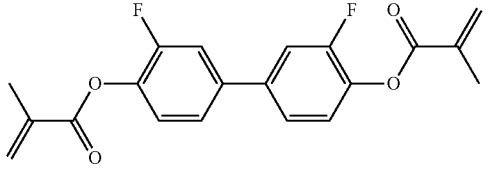 | RM-19 |
| 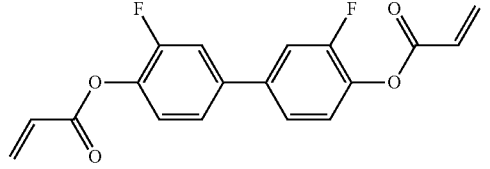 | RM-20 |
| 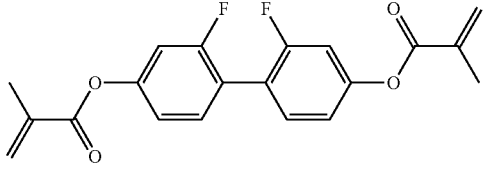 | RM-21 |
| 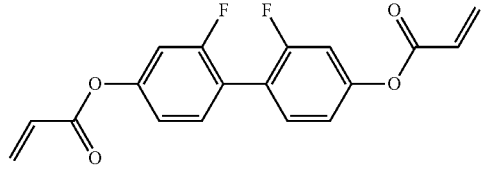 | RM-22 |

TABLE D-continued

| | |
|---|---|
| (structure) | RM-23 |
| (structure) | RM-24 |
| (structure) | RM-25 |
| (structure) | RM-26 |
| (structure) | RM-27 |
| (structure) | RM-28 |
| (structure) | RM-29 |
| (structure) | RM-30 |
| (structure) | RM-31 |

TABLE D-continued
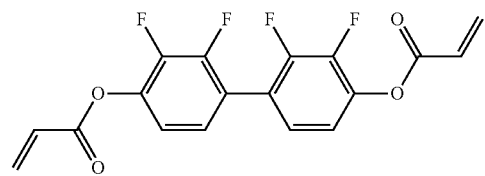 RM-32
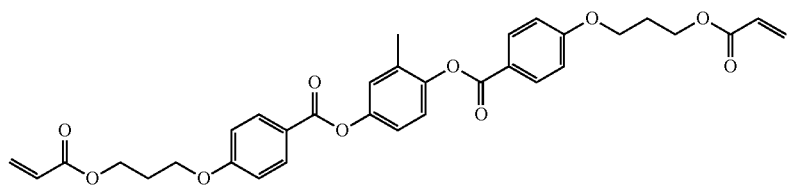 RM-33
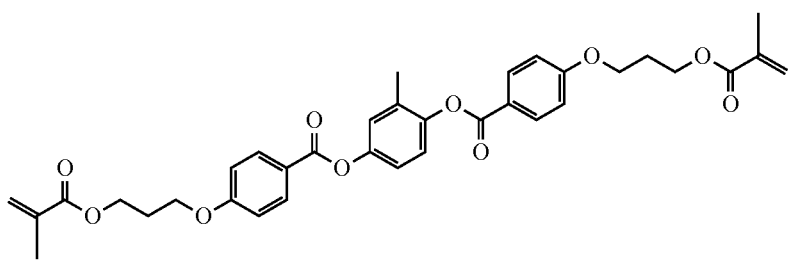 RM-34
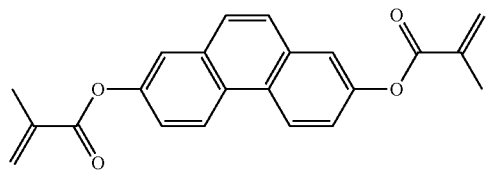 RM-35
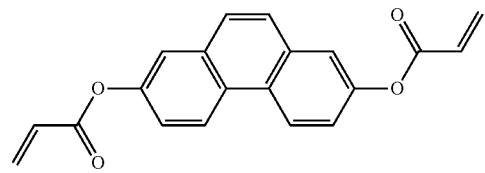 RM-36
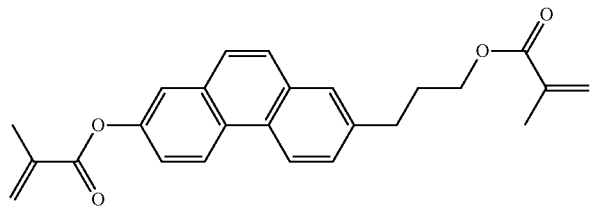 RM-37
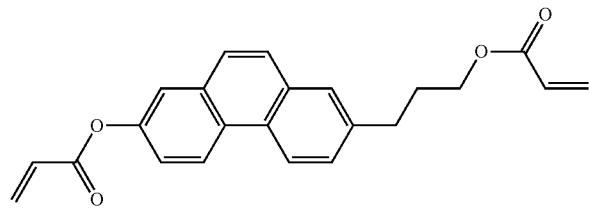 RM-38

TABLE D-continued
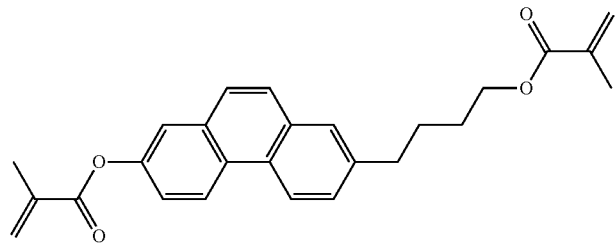 RM-39
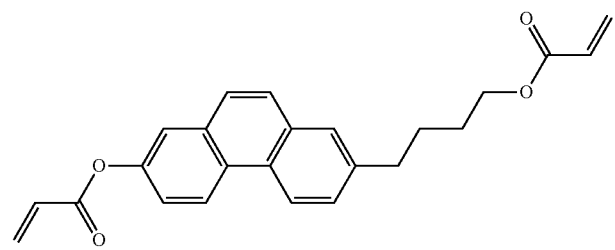 RM-40
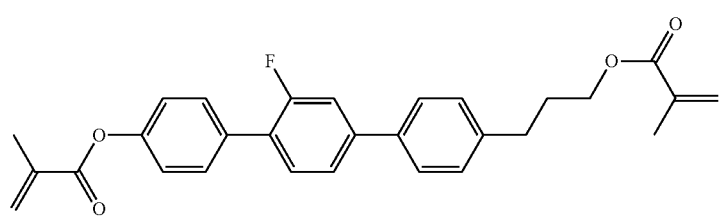 RM-41
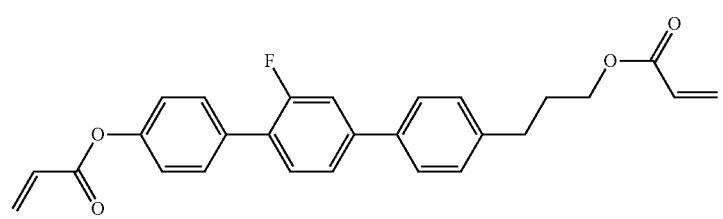 RM-42
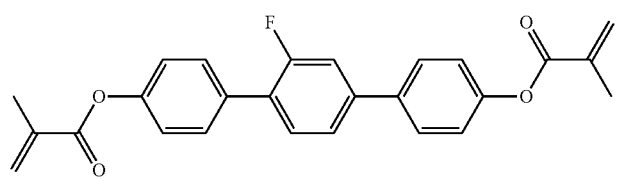 RM-43
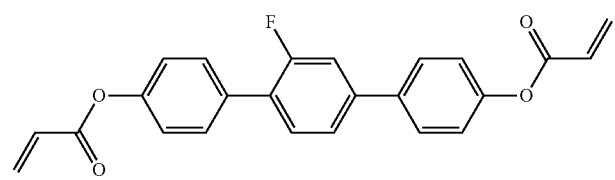 RM-44
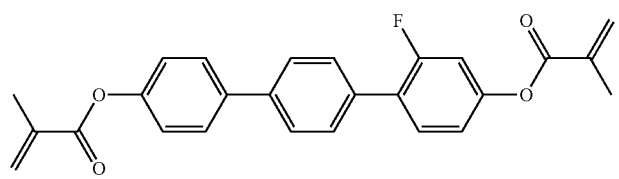 RM-45

TABLE D-continued

| | |
|---|---|
| (structure) | RM-46 |
| (structure) | RM-47 |
| (structure) | RM-48 |
| (structure) | RM-49 |
| (structure) | RM-50 |
| (structure) | RM-51 |
| (structure) | RM-52 |
| (structure) | RM-53 |

TABLE D-continued
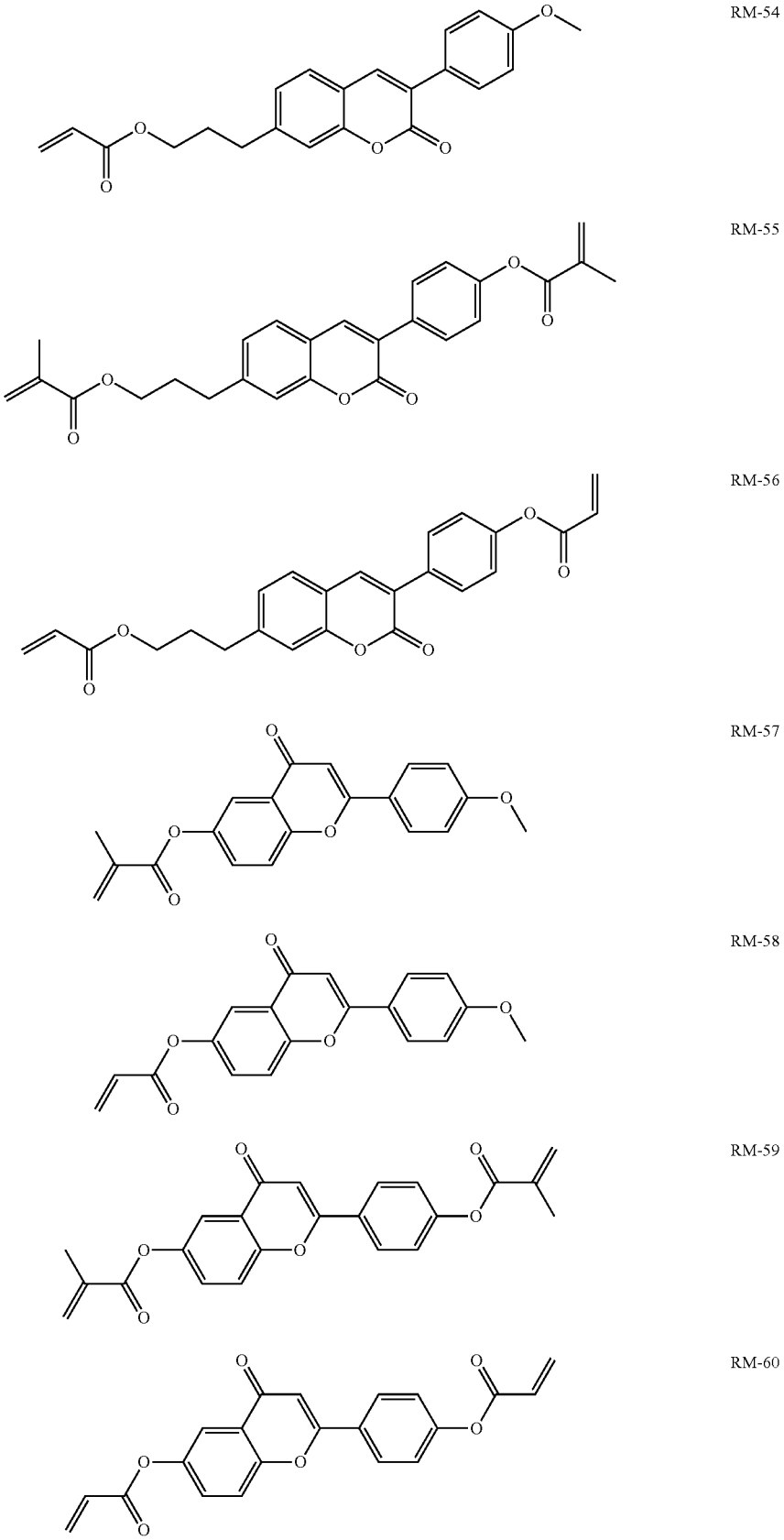

TABLE D-continued
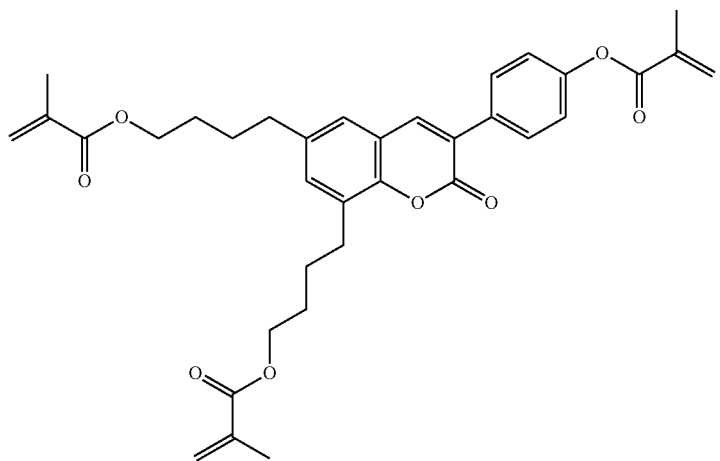
RM-61
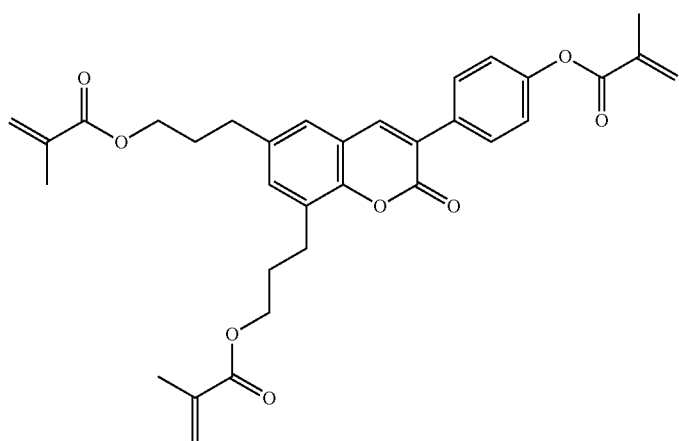
RM-62
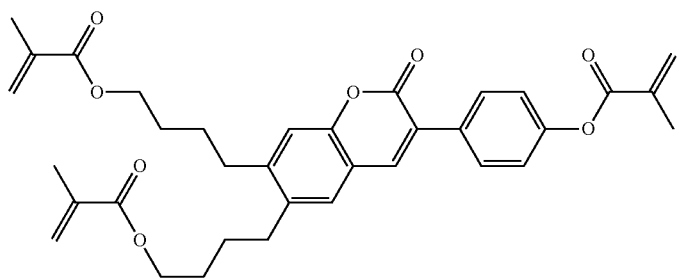
RM-63
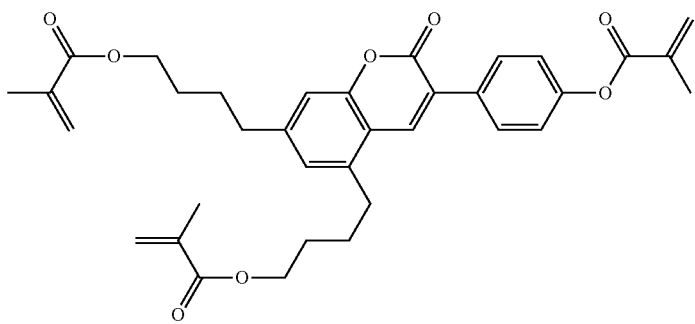
RM-64

TABLE D-continued
RM-65
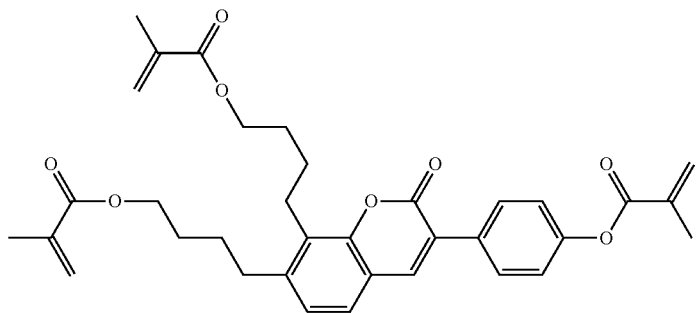
RM-66
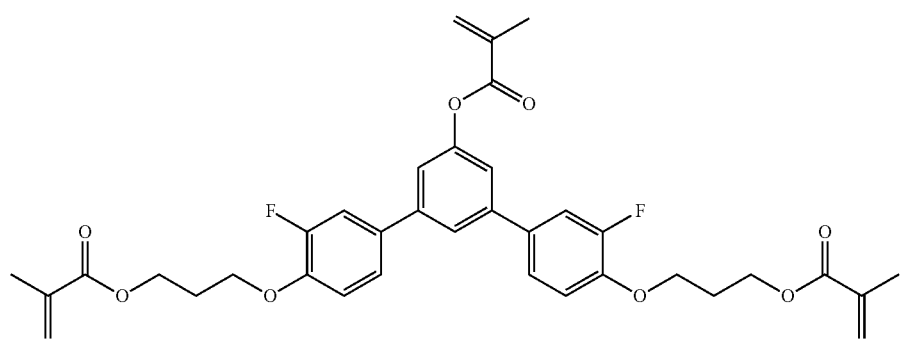
RM-67
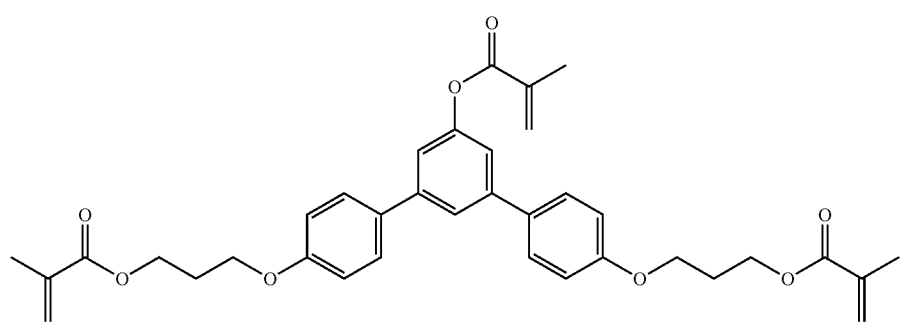
RM-68
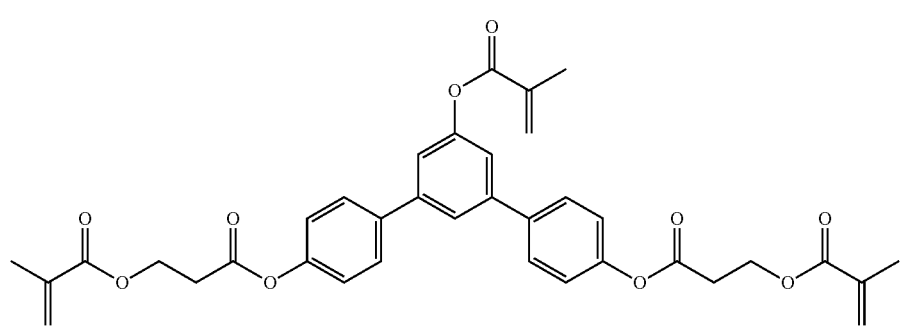
RM-69
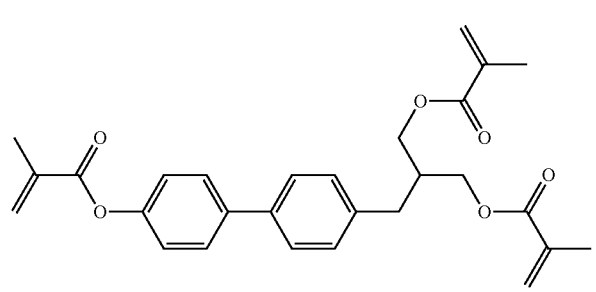

TABLE D-continued
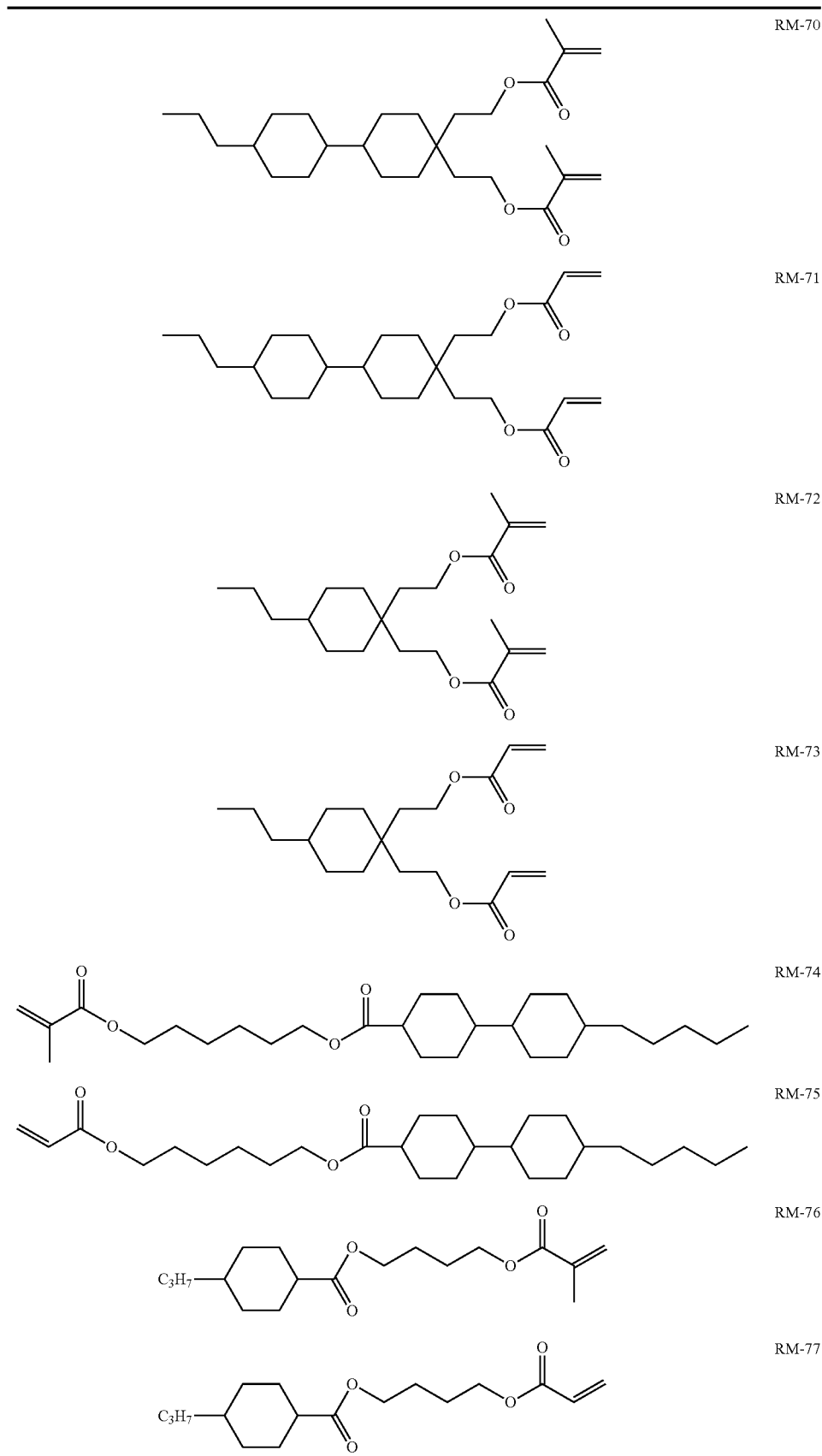

TABLE D-continued
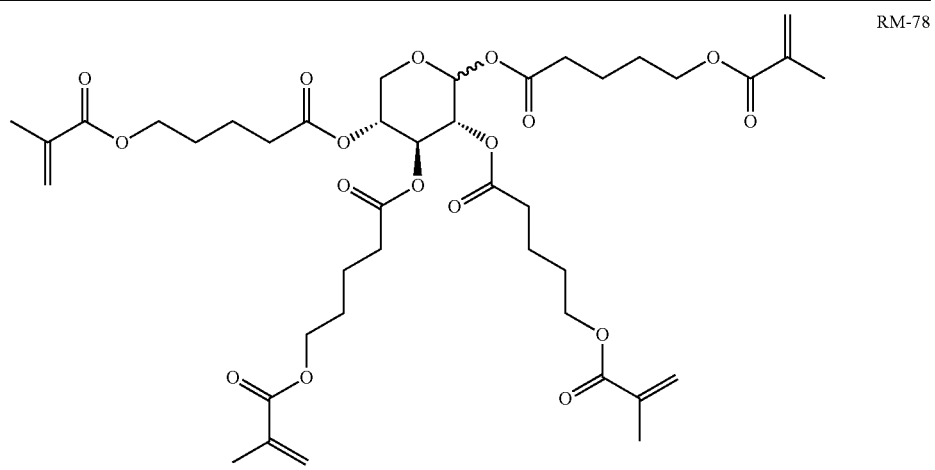
RM-78
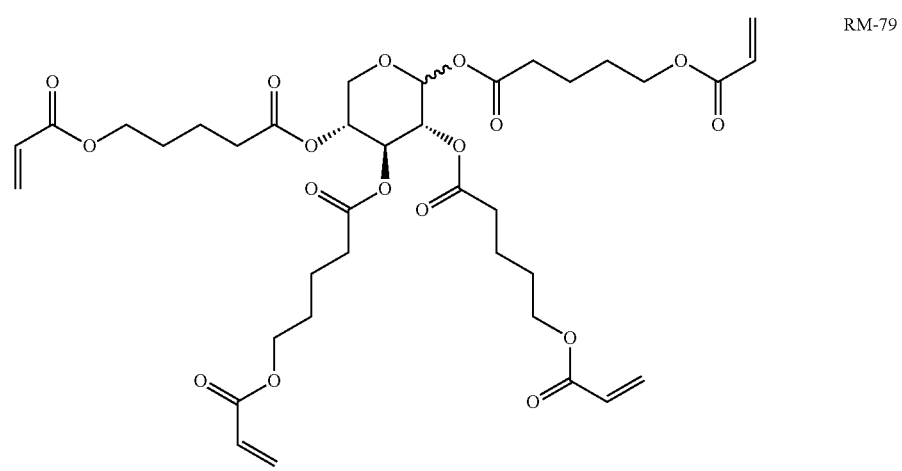
RM-79
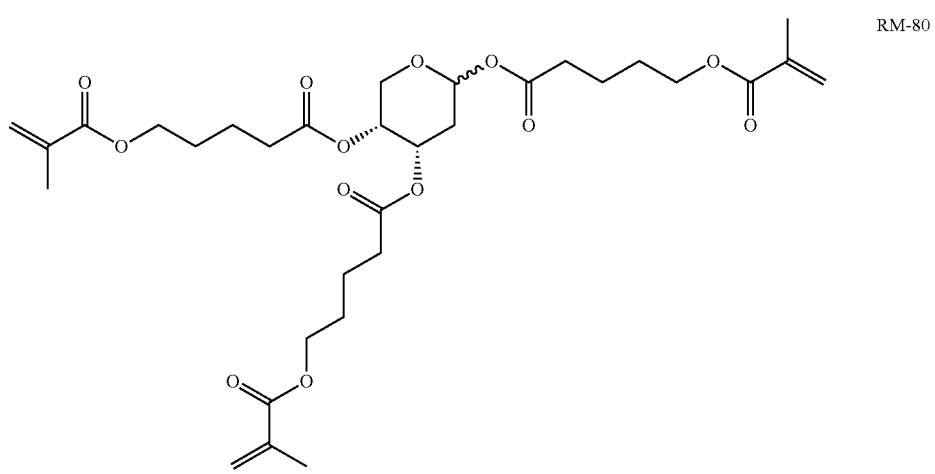
RM-80

TABLE D-continued
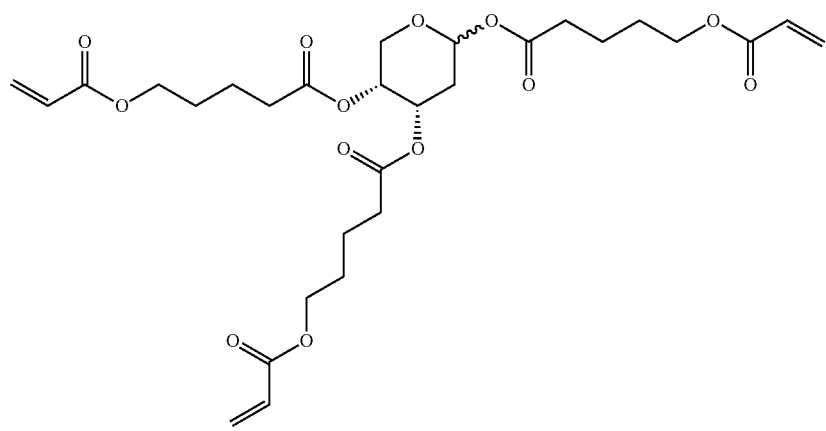
RM-81
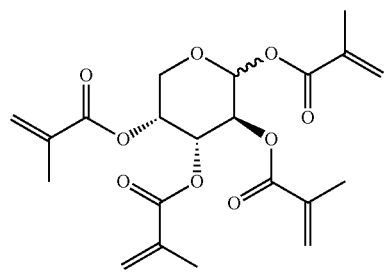
RM-82
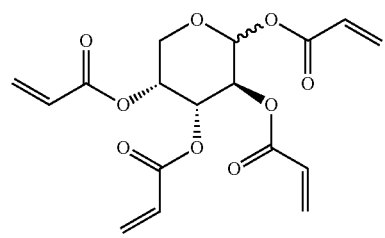
RM-83
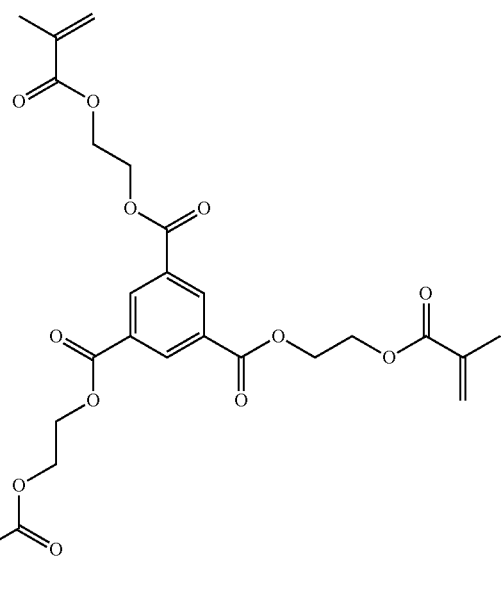
RM-84

TABLE D-continued

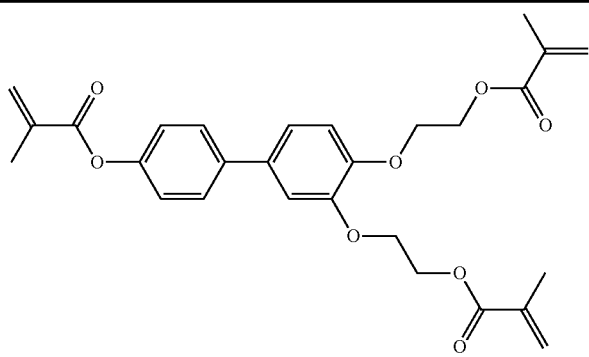

RM-85

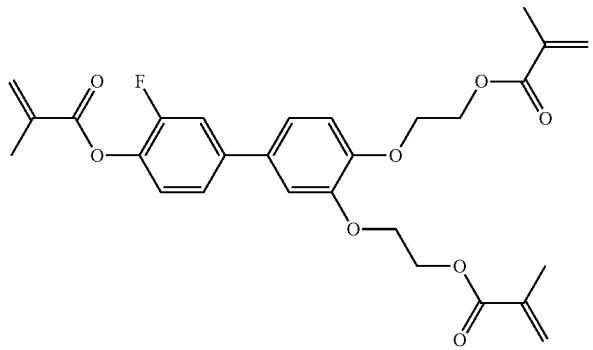

RM-86

The LC media preferably contain at least two reactive mesogens selected from the group consisting of compounds from Table D.

Unless explicitly noted otherwise, all temperature values indicated in the present application, such as, for example, the melting point T(C,N), the transition from the smectic (S) to the nematic (N) phase T(S,N) and the clearing point T(N,I), are indicated in degrees Celsius (° C.).

All physical properties are and have been determined in accordance with "Merck Liquid Crystals, Physical Properties of Liquid Crystals", Status November 1997, Merck KGaA, Germany, and apply for a temperature of 20° C., and Δn is determined at 589 nm and Δ∈ is determined at 1 kHz, unless explicitly indicated otherwise in each case.

For the present invention, the term "threshold voltage" relates to the capacitive threshold ($V_0$), also known as the Freedericksz threshold, unless explicitly indicated otherwise. In the examples, as is generally usual, the optical threshold for 10% relative contrast ($V_{10}$) may also be indicated. The display used for measurement of the capacitive threshold voltage has two plane-parallel outer plates at a separation of 4 µm and electrode layers with overlying alignment layers of rubbed polyimide on the insides of the outer plates, which cause a homeotropic edge alignment of the liquid-crystal molecules.

The polymerisable compounds are polymerised in the display by UV irradiation for a pre-determined time, with a voltage simultaneously being applied to the display (usually 10 V to 30 V alternating current, 1 kHz). In the examples, unless indicated otherwise, a 25 mW/cm² mercury vapour lamp was used, the intensity was measured using a standard UV meter (model Ushio UNI meter) fitted with a band-pass filter and/or cut-off filter transmitting the desired UV wavelengths.

The tilt angle is determined by a rotational crystal experiment (Autronic-Melchers TBA-105). A small value (i.e. a large deviation from a 90° angle) corresponds to a large tilt here.

The ranges of parameters given in this application are all including the limiting values, unless explicitly stated otherwise.

Throughout this application, unless explicitly stated otherwise, all concentrations are given in mass percent and relate to the respective complete mixture, all temperatures are given in degrees centigrade (Celsius) and all differences of temperatures in degrees centigrade.

The optical anisotropy (Δn) is determined at a wavelength of 589.3 nm. The dielectric anisotropy (Δ∈) is determined at a frequency of 1 kHz. The threshold voltages, as well as all other electro-optical properties are been determined with test cells prepared at Merck KGaA, Germany. The test cells for the determination of Δ∈ have a cell gap of approximately 20 µm. The electrode is a circular ITO electrode with an area of 1.13 cm² and a guard ring. The orientation layers are JALS 2096-R1 from JSR (Japan Synthetic Rubber), Japan for homeotropic orientation ($\in_\parallel$) and polyimide AL-1054 also from JSR for planar homogeneous orientation ($\in_\perp$). The capacities are determined with a frequency response analyser Solatron 1260 using a sine wave with a voltage of 0.3 $V_{rms}$. The electro-optical data are determined in a VA cell. These test cells used have a cell gap selected to have an optical retardation (d·Δn) matching the first transmission minimum according to Gooch and Tarry at an optical retardation (d·Δn) of 0.5 µm at 20° C., unless expressly stated otherwise.

The light used in the electro-optical measurements is white light. The set up used is an equipment commercially available from Autronic Melchers, Karlsruhe, Germany. The characteristic voltages are determined under perpendicular observation. The threshold ($V_{10}$)-mid grey ($V_{50}$)- and saturation ($V_{90}$) voltages are been determined for 10%, 50% and 90 relative contrast, respectively.

The response times are given as rise time ($\tau_{on}$) for the time for the change of the relative contrast from 0% to 90% ($t_{90}$–$t_0$), i.e. including the delay time ($t_{10}$–$t_0$), as decay time ($\tau_{off}$) for the time for the change of the relative contrast from 100% back to 10% ($t_{100}$–$t_{10}$) and as the total response time ($\tau_{total}$=$\tau_{on}$+$\tau_{off}$), respectively.

The rotational viscosity is determined using the transient current method and the flow viscosity in a modified Ubbelohde viscometer. For liquid-crystal mixtures ZLI-2293, ZLI-4792 and MLC-6608, all products from Merck KGaA, Darmstadt, Germany, the rotational viscosity values determined at 20° C. are 161 mPa·s, 133 mPa·s and 186 mPa·s respectively, and the flow viscosity values (v) are 21 $mm^2 \cdot s^{-1}$, 14 $mm^2 \cdot s^{-1}$ and 27 $mm^2 \cdot s^{-1}$ respectively.

Then the liquid crystal mixtures are stabilized by in situ polymerisation of a polymer precursor, preferably of a reactive mesogen. To this end the respective mixture is introduced into a respective test cell and the reactive compound is polymerized via UV-irradiation from a high-pressure mercury lamp. The energy of the UV exposure is 6 J. A wide-band-pass filter (300 nm≤λ≤400 nm) together with soda-lime glass are applied, which decreases intensity of the UV radiation at shorter wavelengths. During an electrical field is applied. A rectangular wave electric voltage (14 $V_{PP}$) is applied to the cells.

The following abbreviations and symbols are used in the present application:
$V_0$ threshold voltage, capacitive [V] at 20° C.,
$n_e$ extraordinary refractive index measured at 20° C. and 589 nm,
$n_o$ ordinary refractive index measured at 20° C. and 589 nm,
Δn optical anisotropy (Δn=$n_e$–$n_o$) at 20° C. and 589 nm,
$\in_\perp$ dielectric permittivity perpendicular to the director at 20° C. and 1 kHz,
$\in_\parallel$ dielectric permittivity parallel to the director at 20° C. and 1 kHz,
Δ∈ dielectric anisotropy at 20° C. and 1 kHz, (Δ∈=$\in_\parallel$–$\in_\perp$),
v flow viscosity measured at 20° C.
$\gamma_1$ rotational viscosity measured at 20° C. [mPa·s],
$K_1$ elastic constant, "splay" deformation at 20° C. [pN],
$K_2$ elastic constant, "twist" deformation at 20° C. [pN],
$K_3$ elastic constant, "bend" deformation at 20° C. [pN],
LTS low-temperature stability (phase stability) determined in test cells,
$V_0$ capacitive threshold voltage also called Freedericks threshold voltage,
$V_{10}$ threshold voltage, i.e. voltage for 10% relative contrast
$V_{50}$ mid-grey voltage, i.e. voltage for 50% relative contrast and
$V_{90}$ saturation voltage, i.e. voltage for 90% relative contrast ($V_{10}$, $V_{50}$ and $V_{90}$ all for a viewing angle perpendicular to the plate surface),
cl.p., T(N,I) clearing point [° C.],
$HR_{20}$ denotes voltage holding ratio at 20° C. [%], and
$HR_{100}$ denotes voltage holding ratio at 100° C. [%].

The following examples are intended to explain the invention without restricting it. In the examples, m.p. denotes the melting point and C denotes the clearing point of a liquid-crystalline substance in degrees Celsius; boiling points are denoted by b.p. Furthermore:

C denotes crystalline solid state, S denotes smectic phase (the index denotes the phase type), N denotes nematic state, Ch denotes cholesteric phase, I denotes isotropic phase, $T_g$ denotes glass transition temperature. The number between two symbols indicates the conversion temperature in degrees Celsius.

The host mixture used for determination of the optical anisotropy Δn of the compounds of the formula I is the commercial mixture ZLI-4792 (Merck KGaA). The dielectric anisotropy Δ∈ is determined using commercial mixture ZLI-2857. The physical data of the compound to be investigated are obtained from the change in the dielectric constants of the host mixture after addition of the compound to be investigated and extrapolation to 100% of the compound employed. In general, 10% of the compound to be investigated are dissolved in the host mixture, depending on the solubility.

The display used for measurement of the threshold voltage has two plane-parallel outer plates at a separation of 20 µm and electrode layers with overlying alignment layers of SE-1211 (Nissan Chemicals) on the insides of the outer plates, which effect a homeotropic alignment of the liquid crystals.

The following examples are intended to explain the invention without limiting it. Above and below, percent data denote percent by weight; all temperatures are indicated in degrees Celsius.

MIXTURE EXAMPLES

Example M1

To the following host mixture H1

| | | | |
|---|---|---|---|
| CY-3-O2 | 15.00% | Clearing point [° C.]: | 75.5 |
| CCY-4-O2 | 9.50% | Δn [589 nm, 20° C.]: | 0.1075 |
| CCY-5-O2 | 5.00% | Δε [1 kHz, 20° C.]: | –3.0 |
| CPY-2-O2 | 9.00% | $\varepsilon_\parallel$ [1 kHz, 20° C.]: | 3.5 |
| CPY-3-O2 | 9.00% | $\varepsilon_\perp$ [1 kHz, 20° C.]: | 6.5 |
| CCH-34 | 9.00% | $K_3$ [pN, 20° C.]: | 13.0 |
| CCH-23 | 22.00% | $K_3/K_1$ [20° C.]: | 1.01 |
| P-2-3 | 7.00% | $\gamma_1$ [mPa · s, 20° C.]: | 115 |
| PYP-2-4 | 7.50% | $V_0$ [20° C., V]: | 2.20 |
| PCH-301 | 7.00% | | | are added two reactive mesogens with different reactivity:

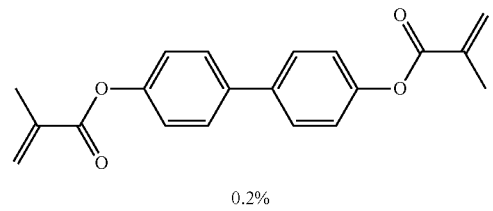

RM-1

0.2%

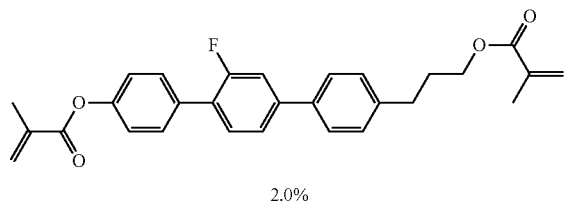

RM-41

2.0%

BRIEF DESCRIPTION OF THE DRAWINGS

RM-1 and RM-41 show a different UV absorption behaviour as shown in FIG. 1.

The PS-VA mixture is introduced into a cell with homeotropic alignment. The polymerization of RM-1 and RM-41 is done selectively. RM-41 is polymerized first by using an UV cut filter and the RM polymer layer is formed. In the next step the PS-VA process takes place with RM-1 under $2^{nd}$ UV exposure (UV light with a power of 100 mW/cm$^2$) and the pretilt angle is generated.

Example M2

To the following host mixture H1

| | | | |
|---|---|---|---|
| CY-3-O2 | 15.00% | Clearing point [° C.]: | 75.5 |
| CCY-4-O2 | 9.50% | Δn [589 nm, 20° C.]: | 0.1075 |
| CCY-5-O2 | 5.00% | Δε [1 kHz, 20° C.]: | −3.0 |
| CPY-2-O2 | 9.00% | ε$_\parallel$ [1 kHz, 20° C.]: | 3.5 |
| CPY-3-O2 | 9.00% | ε$_\perp$ [1 kHz, 20° C.]: | 6.5 |
| CCH-34 | 9.00% | K$_3$ [pN, 20° C.]: | 13.0 |
| CCH-23 | 22.00% | K$_3$/K$_1$ [20° C.]: | 1.01 |
| PYP-2-3 | 7.00% | γ$_1$ [mPa · s, 20° C.]: | 115 |
| PYP-2-4 | 7.50% | V$_0$ [20° C., V]: | 2.20 |
| PCH-301 | 7.00% | | | are added two different reactive mesogens with different reactivity:

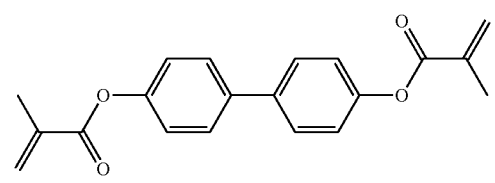

RM-1

0.2%

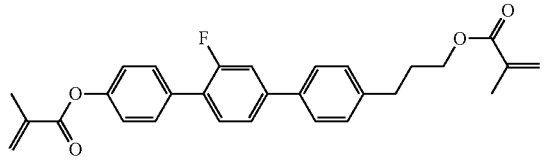

RM-41

1.0%

According to Example M1 the mixture is introduced in to a cell and the PS-VA process is applied.

Example M3

To the following host mixture H1

| | | | |
|---|---|---|---|
| CY-3-O2 | 15.00% | Clearing point [° C.]: | 75.5 |
| CCY-4-O2 | 9.50% | Δn [589 nm, 20° C.]: | 0.1075 |
| CCY-5-O2 | 5.00% | Δε [1 kHz, 20° C.]: | −3.0 |
| CPY-2-O2 | 9.00% | ε$_\parallel$ [1 kHz, 20° C.]: | 3.5 |
| CPY-3-O2 | 9.00% | ε$_\perp$ [1 kHz, 20° C.]: | 6.5 |
| CCH-34 | 9.00% | K$_3$ [pN, 20° C.]: | 13.0 |
| CCH-23 | 22.00% | K$_3$/K$_1$ [20° C.]: | 1.01 |
| PYP-2-3 | 7.00% | γ$_1$ [mPa · s, 20° C.]: | 115 |
| PYP-2-4 | 7.50% | V$_0$ [20° C., V]: | 2.20 |
| PCH-301 | 7.00% | | | are added two different reactive mesogens with different reactivity:

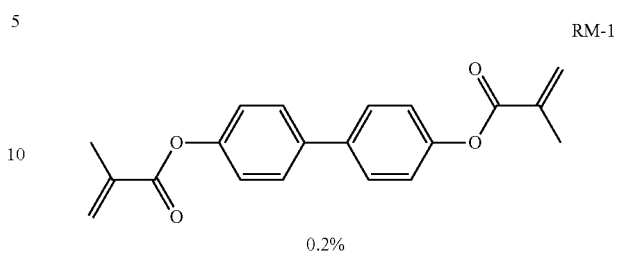

RM-1

0.2%

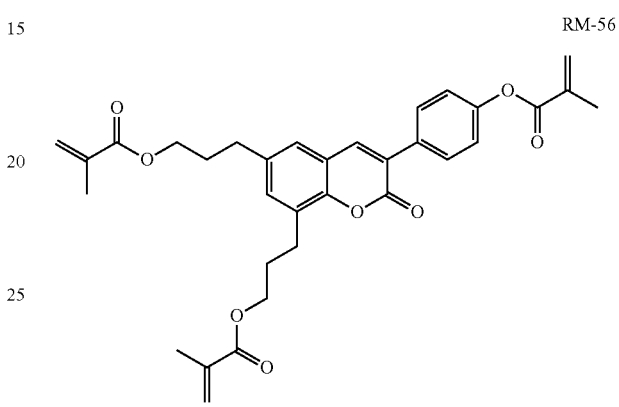

RM-56

1.0%

According to Example M1 the mixture is introduced in to a cell and the PS-VA process is applied.

Example M4

To the following host mixture H1

| | | | |
|---|---|---|---|
| CY-3-O2 | 15.00% | Clearing point [° C.]: | 74.7 |
| CY-5-O2 | 6.50% | Δn [589 nm, 20° C.]: | 0.1082 |
| CCY-3-O2 | 11.00% | Δε [1 kHz, 20° C.]: | −3.0 |
| CPY-2-O2 | 5.50% | ε$_\parallel$ [1 kHz, 20° C.]: | 3.6 |
| CPY-3-O2 | 10.50% | ε$_\perp$ [1 kHz, 20° C.]: | 6.6 |
| CC-3-V | 28.50% | K$_3$ [pN, 20° C.]: | 15.7 |
| CC-3-V1 | 10.00% | K$_3$/K$_1$ [20° C.]: | 1.22 |
| PYP-2-3 | 12.50% | γ$_1$ [mPa · s, 20° C.]: | 97 |
| PPGU-3-F | 0.50% | V$_0$ [20° C., V]: | 2.42 | are added two different reactive mesogens with different reactivity:

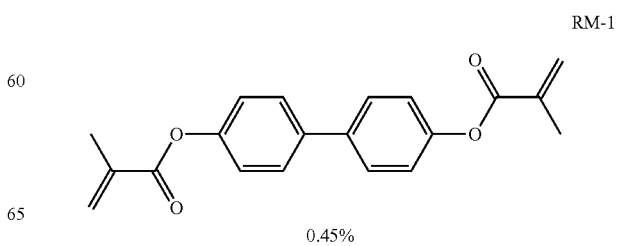

RM-1

0.45%

-continued

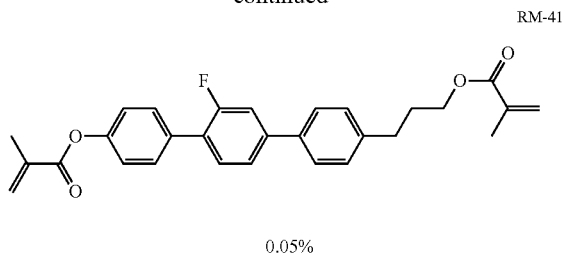

RM-41

0.05%

According to Example M1 the mixture is introduced in to a cell and the PS-VA process is applied.

Example M5

To the following host mixture H1

| | | | |
|---|---|---|---|
| CY-3-O2 | 15.00% | Clearing point [° C.]: | 74.7 |
| CY-5-O2 | 6.50% | Δn [589 nm, 20° C.]: | 0.1082 |
| CCY-3-O2 | 11.00% | Δε [1 kHz, 20° C.]: | −3.0 |
| CPY-2-O2 | 5.50% | $\varepsilon_\parallel$ [1 kHz, 20° C.]: | 3.6 |
| CPY-3-O2 | 10.50% | $\varepsilon_\perp$ [1 kHz, 20° C.]: | 6.6 |
| CC-3-V | 28.50% | $K_3$ [pN, 20° C.]: | 15.7 |
| CC-3-V1 | 10.00% | $K_3/K_1$ [20° C.]: | 1.22 |
| PYP-2-3 | 12.50% | $\gamma_1$ [mPa · s, 20° C.]: | 97 |
| PPGU-3-F | 0.50% | $V_0$ [20° C., V]: | 2.42 | are added two different reactive mesogens with different reactivity:

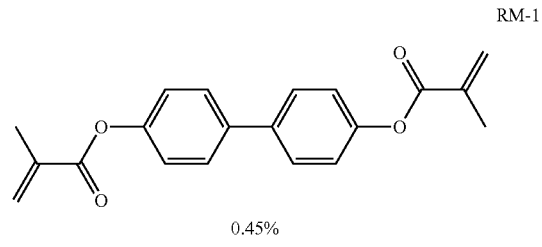

RM-1

0.45%

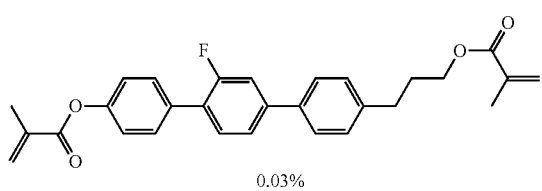

RM-41

0.03%

According to Example M1 the mixture is introduced in to a cell and the PS-VA process is applied.

Example M6

To the following host mixture H1

| | | | |
|---|---|---|---|
| CY-3-O2 | 15.00% | Clearing point [° C.]: | 74.7 |
| CY-5-O2 | 6.50% | Δn [589 nm, 20° C.]: | 0.1082 |
| CCY-3-O2 | 11.00% | Δε [1 kHz, 20° C.]: | −3.0 |
| CPY-2-O2 | 5.50% | $\varepsilon_\parallel$ [1 kHz, 20° C.]: | 3.6 |
| CPY-3-O2 | 10.50% | $\varepsilon_\perp$ [1 kHz, 20° C.]: | 6.6 |
| CC-3-V | 28.50% | $K_3$ [pN, 20° C.]: | 15.7 |
| CC-3-V1 | 10.00% | $K_3/K_1$ [20° C.]: | 1.22 |
| PYP-2-3 | 12.50% | $\gamma_1$ [mPa · s, 20° C.]: | 97 |
| PPGU-3-F | 0.50% | $V_0$ [20° C., V]: | 2.42 | are added two different reactive mesogens with different reactivity:

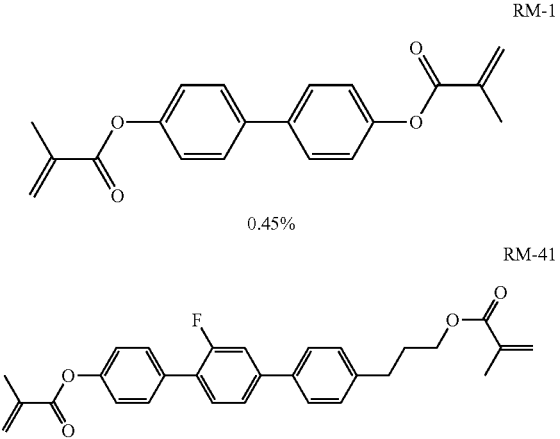

RM-1

0.45%

RM-41

0.01%

According to Example M1 the mixture is introduced in to a cell and the PS-VA process is applied.

The invention claimed is:

1. A liquid-crystalline medium based on a mixture of polar compounds having negative dielectric anisotropy, comprising at least two reactive mesogens, at least two of said reactive mesogens having sufficiently different polymerization reactivity from one another allowing their polymerization by two separate polymerizations and at least one compound selected from the group of compounds consisting of the compounds of formulae IIA, IIB and IIC,

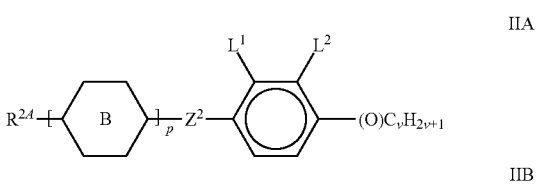

IIA

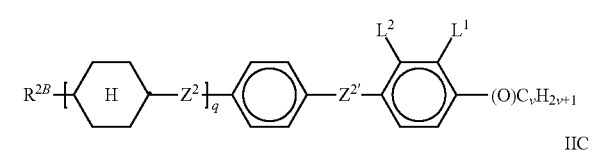

IIB

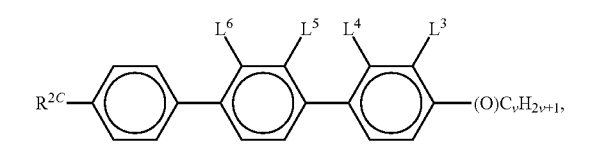

IIC in which $R^{2A}$, $R^{2B}$ and $R^{2C}$ each, independently of one another, denote H, an alkyl or alkenyl radical having up to 15 C atoms which is unsubstituted, monosubstituted by CN or $CF_3$ or at least monosubstituted by halogen, in which one or more CH$_2$ groups are optionally replaced by —O—, —S—,

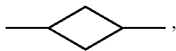

—C≡C—, —CF$_2$O—, —OCF$_2$—, —OC—O— or —O—CO— in such a way that O atoms are not linked directly to one another,

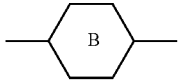

denotes

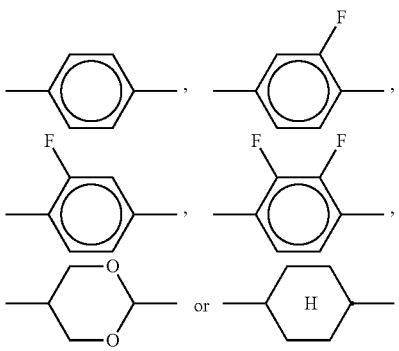

Y$^{1-6}$ each, independently of one another, denote H or F,
L$^1$ and L$^2$ each, independently of one another, denote F, Cl, CF$_3$ or CHF$_2$,
L$^{3-6}$ each, independently of one another, denote H, F, Cl, CF$_3$ or CHF$_2$, but at least two of L$^{3-6}$ denote F, Cl, CF$_3$ or CHF$_2$,
Z$^2$ and Z$^{2'}$ each, independently of one another, denote a single bond, —CH$_2$CH$_2$—, —CH=CH—, —C≡C—, —CF$_2$O—, —OCF$_2$—, —CH$_2$O—, —OCH$_2$—, —COO—, —OCO—, —CF=CF—, or —CH=CHCH$_2$O—,
p denotes 1 or 2, and, in the case where Z$^2$=single bond, p also denotes 0,
q denotes 0 or 1,
y denotes 0 or 1, and
denotes 1 to 6.

2. The liquid-crystalline medium according to claim 1, wherein the at least two reactive mesogens each having a polymerization reactivity that is different from the other of the at least two reactive mesogens are compounds of formula I

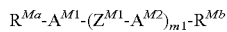

wherein
R$^{Ma}$ and R$^{Mb}$ each, independently of one another, denote P, P-Sp-, H, halogen, SF$_5$, NO$_2$, an alkyl, alkenyl or alkynyl group,
P denotes a polymerizable group,
Sp denotes a spacer group or a single bond,
A$^{M1}$ and A$^{M2}$ each, independently of one another, denote an aromatic, heteroaromatic, alicyclic or heterocyclic group, which optionally encompasses or contains fused rings, and which is optionally mono- or polysubstituted by L,
L denotes P, P-Sp-, OH, CH$_2$OH, F, Cl, Br, I, —CN, —NO$_2$, —NCO, —NCS, —OCN, —SCN, —C(=O)N(Rx)$_2$, —C(=O)Y$^1$, —C(=O)R$^x$, —N(R$^x$)$_2$, SF$_5$, optionally substituted silyl, optionally substituted aryl having 6 to 20 C atoms, or straight-chain or branched alkyl, alkenyl, alkynyl, alkoxy, alkylcarbonyl, alkoxycarbonyl, alkylcarbonyloxy or alkoxycarbonyloxy having 1 to 25 C atoms, in which one or more H atoms are optionally replaced by F, Cl, P or P-Sp-,
Y$^1$ denotes halogen,
Z$^{M1}$ denotes —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH=CH—, —CF=CF—, —C≡C—, —CH=CH—, —COO—, —OCO—CH=CH—, CR$^0$R$^{00}$ or a single bond,
R$^0$ and R$^{00}$ each, independently of one another, denote H or alkyl having 1 to 12 C atoms,
R$^x$ denotes P, P-Sp-, H, halogen, straight-chain, branched or cyclic alkyl having 1 to 25 C atoms, in which one or more non-adjacent CH$_2$ groups are optionally replaced by —O—, —S—, —CO—, —CO—O—, —O—CO—, or —O—CO—O— in such a way that O and/or S atoms are not linked directly to one another, and in which one or more H atoms are optionally replaced by F, Cl, P or P-Sp-, an optionally substituted aryl or aryloxy group having 6 to 40 C atoms, or an optionally substituted heteroaryl or heteroaryloxy group having 2 to 40 C atoms,
m1 denotes 0, 1, 2, 3 or 4, and
n1 denotes 1, 2, 3 or 4,
where at least one of R$^{Ma}$, R$^{Mb}$ and L denotes P or P-Sp- or contains at least one group P or P-Sp-.

3. The liquid-crystalline medium according to claim 2, wherein one of R$^{Ma}$ and R$^{Mb}$ or both denote(s) P or P-Sp-.

4. The liquid-crystalline medium according to claim 1, which contains at least two reactive mesogens selected from the group consisting of the compounds of formulae I-1 to I-44

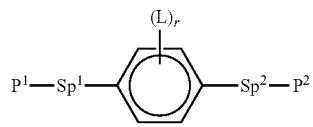

I-1

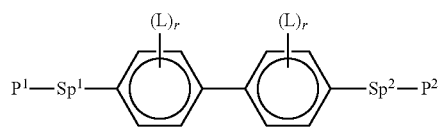

I-2

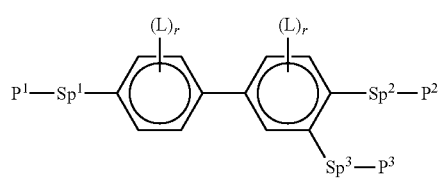

I-3

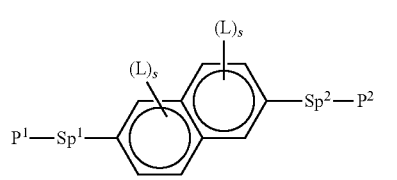

I-4

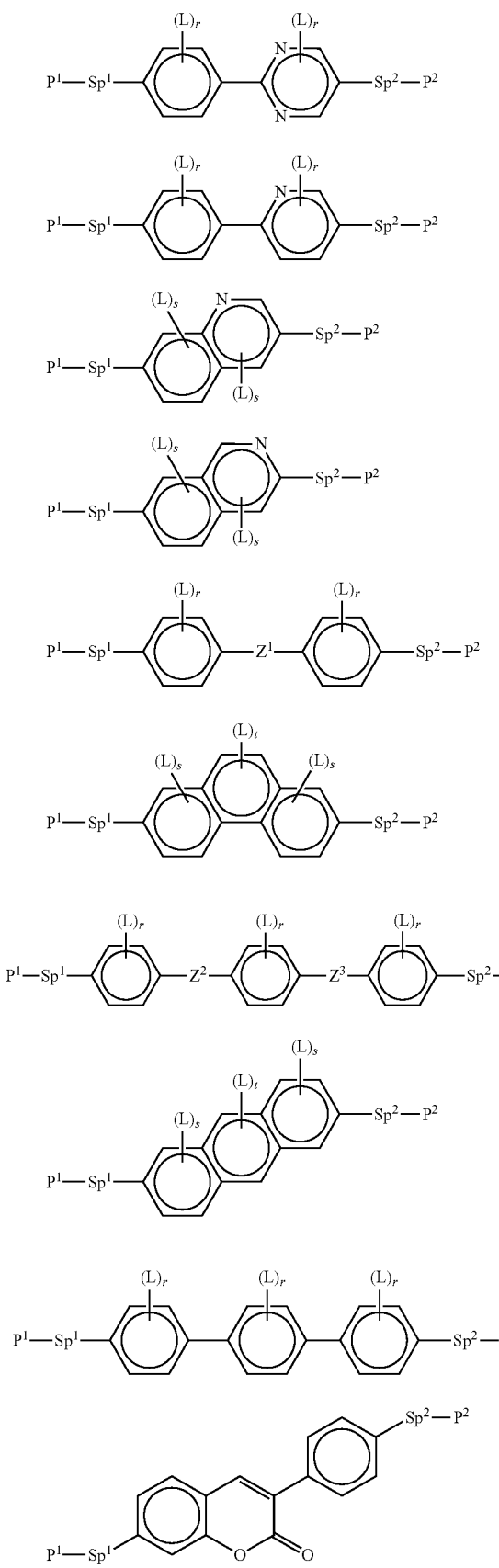
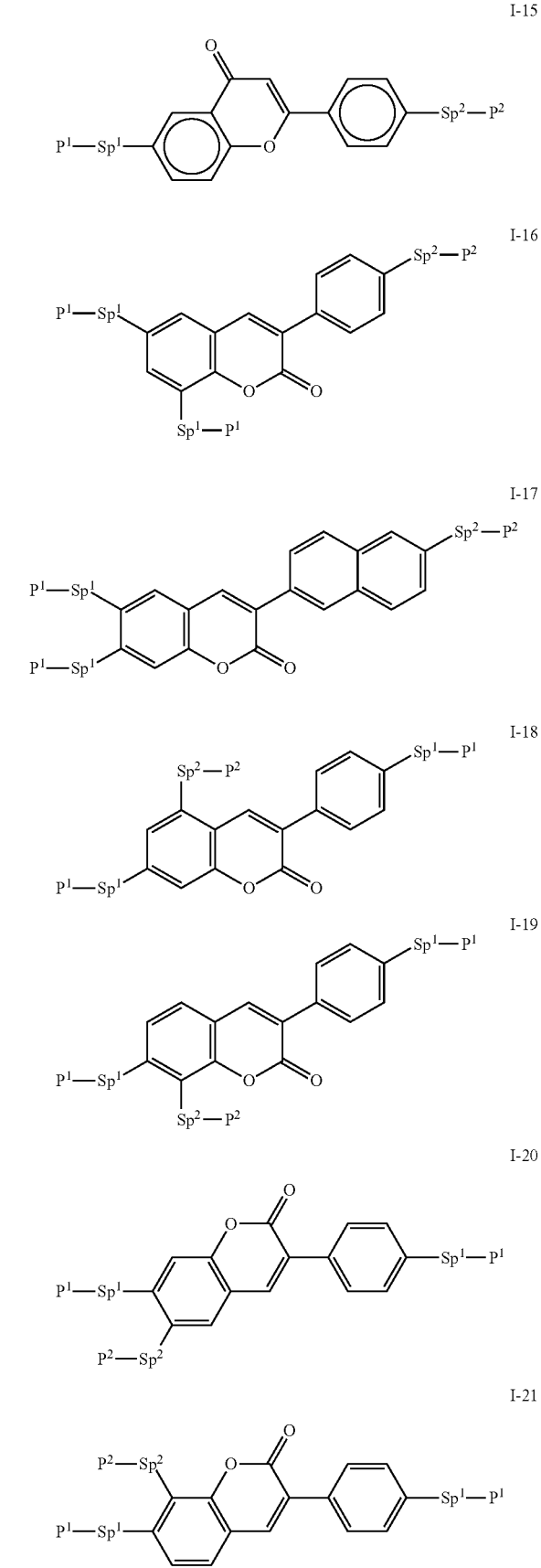

I-22 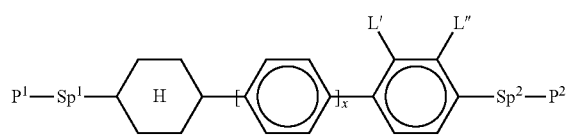
I-23 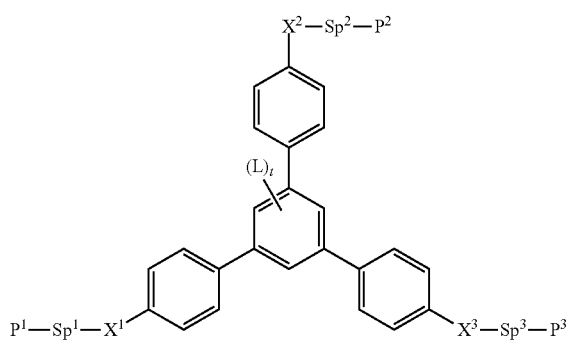
I-24 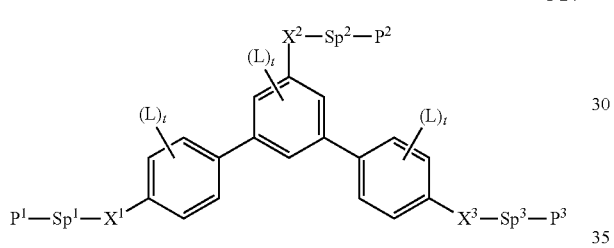
I-25 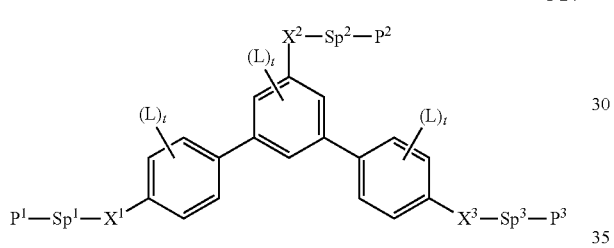
I-26 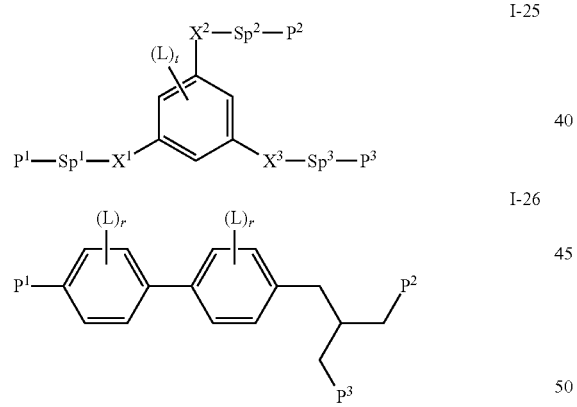
I-27 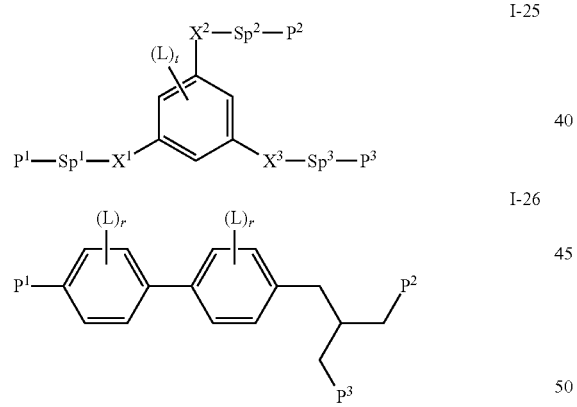
I-28 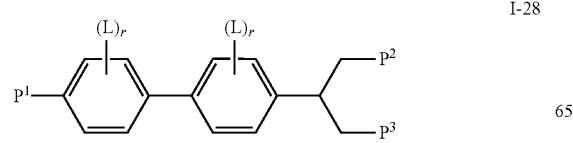
I-29 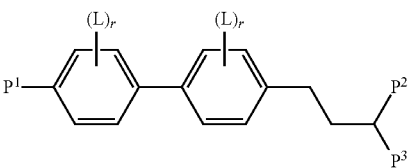
I-30 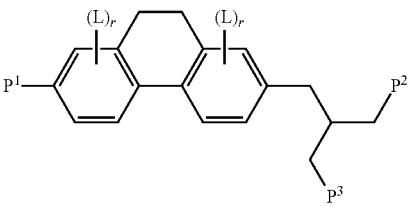
I-31 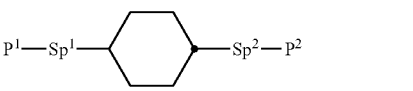
I-32 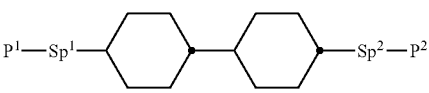
I-33 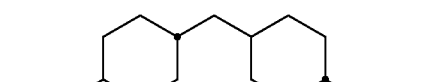
I-34 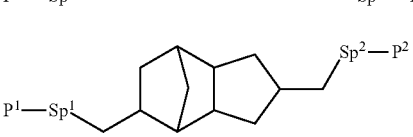
I-35 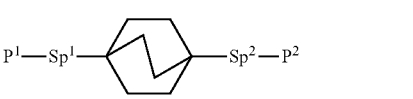
I-36 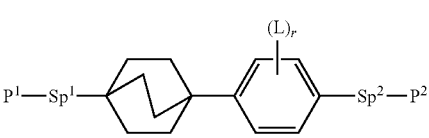
I-37 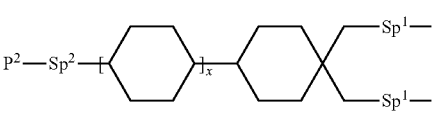
I-38 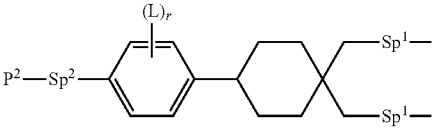
I-39 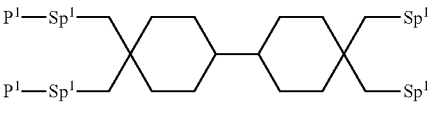
I-40 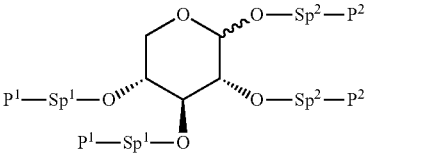

-continued

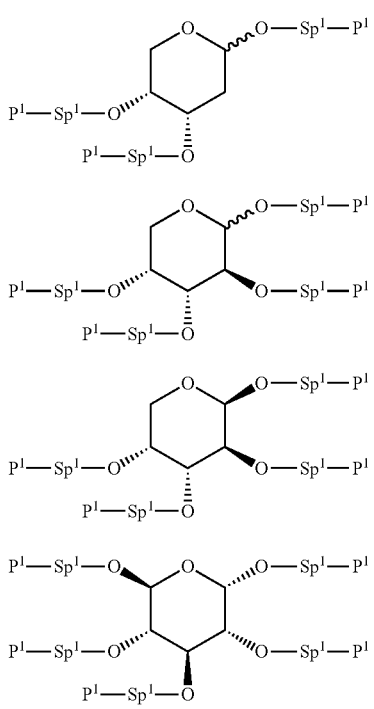

I-41

I-42

I-43

I-44 wherein
P¹ and P² each, independently of one another, denote a polymerizable group,
Sp¹ and Sp² each, independently of one another, denote a single bond or a spacer group, where one of the radicals P¹-Sp¹- and P²—Sp²- optionally denotes $R^{aa}$, $R^{aa}$ denotes H, F, Cl, CN or straight-chain or branched alkyl having 1 to 25 C atoms, in which one or more non-adjacent $CH_2$ groups are optionally each replaced, independently of one another, by —C($R^o$)=C($R^{oo}$))—, —C≡C—, N($R^o$)—, —O—, —S—, —CO—, —CO—O—, —O—CO—, or —O—CO—O— in such a way that O and/or S atoms are not linked directly to one another, and in which one or more H atoms are optionally replaced by F, Cl, CN or P¹-SP¹-, $R^o$, $R^{oo}$ each, independently of one another and on each occurrence identically or differently, denote H or alkyl having 1 to 12 C atoms, $R^y$ and $R^z$ each, independently of one another, denote H, F, $CH_3$ or $CF_3$, $Z^1$ denotes —O—, —CO—, —C($R^yR^z$)— or —$CF_2CF_2$—, $Z^2$ and $Z^3$ each, independently of one another, denote —CO—O—, —O—CO—, —$CH_2$O—, —O$CH_2$—, —$CF_2$O—, —O$CF_2$— or —$(CH_2)_n$—, n is 2, 3 or 4, L on each occurrence, identically or differently, denotes F, Cl, CN, or straight-chain or branched, optionally mono- or polyfluorinated alkyl, alkoxy, alkenyl, alkynyl, alkylcarbonyl, alkoxycarbonyl or alkylcarbonyloxy having 1 to 12 C atoms, L' and L" each, independently of one another, denote H, F, Cl or $CF_3$, r denotes 0, 1, 2, 3 or 4, denotes 0, 1, 2 or 3, t denotes 0, 1 or 2, and x denotes 0 or 1.

5. The liquid-crystalline medium according to claim 1, which contains at least two reactive mesogens selected from the group consisting of the compounds of formulae RM-1 to RM-86:

RM-1
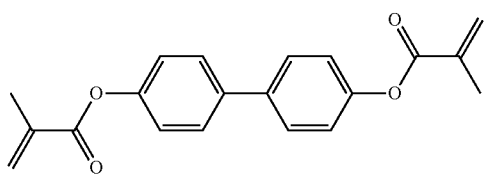

RM-2
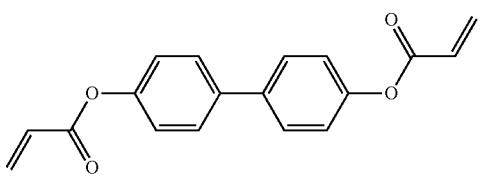

RM-3
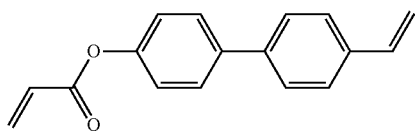 [SMILES: C=CC(=O)Oc1ccc(-c2ccc(C=C)cc2)cc1]

RM-4
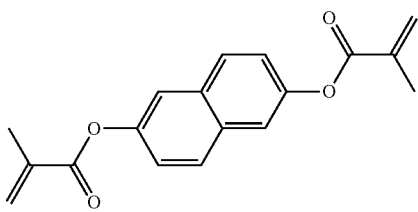 [SMILES: C=C(C)C(=O)Oc1ccc2cc(OC(=O)C(=C)C)ccc2c1]

RM-5
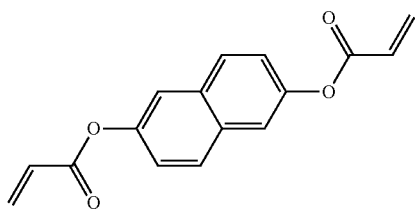 [SMILES: C=CC(=O)Oc1ccc2cc(OC(=O)C=C)ccc2c1]

RM-6
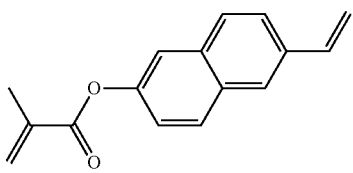 [SMILES: C=Cc1ccc2cc(OC(=O)C(=C)C)ccc2c1]

-continued
RM-7
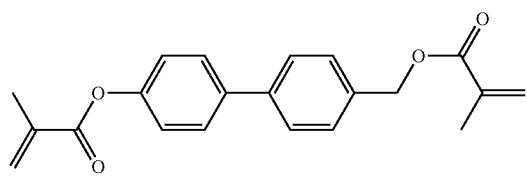 [SMILES: C=C(C)C(=O)OCc1ccc(-c2ccc(OC(=O)C(=C)C)cc2)cc1]
RM-8
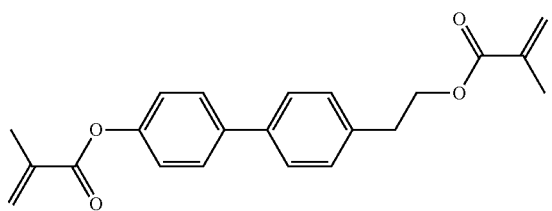 [SMILES: C=C(C)C(=O)OCCc1ccc(-c2ccc(OC(=O)C(=C)C)cc2)cc1]
RM-9
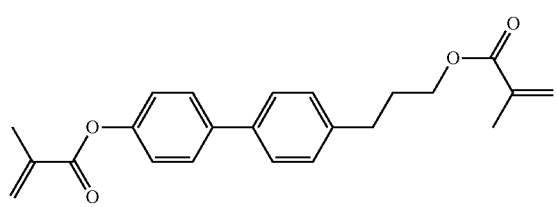 [SMILES: C=C(C)C(=O)OCCCc1ccc(-c2ccc(OC(=O)C(=C)C)cc2)cc1]
RM-10
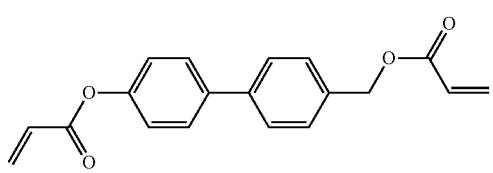 [SMILES: C=CC(=O)OCc1ccc(-c2ccc(OC(=O)C=C)cc2)cc1]
RM-11
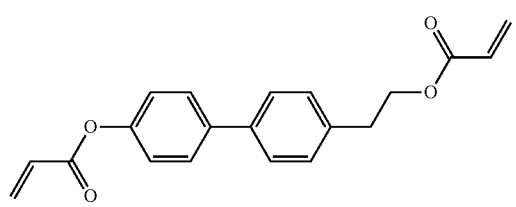 [SMILES: C=CC(=O)OCCc1ccc(-c2ccc(OC(=O)C=C)cc2)cc1]
RM-12
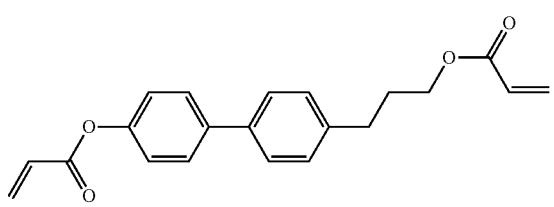 [SMILES: C=CC(=O)OCCCc1ccc(-c2ccc(OC(=O)C=C)cc2)cc1]
RM-13
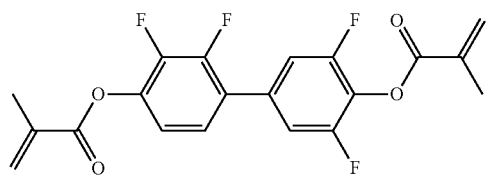
RM-14
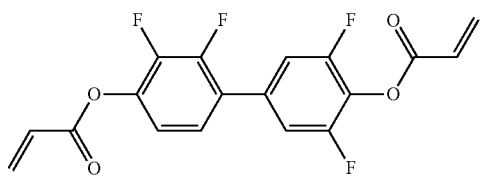
RM-15
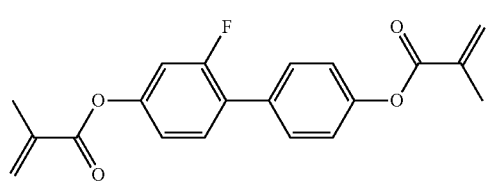
RM-16
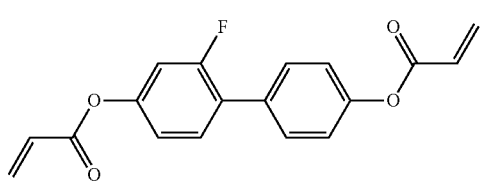 [SMILES: C=CC(=O)Oc1ccc(-c2ccc(OC(=O)C=C)cc2F)cc1]
RM-17
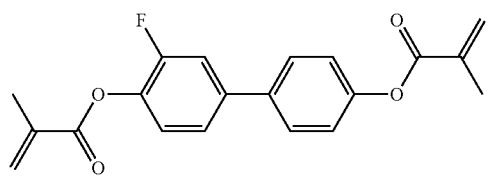 [SMILES: C=C(C)C(=O)Oc1ccc(-c2ccc(OC(=O)C(=C)C)c(F)c2)cc1]
RM-18
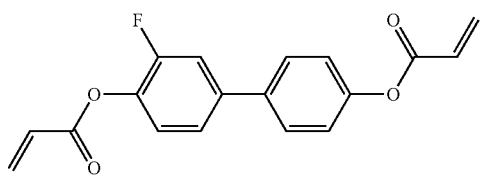 [SMILES: C=CC(=O)Oc1ccc(-c2ccc(OC(=O)C=C)c(F)c2)cc1]
RM-19
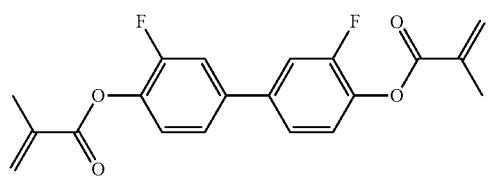 [SMILES: C=C(C)C(=O)Oc1ccc(-c2ccc(OC(=O)C(=C)C)c(F)c2)cc1F]
RM-20
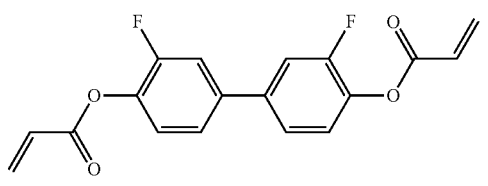 [SMILES: C=CC(=O)Oc1ccc(-c2ccc(OC(=O)C=C)c(F)c2)cc1F]
RM-21
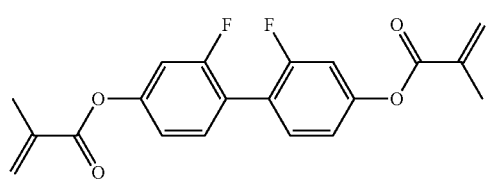 [SMILES: C=C(C)C(=O)Oc1ccc(-c2ccc(OC(=O)C(=C)C)cc2F)c(F)c1]
RM-22
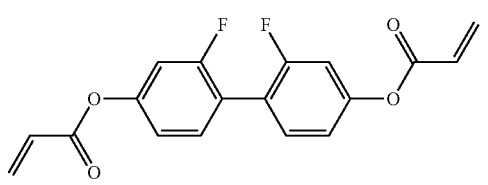 [SMILES: C=CC(=O)Oc1ccc(-c2ccc(OC(=O)C=C)cc2F)c(F)c1]

-continued
RM-23
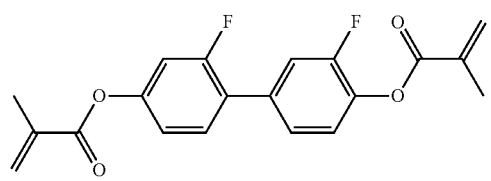 [SMILES: C=C(C)C(=O)Oc1ccc(-c2ccc(OC(=O)C(=C)C)c(F)c2)c(F)c1]
RM-24
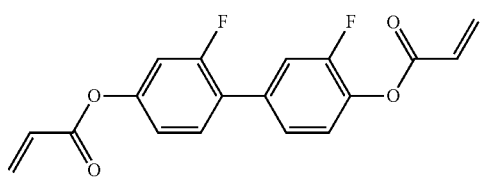 [SMILES: C=CC(=O)Oc1ccc(-c2ccc(OC(=O)C=C)c(F)c2)c(F)c1]
RM-25
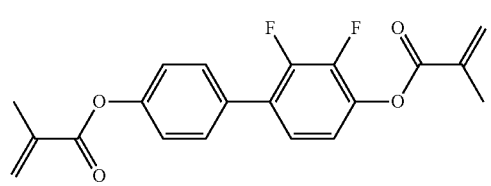
RM-26
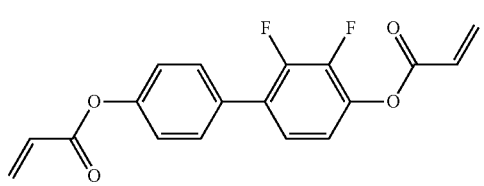
RM-27
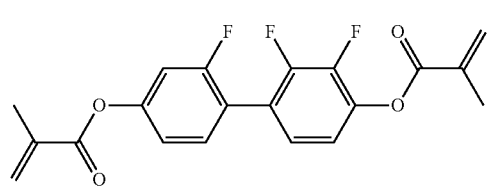 [SMILES: C=C(C)C(=O)Oc1ccc(-c2ccc(OC(=O)C(=C)C)c(F)c2F)c(F)c1]
RM-28
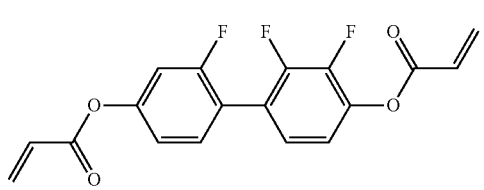 [SMILES: C=CC(=O)Oc1ccc(-c2ccc(OC(=O)C=C)c(F)c2F)c(F)c1]
RM-29
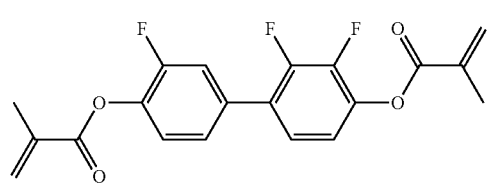 [SMILES: C=C(C)C(=O)Oc1ccc(-c2ccc(OC(=O)C(=C)C)c(F)c2F)cc1F]
RM-30
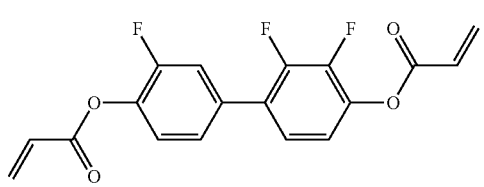 [SMILES: C=CC(=O)Oc1ccc(-c2ccc(OC(=O)C=C)c(F)c2F)cc1F]
RM-31
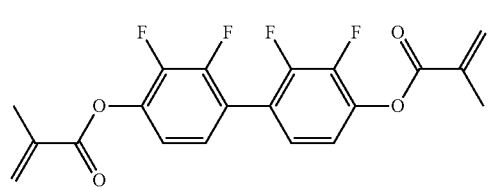 [SMILES: C=C(C)C(=O)Oc1ccc(-c2ccc(OC(=O)C(=C)C)c(F)c2F)c(F)c1F]
RM-32
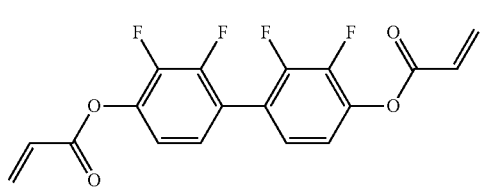 [SMILES: C=CC(=O)Oc1ccc(-c2ccc(OC(=O)C=C)c(F)c2F)c(F)c1F]
RM-33
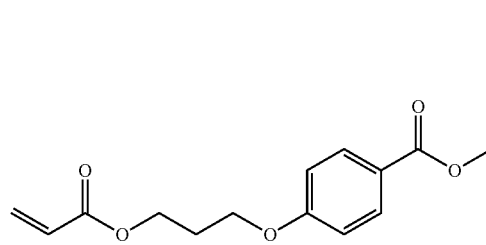
RM-34
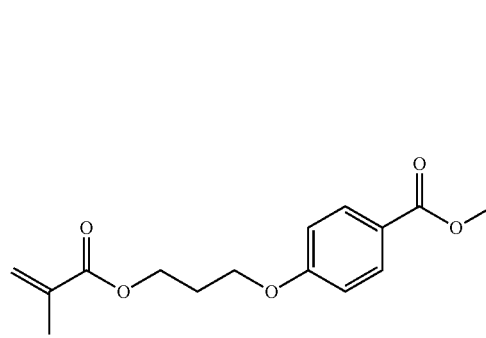

-continued
RM-35
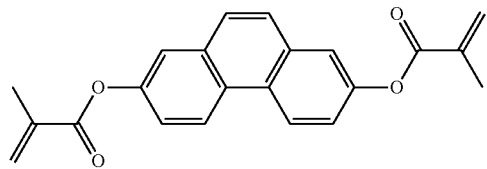 [SMILES: C=C(C)C(=O)Oc1ccc2c(ccc3cc(OC(=O)C(=C)C)ccc32)c1]
RM-36
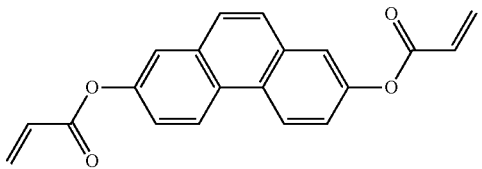 [SMILES: C=CC(=O)Oc1ccc2c(ccc3cc(OC(=O)C=C)ccc32)c1]
RM-37
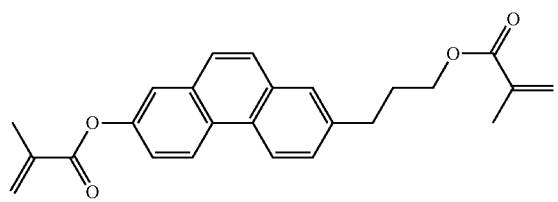
RM-38
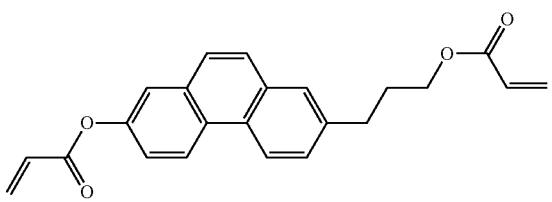 [SMILES: C=CC(=O)OCCCc1ccc2c(ccc3cc(OC(=O)C=C)ccc32)c1]
RM-39
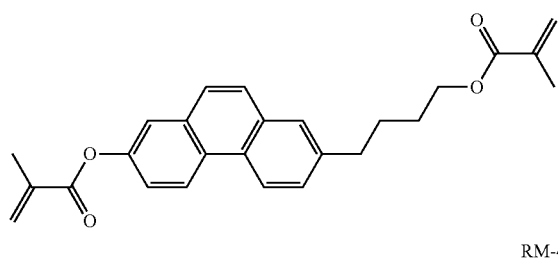
RM-40
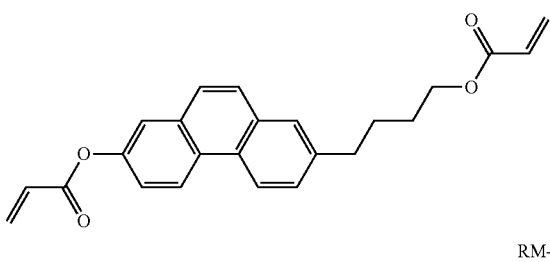
RM-41
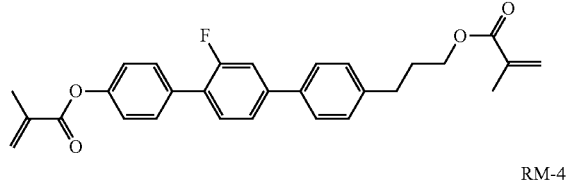
RM-42
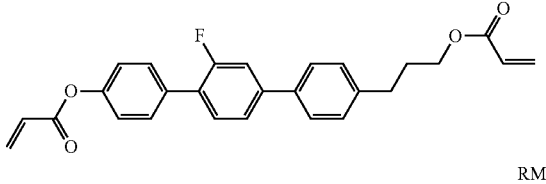
RM-43
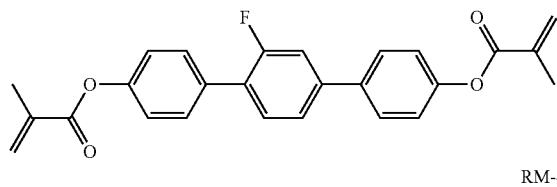
RM-44
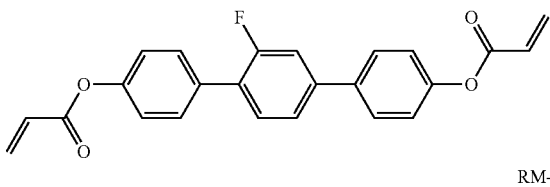
RM-45
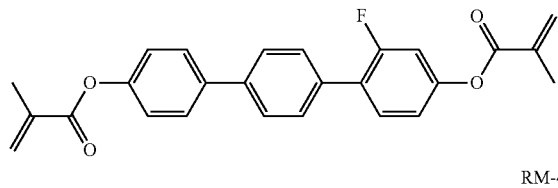
RM-46
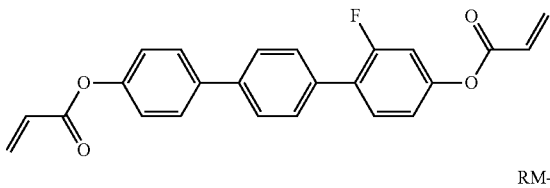
RM-47
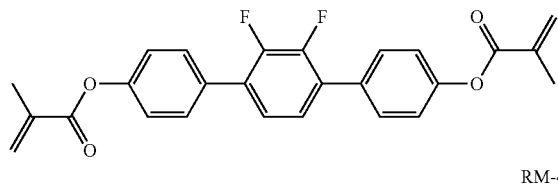
RM-48
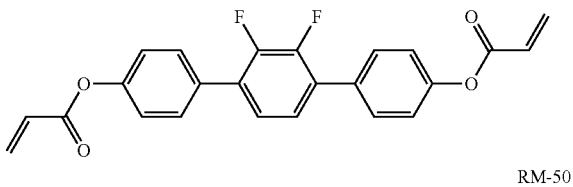
RM-49
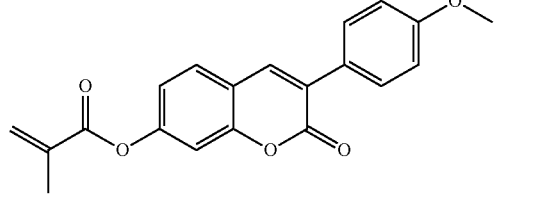

-continued
RM-51
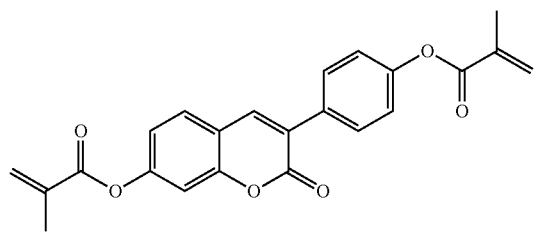 [SMILES: C=C(C)C(=O)Oc1ccc(-c2cc3ccc(OC(=O)C(=C)C)cc3oc2=O)cc1]
RM-52
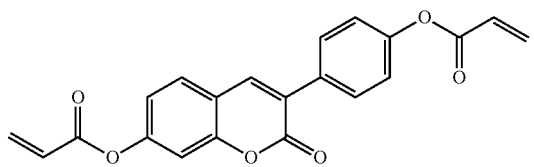 [SMILES: C=CC(=O)Oc1ccc(-c2cc3ccc(OC(=O)C=C)cc3oc2=O)cc1]
RM-53
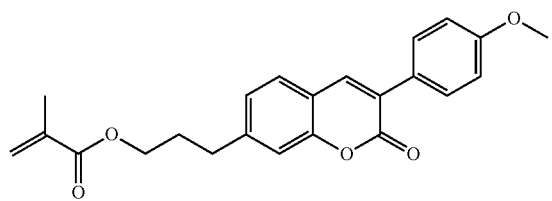 [SMILES: C=C(C)C(=O)OCCCc1ccc2cc(-c3ccc(OC)cc3)c(=O)oc2c1]
RM-54
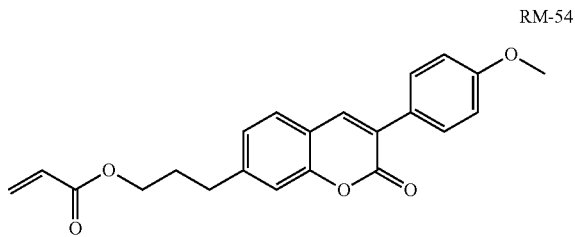
RM-55
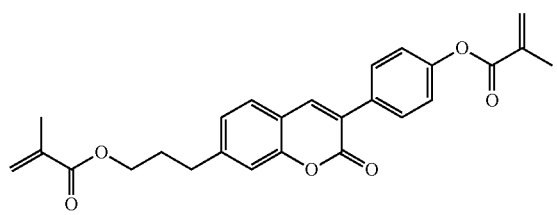 [SMILES: C=C(C)C(=O)OCCCc1ccc2cc(-c3ccc(OC(=O)C(=C)C)cc3)c(=O)oc2c1]
RM-56
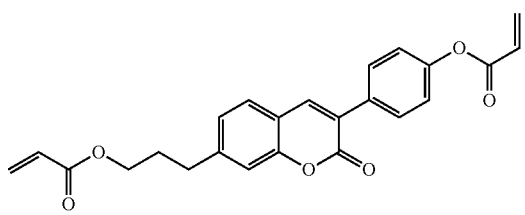 [SMILES: C=CC(=O)OCCCc1ccc2cc(-c3ccc(OC(=O)C=C)cc3)c(=O)oc2c1]
RM-57
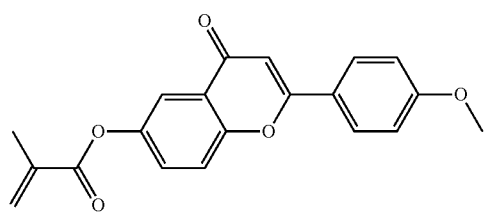 [SMILES: C=C(C)C(=O)Oc1ccc2oc(-c3ccc(OC)cc3)cc(=O)c2c1]
RM-58
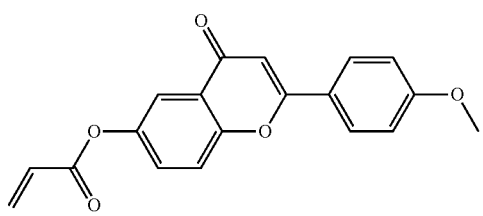 [SMILES: C=CC(=O)Oc1ccc2oc(-c3ccc(OC)cc3)cc(=O)c2c1]
RM-59
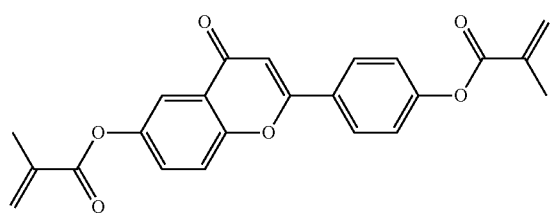 [SMILES: C=C(C)C(=O)Oc1ccc(-c2cc(=O)c3cc(OC(=O)C(=C)C)ccc3o2)cc1]
RM-60
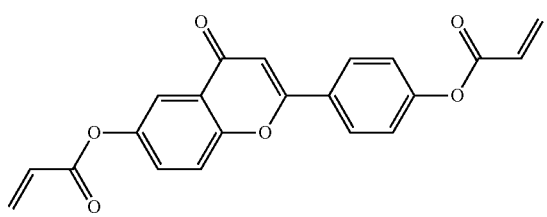 [SMILES: C=CC(=O)Oc1ccc(-c2cc(=O)c3cc(OC(=O)C=C)ccc3o2)cc1]
RM-61
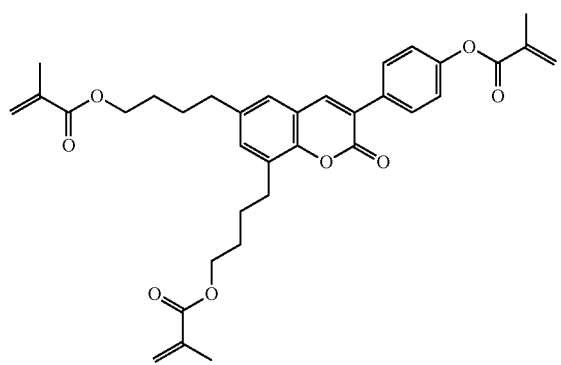 [SMILES: C=C(C)C(=O)OCCCCc1cc(CCCCOC(=O)C(=C)C)c2oc(=O)c(-c3ccc(OC(=O)C(=C)C)cc3)cc2c1]
RM-62
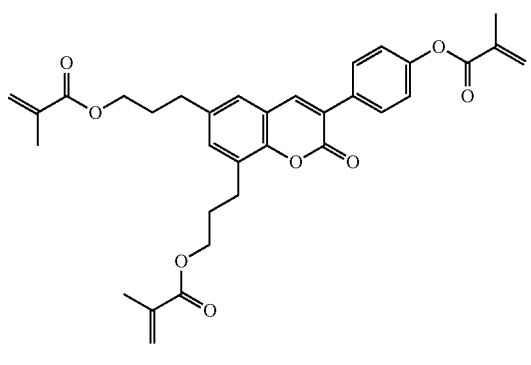 [SMILES: C=C(C)C(=O)OCCCc1cc(CCCOC(=O)C(=C)C)c2oc(=O)c(-c3ccc(OC(=O)C(=C)C)cc3)cc2c1]

-continued
| RM-63 | RM-64 |
|---|---|
| 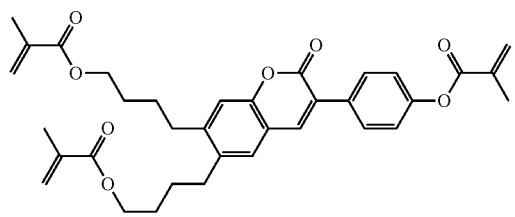 | 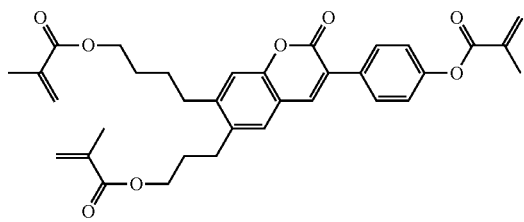 |
RM-65
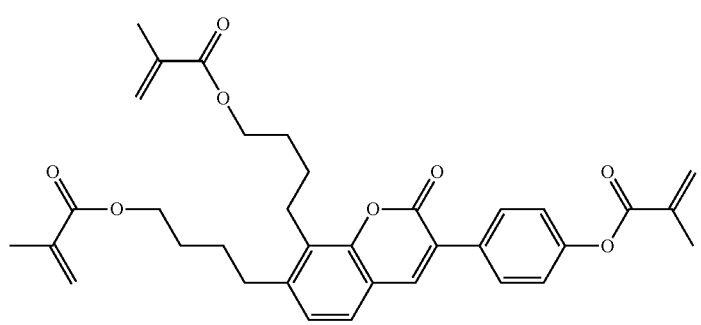 [SMILES: C=C(C)C(=O)OCCCCc1ccc2cc(-c3ccc(OC(=O)C(=C)C)cc3)c(=O)oc2c1CCCCOC(=O)C(=C)C]
RM-66
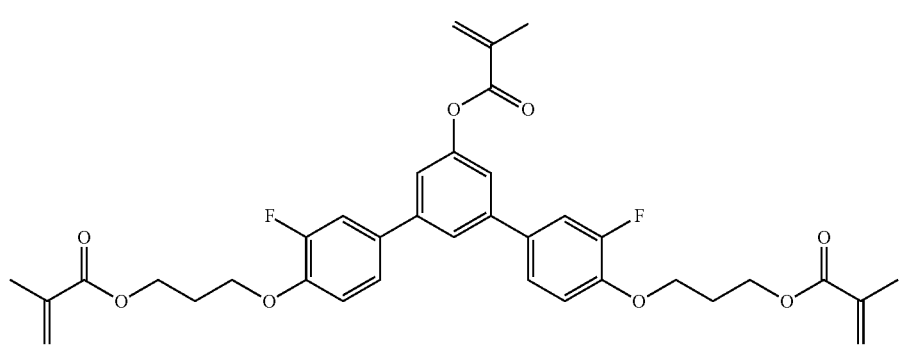 [SMILES: C=C(C)C(=O)OCCCOc1ccc(-c2cc(OC(=O)C(=C)C)cc(-c3ccc(OCCCOC(=O)C(=C)C)c(F)c3)c2)cc1F]
RM-67
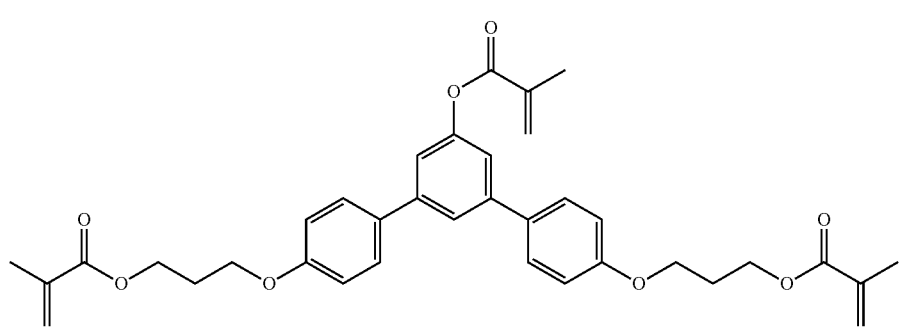 [SMILES: C=C(C)C(=O)OCCCOc1ccc(-c2cc(OC(=O)C(=C)C)cc(-c3ccc(OCCCOC(=O)C(=C)C)cc3)c2)cc1]
RM-68
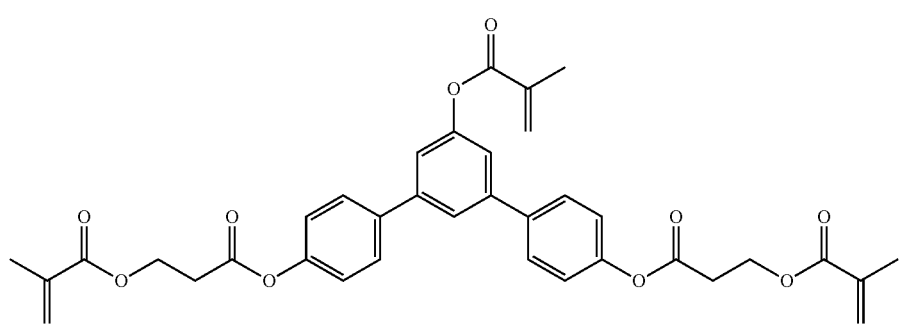 [SMILES: C=C(C)C(=O)OCCC(=O)Oc1ccc(-c2cc(OC(=O)C(=C)C)cc(-c3ccc(OC(=O)CCOC(=O)C(=C)C)cc3)c2)cc1]

-continued
RM-69
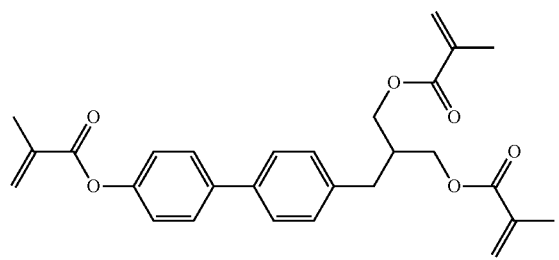 [SMILES: C=C(C)C(=O)OCC(COC(=O)C(=C)C)Cc1ccc(-c2ccc(OC(=O)C(=C)C)cc2)cc1]
RM-70
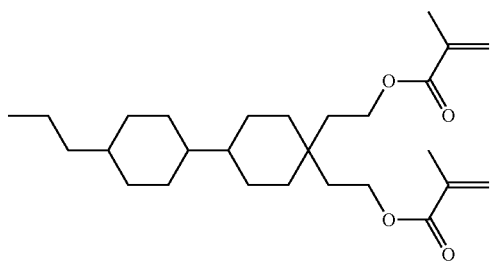 [SMILES: C=C(C)C(=O)OCCC1(CCOC(=O)C(=C)C)CCC(C2CCC(CCC)CC2)CC1]
RM-71
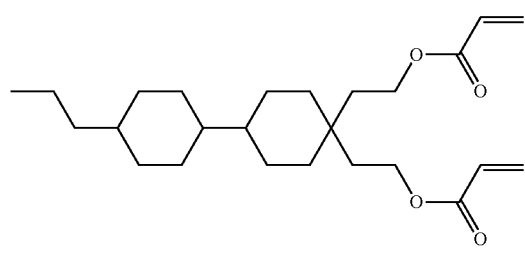 [SMILES: C=CC(=O)OCCC1(CCOC(=O)C=C)CCC(C2CCC(CCC)CC2)CC1]
RM-72
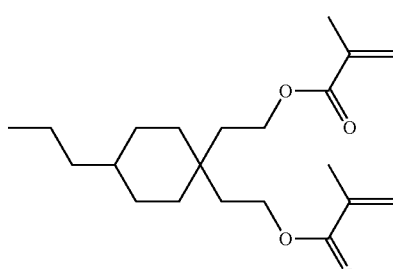
RM-73
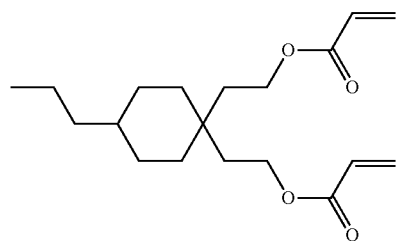 [SMILES: C=CC(=O)OCCC1(CCOC(=O)C=C)CCC(CCC)CC1]
RM-74
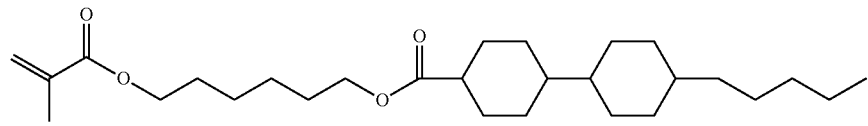 [SMILES: C=C(C)C(=O)OCCCCCCOC(=O)C1CCC(C2CCC(CCCCC)CC2)CC1]
RM-75
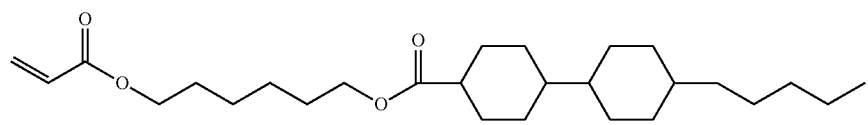 [SMILES: C=CC(=O)OCCCCCCOC(=O)C1CCC(C2CCC(CCCCC)CC2)CC1]
RM-76
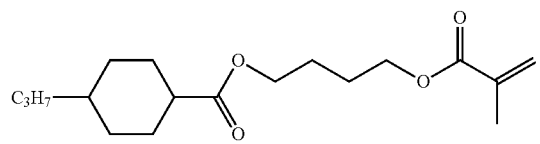
RM-77
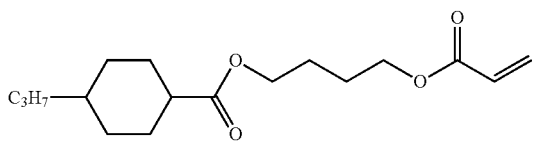

RM-78
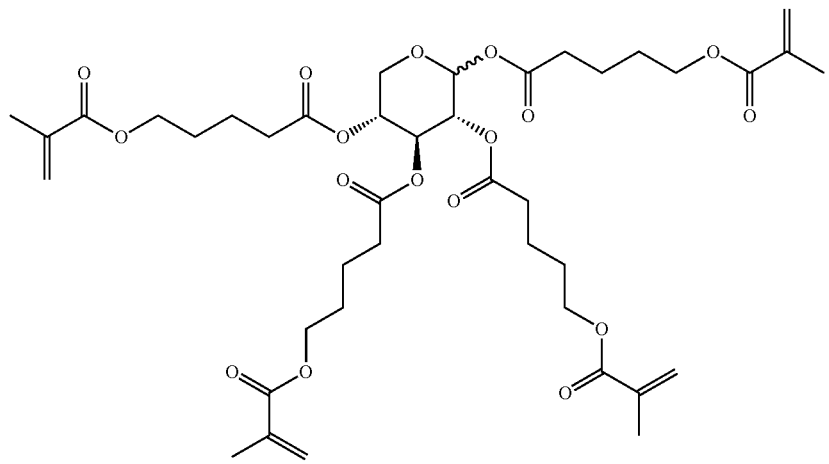 [SMILES: C=C(C)C(=O)OCCCCC(=O)OC1OC[C@@H](OC(=O)CCCCOC(=O)C(=C)C)[C@H](OC(=O)CCCCOC(=O)C(=C)C)[C@H]1OC(=O)CCCCOC(=O)C(=C)C]
RM-79
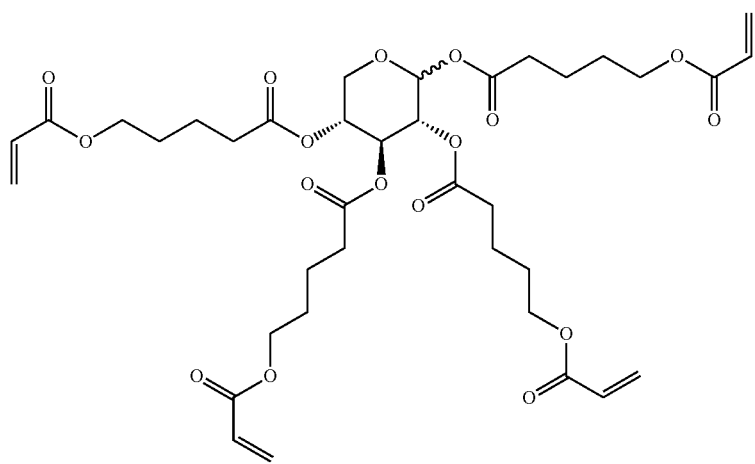 [SMILES: C=CC(=O)OCCCCC(=O)OC1OC[C@@H](OC(=O)CCCCOC(=O)C=C)[C@H](OC(=O)CCCCOC(=O)C=C)[C@H]1OC(=O)CCCCOC(=O)C=C]
RM-80
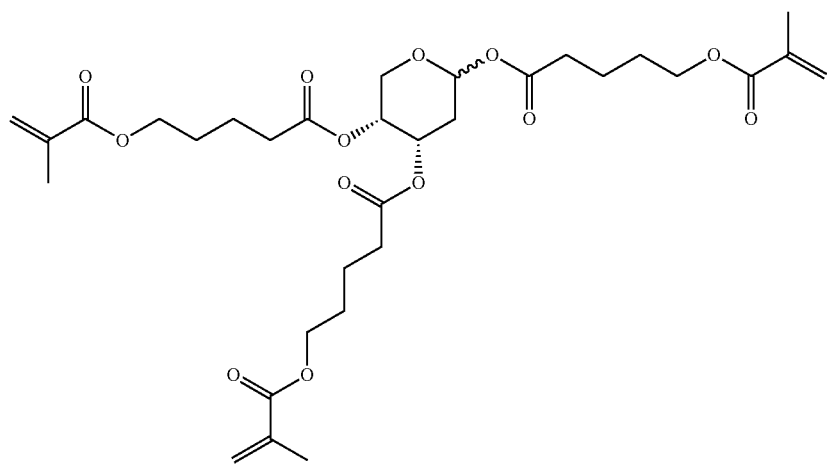 [SMILES: C=C(C)C(=O)OCCCCC(=O)OC1C[C@H](OC(=O)CCCCOC(=O)C(=C)C)[C@H](OC(=O)CCCCOC(=O)C(=C)C)CO1]

-continued
RM-81
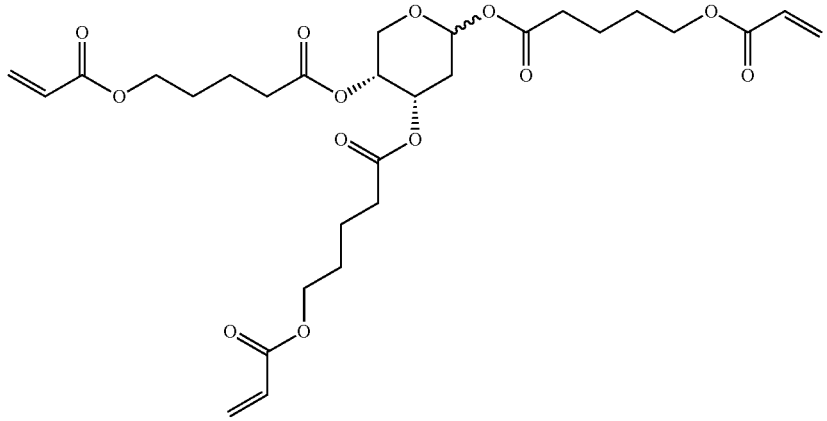 [SMILES: C=CC(=O)OCCCCC(=O)OC1C[C@H](OC(=O)CCCCOC(=O)C=C)[C@H](OC(=O)CCCCOC(=O)C=C)CO1]
RM-82
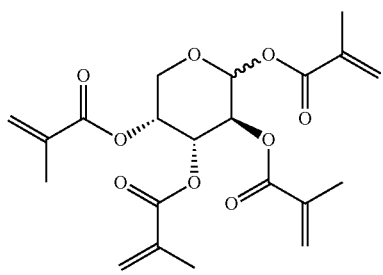 [SMILES: C=C(C)C(=O)OC1OC[C@@H](OC(=O)C(=C)C)[C@@H](OC(=O)C(=C)C)[C@@H]1OC(=O)C(=C)C]
RM-83
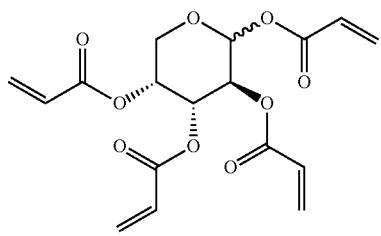 [SMILES: C=CC(=O)OC1OC[C@@H](OC(=O)C=C)[C@@H](OC(=O)C=C)[C@@H]1OC(=O)C=C]
RM-84
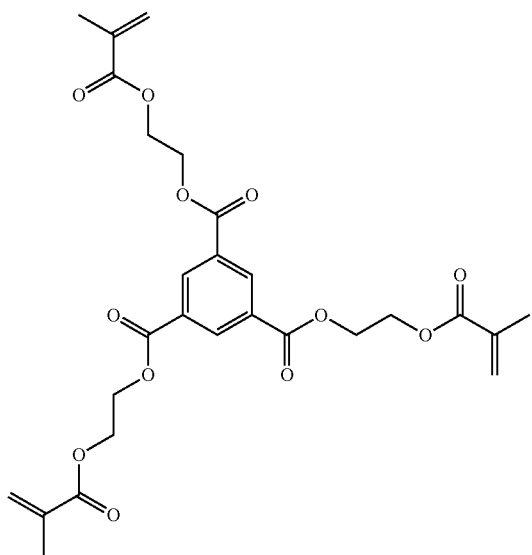 [SMILES: C=C(C)C(=O)OCCOC(=O)c1cc(C(=O)OCCOC(=O)C(=C)C)cc(C(=O)OCCOC(=O)C(=C)C)c1]
RM-85
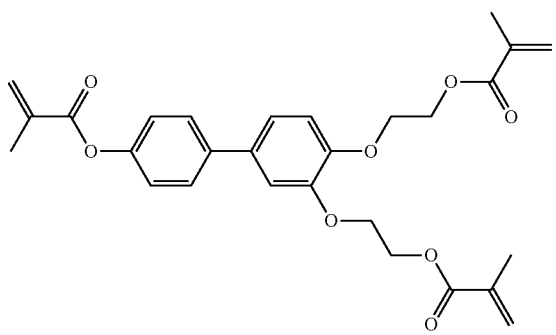 [SMILES: C=C(C)C(=O)OCCOc1ccc(-c2ccc(OC(=O)C(=C)C)cc2)cc1OCCOC(=O)C(=C)C]
RM-86
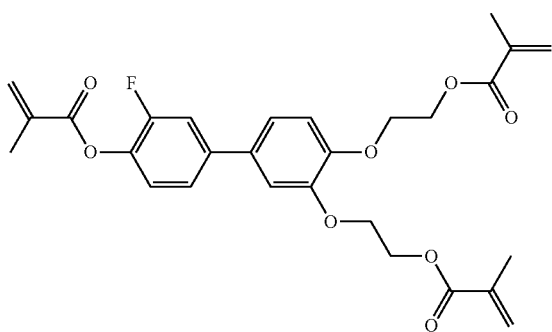 [SMILES: C=C(C)C(=O)OCCOc1ccc(-c2ccc(OC(=O)C(=C)C)c(F)c2)cc1OCCOC(=O)C(=C)C]

6. The liquid-crystalline medium according to claim 1, wherein the at least one compound of formulae IIA, IIB and IIC are selected from the group consisting of the compounds of formulae IIA-1 to IIC-6,
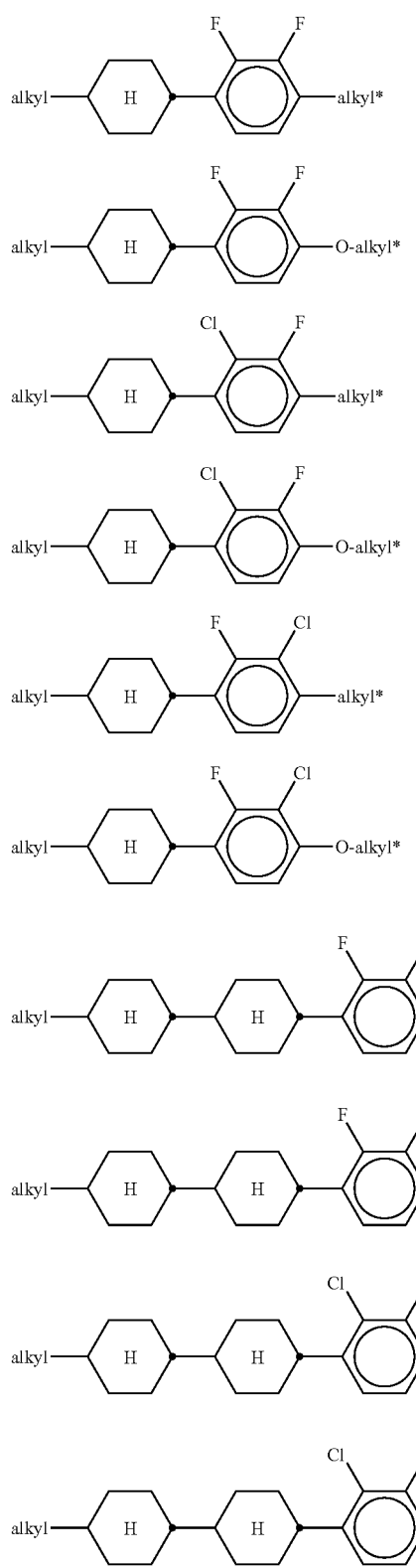
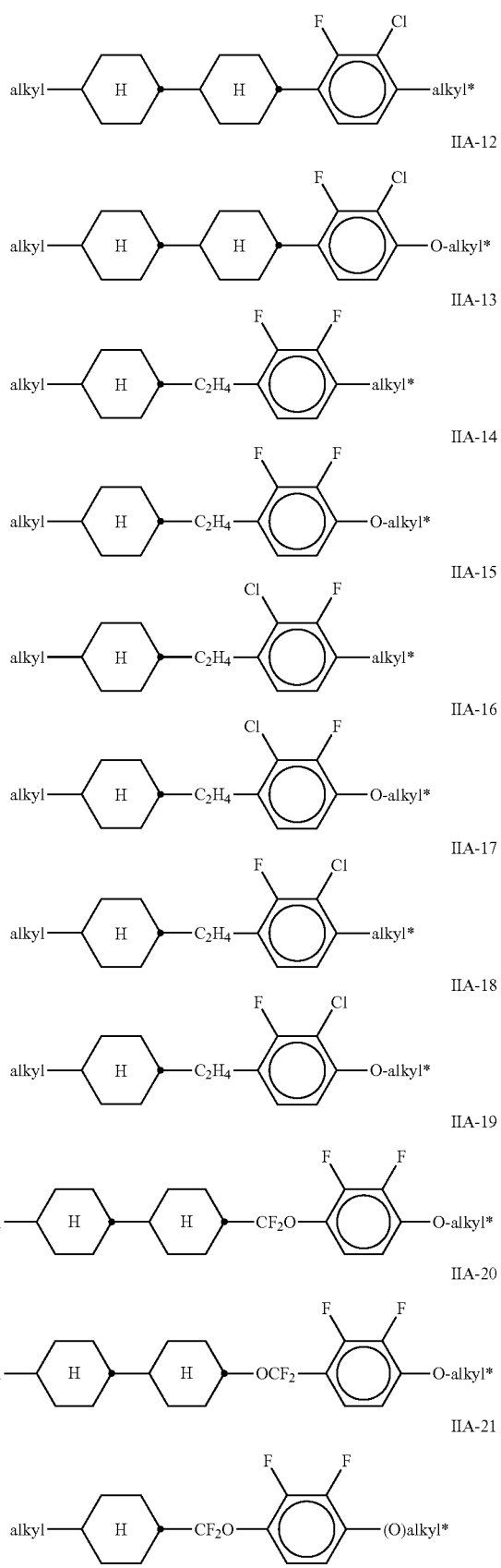

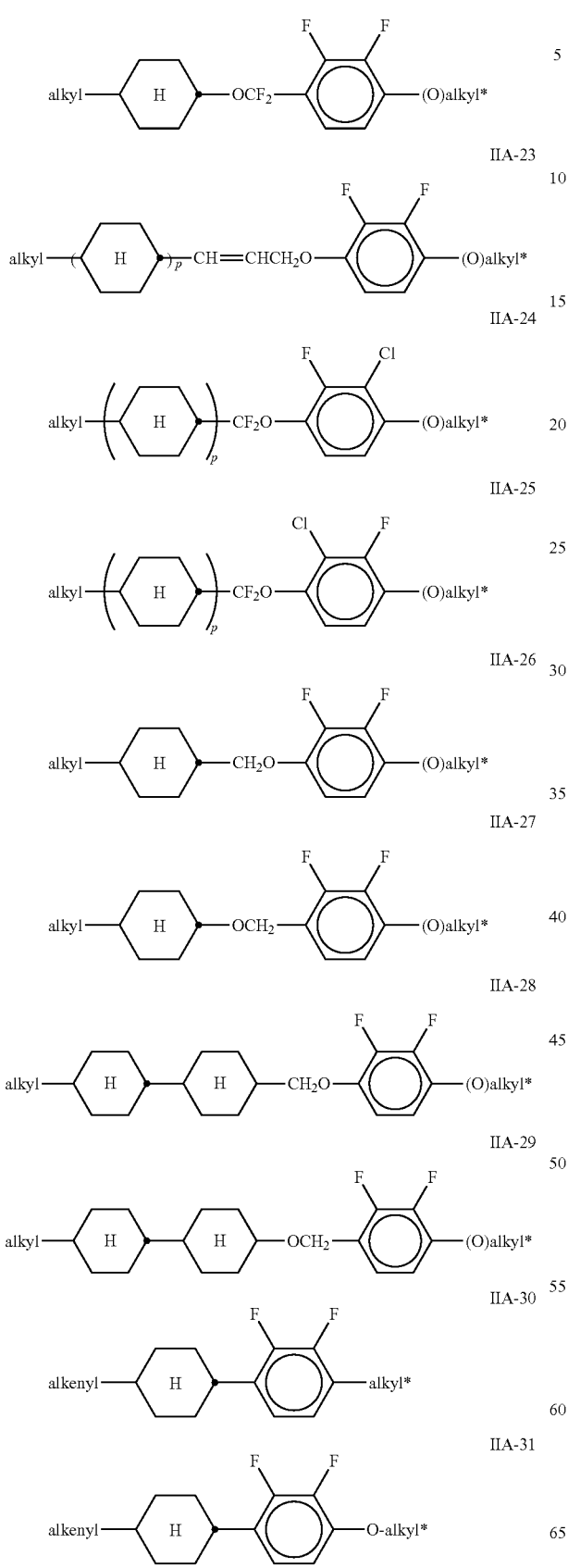
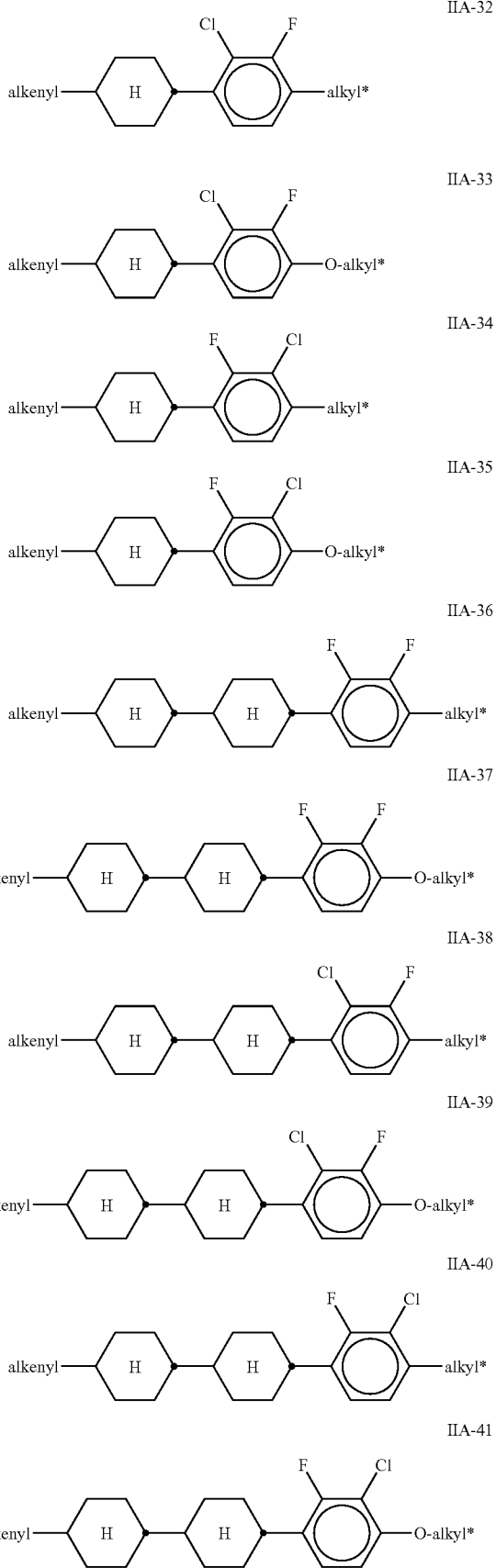

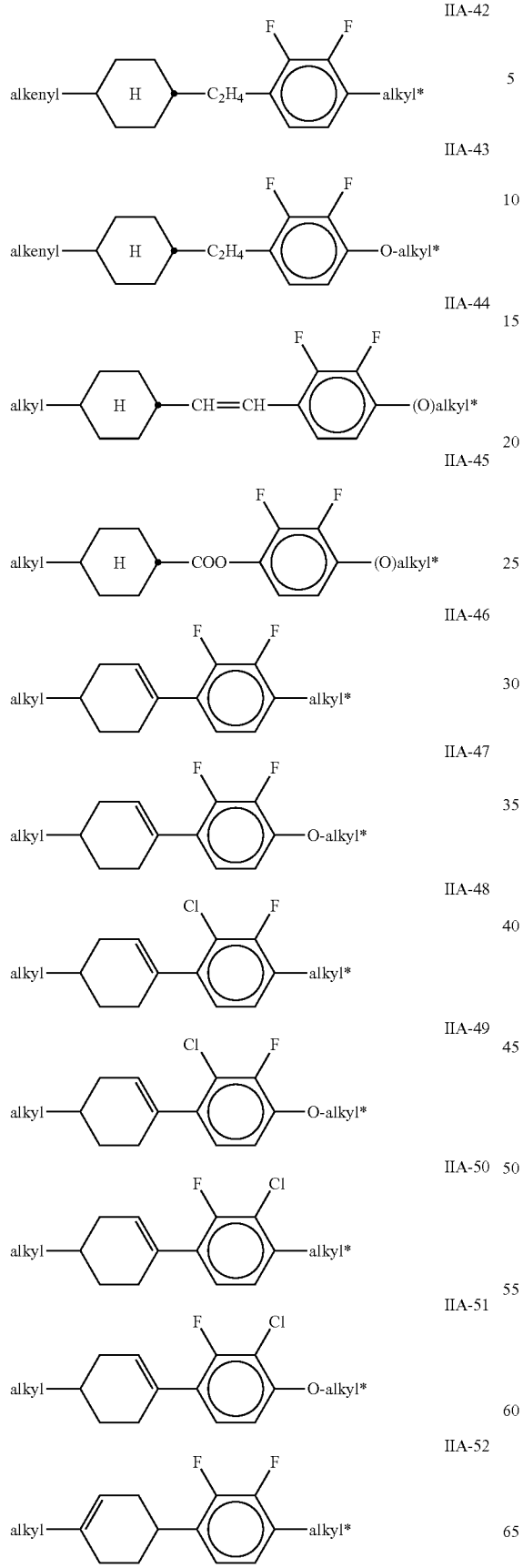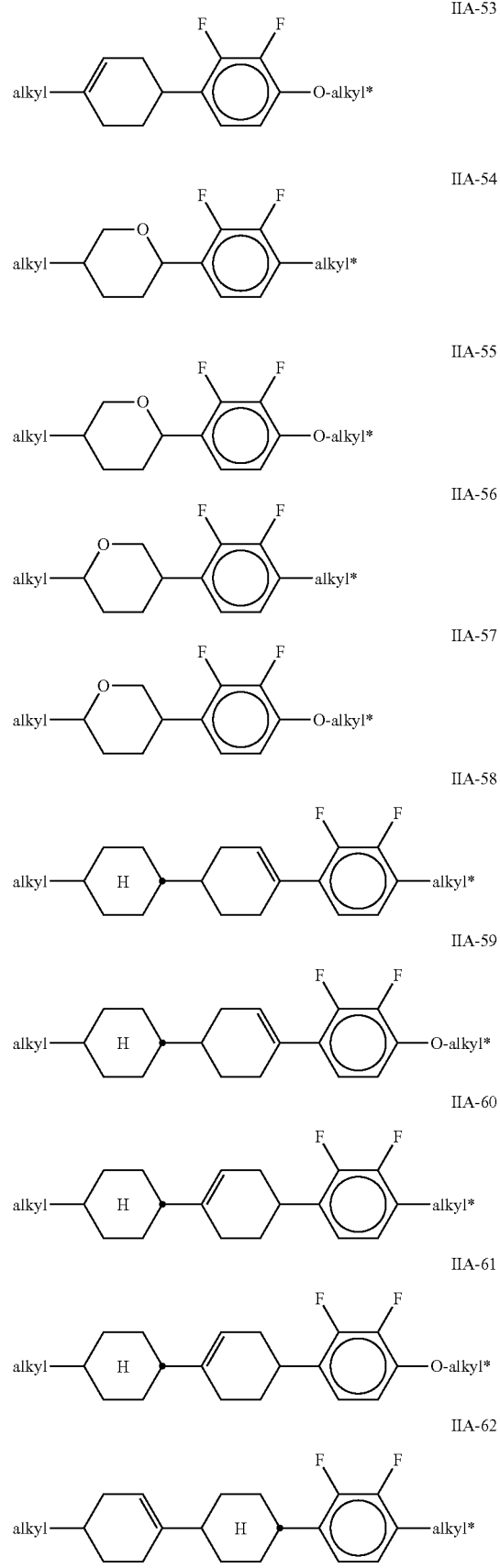

-continued
IIA-63
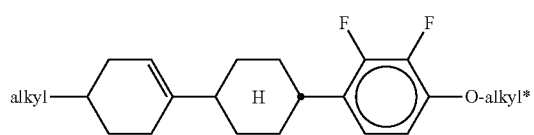
IIA-64
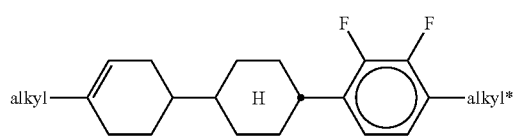
IIA-65
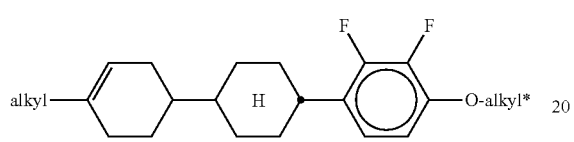
IIA-66
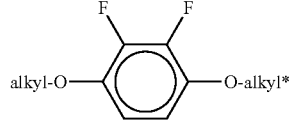
IIA-67
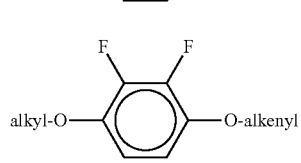
IIB-1
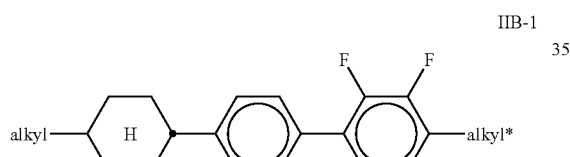
IIB-2
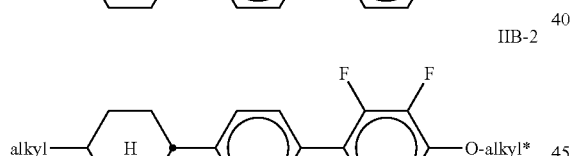
IIB-3
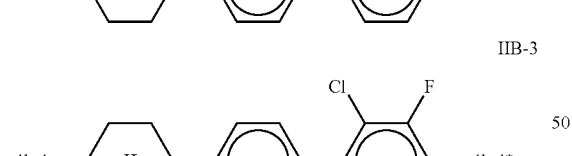
IIB-4
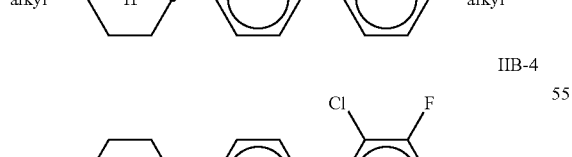
IIB-5
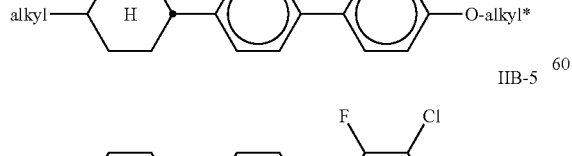
-continued
IIB-6
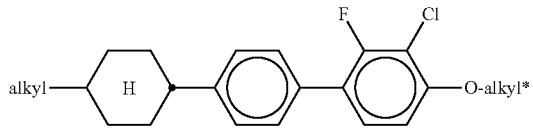
IIB-7
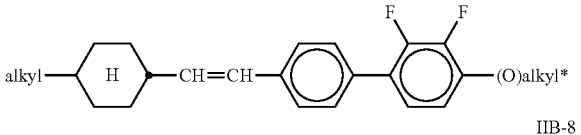
IIB-8
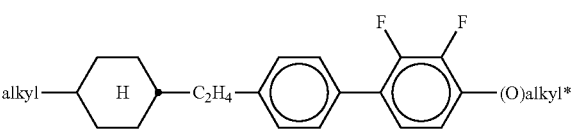
IIB-9
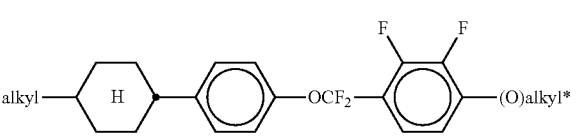
IIB-10
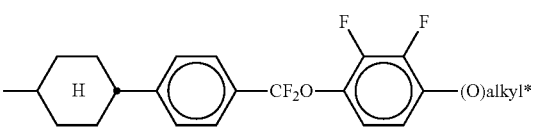
IIB-11
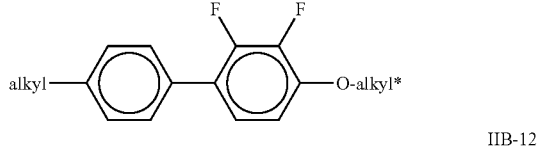
IIB-12
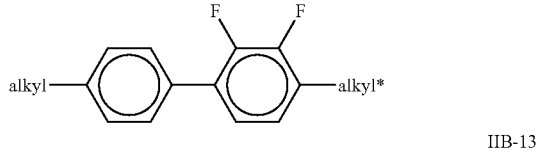
IIB-13
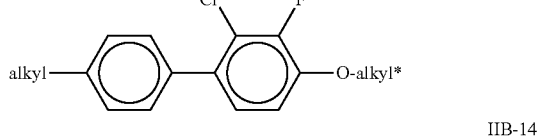
IIB-14
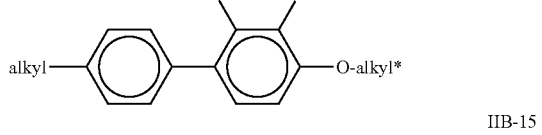
IIB-15
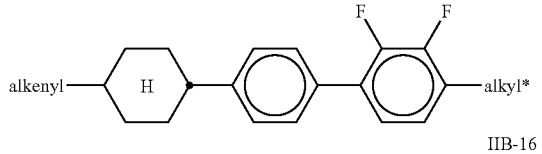
IIB-16
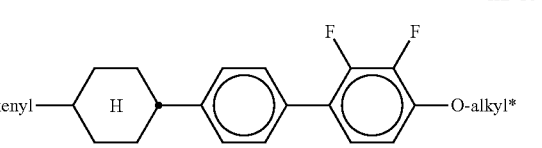

-continued

IIC-1: alkyl—[phenyl]—[2,3-difluorophenyl]—[phenyl]—alkyl*

IIC-2: alkenyl—[phenyl]—[2,3-difluorophenyl]—[phenyl]—alkyl

IIC-3: alkyl—[phenyl]—[phenyl]—[2,3-difluorophenyl]—alkyl*

IIC-4: alkyl—[phenyl]—[phenyl]—[2,3-difluorophenyl]—O-alkyl*

IIC-5: alkenyl—[phenyl]—[phenyl]—[2,3-difluorophenyl]—alkyl*

IIC-6: alkenyl—[phenyl]—[phenyl]—[2,3-difluorophenyl]—O-alkyl* in which
alkyl and alkyl* each, independently of one another, denote a straight-chain alkyl radical having 1-6 C atoms and
alkenyl denotes a straight-chain alkenyl radical having 2-6 C atoms.

7. The liquid-crystalline medium according to claim 1, further containing one or more compounds of formula III, $$R^{31}-[H]-Z^3-[A]-R^{32}$$ III in which
$R^{31}$ and $R^{32}$ each, independently of one another, denote a straight-chain alkyl, alkoxyalkyl or alkoxy radical having up to 12 C atoms, and

[A] denotes

[phenyl], [cyclohexenyl], [cyclohexyl], [tetrahydropyran], or [tetrahydropyran]

$Z^3$ denotes a single bond, —CH$_2$CH$_2$—, —CH=CH—, —CF$_2$O—, —OCF$_2$—, —CH$_2$O—, —OCH$_2$—, —COO—, —OCO—, —C$_2$F$_4$—, —C$_4$H$_9$—, or —CF=CF—.

8. The liquid-crystalline medium according to claim 1, further containing at least one compound of formulae L-1 to L-11, L-1: R—[cyclohexyl]—[2,3-difluorophenyl]—(O)-alkyl L-2: R—[cyclohexyl]—[2-F,3-Cl-phenyl]—(O)-alkyl L-3: R—[cyclohexyl]—[2-Cl,3-F-phenyl]—(O)-alkyl L-4: R—[H]—[cyclohexyl]—[2,3-difluorophenyl]—(O)-alkyl L-5: R—[H]—[cyclohexyl]—[2-F,3-Cl-phenyl]—(O)-alkyl L-6: R—[H]—[cyclohexyl]—[2-Cl,3-F-phenyl]—(O)-alkyl L-7: R—[cyclohexenyl]—[H]—[2,3-difluorophenyl]—(O)-alkyl -continued L-8
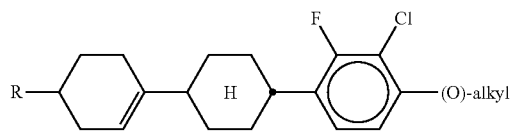

L-9
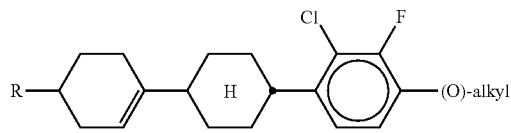

L-10
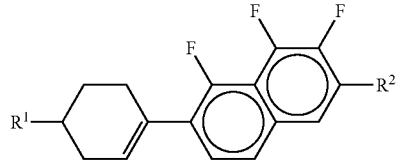

L-11
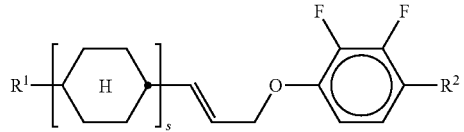

in which

R, R¹ and R² each, independently of one another, denote H, an alkyl or alkenyl radical having up to 15 C atoms which is unsubstituted, monosubstituted by CN or CF₃ or at least monosubstituted by halogen, in which one or more CH₂ groups are optionally replaced by —O—, —S—,

—OC—O— or —O—CO— in such a way that O atoms are not linked directly to one another, alkyl denotes an alkyl radical having 1-6 C atoms, and s denotes 1 or 2.

9. The liquid-crystalline medium according to claim 1, further containing one or more terphenyls of formulae T-1 to T-21, T-1
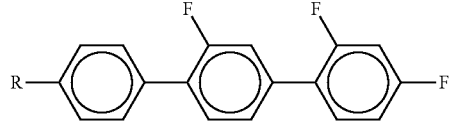

T-2
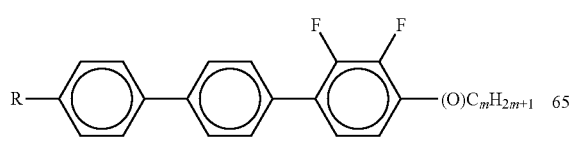

-continued

T-3
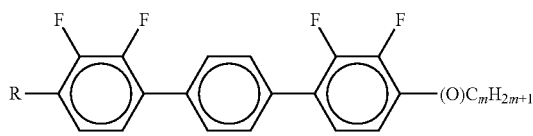

T-4
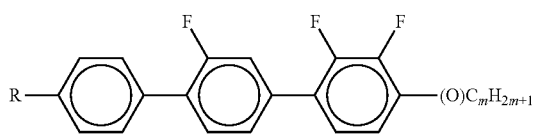

T-5
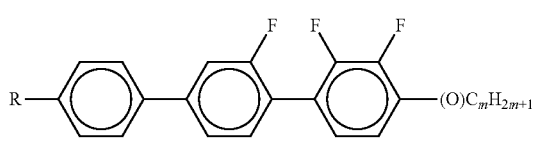

T-6
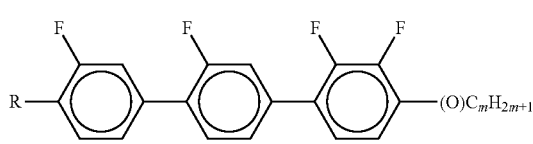

T-7
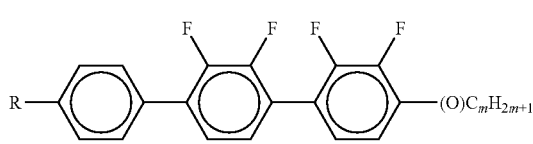

T-8
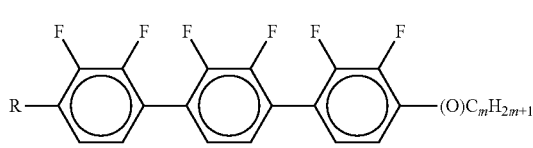

T-9
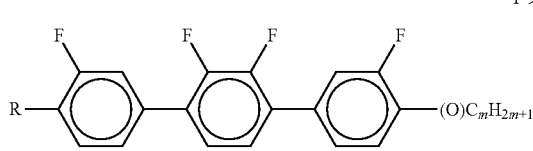

T-10
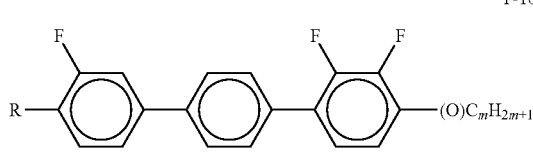

T-11
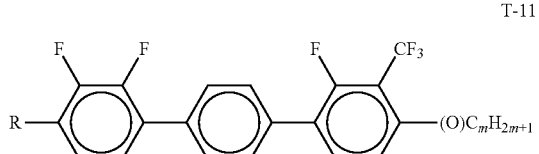

T-12
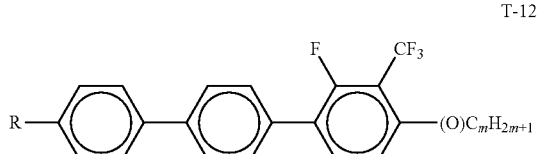

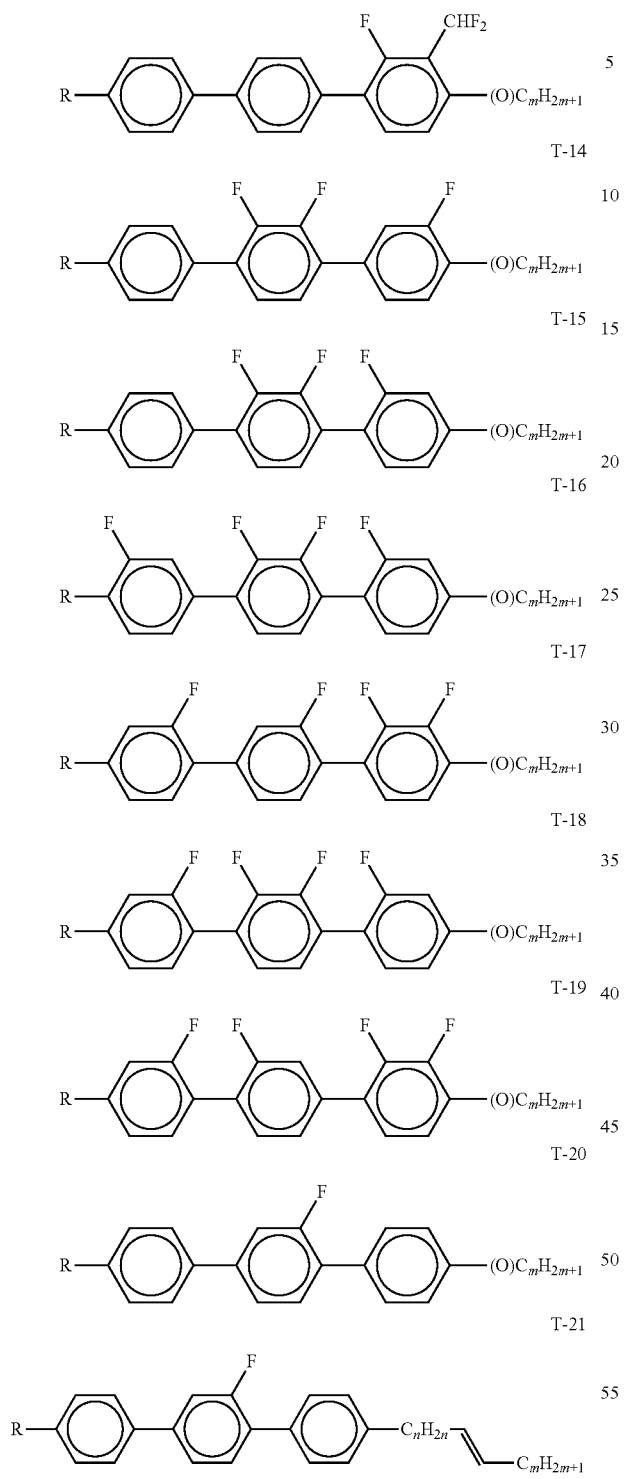
in which
R denotes a straight-chain alkyl or alkoxy radical having 1-7 C atoms,
n denotes 0-4, and
m denotes 1-6.
10. The liquid-crystalline medium according claim 1, further containing one or more compounds of formulae O-1 to O-16,
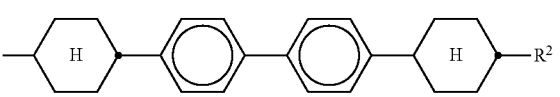

-continued

O-14

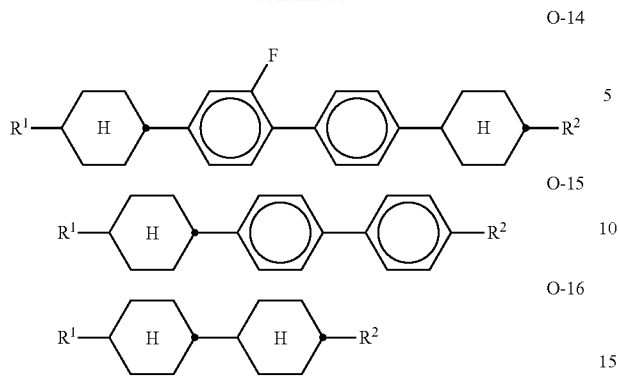

O-15

O-16 in which
R$^1$ and R$^2$ each, independently of one another, denote H, an alkyl or alkenyl radical having up to 15 C atoms which is unsubstituted, monosubstituted by CN or CF$_3$ or at least monosubstituted by halogen, in which one or more CH$_2$ groups are optionally replaced by —O—, —S—,

—C≡C—, —CF$_2$O—, —OCF$_2$—, —OC—O— or —O—CO— in such a way that O atoms are not linked directly to one another.

11. The liquid-crystalline medium according to claim 1, further containing one or more indane compounds of formula In, In

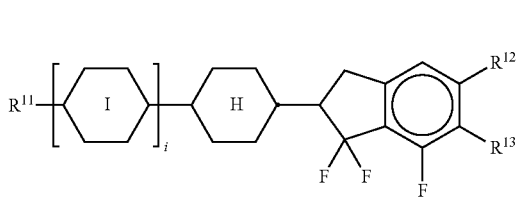

in which
R$^{11}$, R$^{12}$, R$^{13}$ denote a straight-chain alkyl, alkoxy, alkoxyalkyl or alkenyl radical having 1-5 C atoms,
R$^{12}$ and R$^{13}$ additionally also denote halogen,

denotes one of the following groups

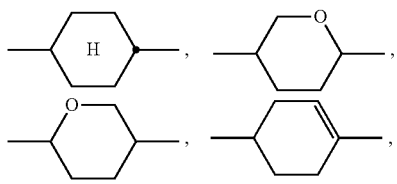

-continued

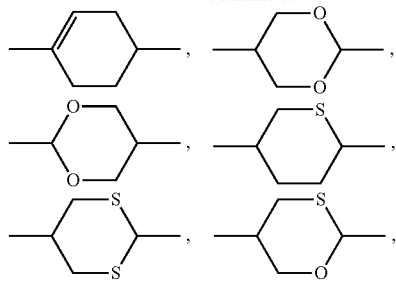

i denotes 0, 1 or 2.

12. The liquid-crystalline medium according to claim 2, wherein the proportion of the compounds of formula I in the mixture as a whole is 0.1 to 5% by weight.

13. A process for preparing the liquid-crystalline medium according to claim 1, comprising mixing together the at least two reactive mesogens each having a polymerization reactivity that is different from the other of the at least two reactive mesogens with at least one compound of formula IIA, IIB or IIC, and additives are optionally added.

14. An electro-optical display having active-matrix addressing, which contains, as dielectric, the liquid-crystalline medium according to claim 1.

15. The electro-optical display according to claim 14, which is a VA, PSA, PS-VA, PALC, FFS, PS-FFS, IPS, PS—IPS or flexible display.

16. The PS or PSA display according to claim 14, which contains a display cell containing two substrates and two electrodes, wherein at least one substrate is transparent to light and at least one substrate has one or two electrodes provided thereon, and a layer of an LC medium containing two polymerized components located between the substrates, wherein the polymerized components are obtainable by polymerization of the at least two reactive mesogens each having a polymerization reactivity that is different from the other of the at least two reactive mesogens between the substrates of the display cell in the LC medium, optionally while applying a voltage to the electrodes.

17. The PS or PSA display according to claim 16, which contains a display cell containing two substrates wherein one substrate is a glass substrate and the other substrate is a flexible substrate made by RM polymerization of the at least two reactive mesogens each having a polymerization reactivity that is different from the other of the at least two reactive mesogens.

18. A method for preparing a PS or PSA display, comprising providing the LC mixture according to claim 1 into a display cell containing two substrates and two electrodes, wherein at least one substrate is transparent to light and at least one substrate has one or two electrodes provided thereon, and polymerizing the at least two reactive mesogens each having a polymerization reactivity that is different from the other of the at least two reactive mesogens.

19. The method according to claim 18, wherein polymerization is achieved by exposure to UV light having a wavelength from 320 nm to 400 nm.

20. The liquid crystalline medium according to claim 1, wherein at least two of said reactive mesogens have a substantially different polymerization UV absorption spectrum from each other.

21. The liquid crystalline medium according to claim 4, comprising one or more polymerizable compounds or reactive mesogens (RM) of formulae I-2 and I-3 and one or more polymerizable compounds or reactive mesogens (RM) of formula I-13 to I-21.

22. The liquid crystalline medium according to claim 5, comprising one or more polymerizable compounds or reactive mesogens (RM) of formulae RM-1 to RM-32 and one or more polymerizable compounds or reactive mesogens (RM) of formulae RM-41 to RM-65.

23. A composite system comprising a liquid crystalline medium comprising at least one compound of formulae IIA, IIB and/or IIC, of claim 1 and two different polymeric components obtained by separate polymerization of the at least two reactive mesogens.

24. The system according to claim 23, wherein polymerization of the at least two different reactive mesogens is achieved or achievable by UV radiation, while at least two of the at least two reactive mesogens are polymerized by the application of an UV irradiation with a spectral distribution different from that one used for the polymerization of the other of said of at least two reactive mesogens and whereby a voltage is applied during at least one of said polymerizations.

25. An electro-optical display having active-matrix addressing, which contains, as dielectric, the system according to claim 23.

26. The method according to claim 18, wherein at least one of the at least two reactive mesogens is polymerized under the application of a voltage.

27. The method according to claim 19, wherein at least one of the at least two reactive mesogens is polymerized under the application of a voltage.

28. The liquid-crystalline medium according to claim 1, which further contains a polymerization initiator.

\* \* \* \* \*